United States Patent [19]
Nizamuddin et al.

[11] Patent Number: 5,136,585
[45] Date of Patent: Aug. 4, 1992

[54] DIGITAL KEY TELEPHONE SYSTEM

[75] Inventors: Nadir Nizamuddin; Alan S. J. Chapman; John W. J. Williams; Alan M. Redmond, all of Kanata, Canada

[73] Assignee: Northern Telecom Limited, Montreal, Canada

[21] Appl. No.: 317,396

[22] Filed: Mar. 1, 1989

Related U.S. Application Data

[63] Continuation-in-part of Ser. No. 166,345, Mar. 10, 1988, Pat. No. 4,893,310, and a continuation-in-part of Ser. No. 126,710, Nov. 30, 1987, Pat. No. 4,873,682, and a continuation-in-part of Ser. No. 291,949, Dec. 29, 1988, Pat. No. 5,027,345.

[51] Int. Cl.[5] .......................... H04J 3/12; H04Q 11/04
[52] U.S. Cl. ..................................... 370/110.1; 370/62
[58] Field of Search .................... 370/58.1, 58.2, 58.3, 370/62, 67, 110.1, 66; 379/156, 158, 165, 166, 201

[56] References Cited

U.S. PATENT DOCUMENTS

| | | | |
|---|---|---|---|
| 4,430,733 | 2/1984 | Hardy et al. | 370/110.1 |
| 4,616,360 | 10/1986 | Lewis | 370/58.1 |
| 4,730,304 | 3/1988 | Mezera et al. | 370/58.2 |
| 4,740,955 | 4/1988 | Litterer et al. | 370/67 |
| 4,763,316 | 8/1988 | Schaich et al. | 370/58.2 |
| 4,787,081 | 11/1988 | Waters et al. | 370/67 |

Primary Examiner—Douglas W. Olms
Assistant Examiner—Wellington Chin
Attorney, Agent, or Firm—Foley & Lardner, Schwartz, Jeffery, Schwaab, Mack, Blumenthal & Evans

[57] ABSTRACT

A key telephone system includes a plurality of ports linked by port associated bidirectional communication channels which are synchronously switched by transferring bit states between ones of the channels to provide communication paths between the ports as directed by a central processor. The ports are also linkable to and via the central processor by port associated message channels. An interface circuit is responsive to the central processor and message channel signals for regulating flow of messages received by the central processor and for effecting single and plural channel distribution of messages from the central processor. The message channels permit telephony operating features and functions to be provided either within the central processor or by appropriate apparatus means being connected at any of the ports. In such a telephone system at least one of said apparatus comprises a telephone station apparatus and another of said apparatus comprises a feature host apparatus. The telephone station apparatus has a plurality of functions stored therein and said feature host apparatus has a plurality of feature modules stored therein. Each such feature module comprises instructions for invoking a corresponding set of functions at said telephone station apparatus by means of an exchange of signalling and supervision messages between said feature host apparatus and said telephone station apparatus. The functions invoked provide the feature selected by a feature request action of a user at said telephone station apparatus.

36 Claims, 26 Drawing Sheets

DATABASE MANAGER                           EMULATORS
(a) Port Map Data            (b) Functional Terminal Emulator Data
(i)
(a)
| port | HWid | PDN |
|------|------|-----|
| 1 | nil | PDN₁ |
| 2 | nil | PDN₂ |
| 3 | nil | PDN₃ |
| ⋮ | ⋮ | ⋮ |
| n | nil | PDNₙ |
1608
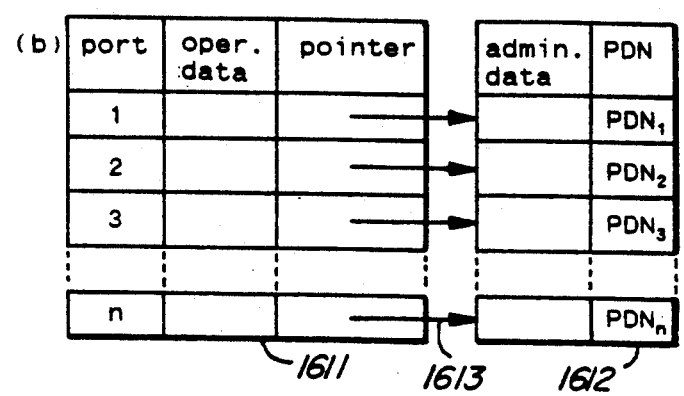
(ii)
(a)
| 1 | id₁ | PDN₁ |
| 2 | nil | PDN₂ |
| 3 | nil | PDN₃ |
| ⋮ | ⋮ | ⋮ |
| n | nil | PDNₙ |
(iii)
(a) state as in (ii)    (b) initial state as in (i)
(iv)
(a)
| 1 | nil | PDN₃ |
| 2 | nil | PDN₂ |
| 3 | id₁ | PDN₁ |
| ⋮ | ⋮ | ⋮ |
| n | nil | PDNₙ |
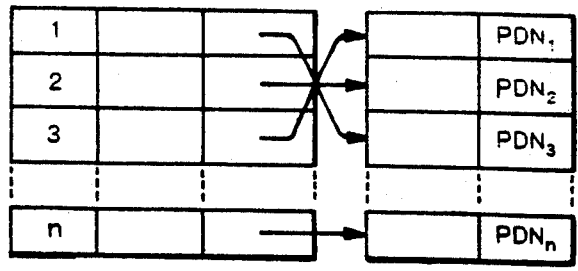
(v)
(a) state as in (ii)    (b) initial state as in (i)
(vi)
(a)
| 1 | id₂ | PDN₁ |
| 2 | nil | PDN₂ |
| 3 | nil | PDN₃ |
| ⋮ | ⋮ | ⋮ |
| n | nil | PDNₙ |
(b) initial state as in (i)
FIG. 19B
FIG. 19A

DIGITAL KEY TELEPHONE SYSTEM

This is a continuation-in-part of U.S. patent application Ser. No. 166,345 filed Mar. 10, 1988 by David J. Robertson et al and entitled "Digital Key Telephone System", now U.S. Pat. No. 4,893,310 of U.S. patent application Ser. No. 126,710 filed Nov. 30, 1987 by George Irwin et al and entitled "Digital Key Telephone System", now U.S. Pat. No. 4,873,682, and of U.S. patent application Ser. No. 291,949 filed Dec. 29, 1988 by Timothy James Littlewood et al now U.S. Pat. No. 5,027,345.

The invention is in the field of small telephone systems and the like, especially those sometimes referred to as key telephone systems. More particularly, aspects of the invention relate to signalling and supervision messaging functions in a digital key telephone system, one example of which is disclosed in a copending application entitled "Digital Key Telephone System", Ser. No. 126,710, which was filed on Nov. 30, 1987 by George Irwin et al.

The invention also relates to relocation and/or replacement of terminal apparatus in telecommunications systems including, but not necessarily limited to, such key telephone systems, and is especially concerned with reassignment of administrative data, for example, features, when a station or terminal apparatus is moved physically from one port to another within the same exchange or key system.

The invention also relates to a telephone system having a central processor and a plurality of ports, each of said ports having connected thereto an apparatus including a processing device for controlling functions of the apparatus and an interface device for exchanging signals in an operating signal format of the port, and is concerned with providing features to a user, on demand, from a feature host other than the core processor.

BACKGROUND OF THE INVENTION

Some examples of small telephone systems have been generally referred to as key telephone systems. Traditionally a key telephone system is provided by extensive telephone line and control lead wiring between key telephone sets. Each key telephone line extends to a telephone exchange. Each of the telephone sets includes a plurality of push button switches or keys, each for connecting the telephone set to a particular telephone line among a plurality of telephone lines routed to the key telephone set. The switching function of line selection is mechanically provided and distributed among the key telephone sets. Any features in addition to plain ordinary telephone service (POTS) must be added on a per line basis. The primary advantage of these systems is economy with small size. However, if such a system is required to expand along with the organization it serves, over a time it eventually becomes more expensive on a per line and feature basis than a private branch exchange would be. Key telephone systems are also characteristically of the analog signal type, and therefore are impractical to interface with an ISDN as will likely be desired by business customers in the near future.

So far as those aspects of the invention concerned with replacement and/or relocation in telecommunications systems generally are concerned, most telephone sets or other terminal apparatus nowadays are connected into the system by jacks, so it is a simple matter for the user to unplug a terminal apparatus and reconnect it at a different port. Of course, if those attributes of the terminal apparatus not resident in the terminal apparatus itself are to be retained, corresponding administrative changes must be made at the switch or, in the case of a key telephone system, at the key switch unit. Existing systems require the intervention of a skilled craftsperson to effect such changes, typically by locating the feature set of the terminal apparatus at the vacated port and assigning it to the new port. This involves high costs and may incur delays. A similar situation arises if the user replaces the terminal apparatus with a new set i.e. new to the system rather than being relocated from another port. Usually this would be done to replace a defective set. Providing that they are of the same type, the new set will need to inherit the old set's administration data and, where applicable, intercom number.

So far as those aspects of the system which concern provision of features on demand are concerned, in such systems, various features may be made available to the user. For example, Automatic Call Distribution is a feature which routes incoming external calls, on a first come, first served basis, to the first available terminal. Such a feature finds application in airline reservation systems, telemarketing, customer service, and so on.

Least Cost Routing is a feature which automatically routes outgoing calls using the least expensive route. For example, during business hours, outgoing calls may be routed over tie lines. After the time when lower long distance rates come into effect, calls to the same destination may be routed over regular central office lines. With such a feature, the user need not worry about which line he should use, but simply dials the number and the feature makes the decision for him.

Implementation of such a feature involves the execution by the user's terminal of a predetermined set of functions, each of which may comprise a number of specific steps.

In conventional systems, software for implementing such features is resident in the core or central processor which serves all of the terminals. If a user requests a different set of features, a craftsperson must access the core processor and make the necessary changes. Likewise, if new features become available, the craftsperson must access the core processor to install them.

The core processor is a critical part of such a system so any mistakes when making such alterations could have serious repercussions.

OBJECTS OF THE INVENTION

One object of the invention is to provide a telephone system wherein the functional advantages of key telephone systems and digital signal communications are co-existent via station or terminal apparatus connected to the system.

Another object of the invention is to provide for relocation and/or exchange of sets without necessarily involving administrative assistance by a craftsperson.

Yet another object of the invention is to provide for the changing of features without necessarily accessing a central or core processor.

Still another object of the invention is to give the user more control of the system's capabilities and effect a significant increase in the number of features made available to users of small telephone systems.

SUMMARY OF THE INVENTION

In essence, an example of the key telephone system includes a central unit (KSU), and a number of terminal apparatus or stations. Stations may be, but are not limited to be, telephone sets. Other forms of stations include data sets and interface units to C.O. trunks. A general purpose computer, for example a personal computer, may act as a station, with a suitable interface unit. Stations are connected to KSU ports using digital signals over twisted wire pairs. Some stations may physically be part of the KSU, and be connected thereto by means other than twisted pair. The KSU itself may include more than one physical unit.

A primary function of the key telephone system is to provide point to point communication between the stations, in the form of switched, bidirectional, 64 kb/s channels. In one example, each station has access to two such channels. Each station also has access to a 16 kb/s S and S channel used for system purposes such as signalling and supervision. Each station, and the KSU, contain some form of processing device, for example, a software controlled microprocessor, or a logic network. The S and S channel allows one station at a time to send a digitally encoded message to the KSU. More specifically, it allows the processing device at the station to send such a message to the processing device in the KSU. This reference to processing devices should be assumed wherever the action of a station or the KSU is mentioned. The S and S channel similarly allows the KSU to send a message to any one or more stations.

Each message is of a defined format. In this example there are two formats, each of which require control information. Depending on the control information in an incoming message to the KSU, the KSU may retransmit that message to stations as just described. Hence, a station may indirectly send a message to any other station or to all stations, by relying on this KSU operation.

The KSU operates in accordance with information contained in the messages, to set up and tear down 64 kb/s circuit connections between stations. Stations use such a connection for PCM voice, or for data, or as another means to exchange messages.

The operation of a station is controlled directly by the processing element at that station. The processing element runs a low level program, and may run higher level programs. The low level program controls indicators and other devices at the station, senses the state of input devices, and handles generation and interpretation of messages. A higher level of program may control the sequences of operation of the station, and co-operate with other higher level programs at other stations or in the KSU to provide desired operation of the key telephone system as a whole. The behaviour of a station is determined by the program running in that station, or by messages received from a program running in the KSU. The operation may be wholly or partially determined by a program running in some other station, including the case where that station is attached to or incorporates a general purpose digital computer.

Since the behaviour of a station may be determined by the program running in another station, it is possible to add new types of stations, as such become available, or to install new software in existing stations, to affect the behaviour of previously connected stations. Thus an added station may provide new features, possibly requiring novel sequences of keystrokes and display and indicator operation. The new feature is or may be made available at existing stations without reprogramming those stations or the KSU.

The added station providing the new feature may in fact be a reprogrammable device such as a personal computer. Thus new features may be added solely by software change or addition in an attached computer system, by techniques generally available, without participation of the key telephone system manufacturer or vendor. Of course, all of this extreme freedom of access to and control of the communication functions and features may be subjected to the typical security and priority fetters.

The invention is embodied in a key telephone system, for providing digital signal communication paths between a plurality of ports and for providing a signalling and supervision link between, any of said ports and a processing device in the key telephone system. The key telephone system includes communication paths being operable to provide n pairs of time division multiplex transmit (TDMT) and time division multiplex receive (TDMR) channels, each channel including a plurality of bit positions. At least one TDMT, TDMR channel pair is exclusively associated with each port. Each said TDMT channel and said TDMR channel includes a signalling and supervision (S and S) bit position, in said plurality of bit positions. A switching means is operable to provide communication paths between ones of the TDMT and TDMR channels, to the exclusion of said S and S bit positions, as directed by the processing device. An interface means, responsive to the processing device, transfers information from the S and S bit position of a selected TDMT channel to the processing device and transfers information from the processing device to the S and S bit position of at least one of the TDMR channels, independently of the communication paths provided by switching means.

A key telephone system, in accordance with the invention, comprises a plurality of ports for connection of any of a station apparatus and an interface apparatus, each apparatus including a processing device for controlling its functions. A synchronous communication medium provides at least one bidirectional communication channel and a message channel at each port. A synchronous switch means transfers information between selected ones of the bidirectional channels in response to control signals.

A central processor routinely identifies message channels from which a message from one of said processing devices is receivable, and in response to a received message, at least generates one of the control signals and at least one address for defining a message channel for which a message for a corresponding one of said processing devices is destined. An interface means identifies a request to send, in response to a first predetermined signal characteristic in one of the message channels, previously identified by the central processor, for soliciting and receiving said message. The interface means also transfers destined message to message channels as directed by the central processor.

The invention is also a method of operating a key telephone system having a central processor and a plurality of station apparatus, each of said station apparatus having a processing device for controlling functions of the station apparatus in response to key control action of a user origin and in response to message received via the central processor. The method comprising the steps of:

a) providing at least one bidirectional time division multiplex channel in association with each of the station apparatus;

b) providing at least one time division multiplex message channel in association with each of the station apparatus;

c) routinely selecting one of said station apparatus for transmission of a message via its associated message channel;

d) exchanging call set up messages between the central processor, a calling station apparatus and a called station apparatus; and e) in response to a predetermined message, from the called station apparatus synchronously exchanging information between the bidirectional time division multiplex channels associated with the calling and called station apparatus.

The invention is also a method of signalling and supervision communication in a telephone system having a central processor and a plurality of ports, each being available for connection of an apparatus thereto, each such apparatus including, a processing device for controlling functions of the apparatus, and an interface device for exchanging signals in an operating signal format of the port. The method comprises the steps of:

a) providing at least one time multiplexed message channel in association with each of the ports;

b) routinely selecting one of said apparatus for transmission of a signalling and or supervision message via its port associated message channel; and c) exchanging messages, in a predetermined one of a plurality of message protocols, between the central processor and said apparatus.

The invention is also a method of communicating signalling and supervision messages in stimulus and functional protocols in a telephone system having a central processor and a plurality of ports, each of the ports being available for connection of an apparatus, each apparatus including a processing device for controlling functions of the apparatus in response to reception of signalling and supervision messages in one of said stimulus and functional protocols, and an interface device for exchanging signals in an operating signal format of the port. The method comprises the steps of:

a) providing at least one time multiplexed message channel in association with each port;

b) routinely selecting one of said ports for transmission of a message from its associated apparatus, and in the central processor receiving a message, from the selected apparatus, said message being in one of said stimulus and functional protocols;

c) in the central processor, generating stimulus messages and functional messages;

d) transmitting each of said stimulus messages via a message channel associated with an apparatus for which the stimulus message is destined; and e) transmitting each of said functional messages via a plurality of message channels, at least one of which is associated with an apparatus to which the functional message is addressed.

Yet even further, the invention is a method of communicating signalling and supervision messages in stimulus and functional protocols in a telephone system having a central processor and a plurality of ports, each of the ports being available for connection of an apparatus, each apparatus including a processing device for controlling functions of the apparatus in response to reception of signalling and supervision messages in one of said stimulus and functional protocols, and an interface device for exchanging signals in an operating signal format of the port. The method comprises the steps of:

a) providing at least one time multiplexed message channel in association with each port;

b) routinely selecting one of said ports for transmission of a message from its associated apparatus, and in the central processor receiving a message, from the selected apparatus, said message being in one of said stimulus and functional protocols;

c) in the central processor, generating stimulus messages and functional messages;

d) transmitting each of said stimulus messages via a message channel associated with an apparatus for which the stimulus message is destined; and e) transmitting each of said functional messages from the central processor via each of the message channels.

This invention is also a method of operating a telephone system wherein signalling and supervision messages of higher and lower levels of protocol are exclusively compatible with functional terminal apparatus and stimulus terminal apparatus, respectively. The method comprises the steps of:

a) emulating a functional terminal on behalf of each stimulus terminal apparatus connected to the telephone system;

b) exchanging signalling and supervision messages of the lower level protocol exclusively between step a) and a calling or a called one of the stimulus terminal apparatus; and c) relaying an incoming signalling and supervision message of the higher level protocol to each of the terminal apparatus with an exception being that of performing step a) on behalf of a stimulus terminal for which said higher level protocol signalling and supervision message includes information.

Furthermore, the invention is a method of utilizing a feature apparatus in a telephone system having a central processor and a plurality of ports, each of the ports being available for connection of an apparatus thereto, each such apparatus including a processing device for controlling functions of the apparatus, and an interface device for exchanging signals in an operating signal format of the port. The method comprises the steps of:

a) providing a plurality of said apparatus being connected at a corresponding plurality of said ports, at least one of said apparatus being a telephone station apparatus and another of the apparatus being said feature apparatus;

b) providing at least one time multiplexed message channel in association with each of the ports;

c) routinely selecting one of said apparatus for transmission of a signalling and or supervision message via its port associated message channel; and d) in response to a feature request action of a user at said telephone station apparatus, exchanging signalling and supervision messages between said telephone station apparatus, said feature apparatus and said central processor whereby said feature is provided by said feature apparatus on behalf of said telephone station apparatus.

According to another aspect, the invention provides a telephone system having a central processor and a plurality of ports, each of said ports having connected thereto an apparatus including a processing device for controlling functions of the apparatus and an interface device for exchanging signals in an operating signal format of the port, at least one of said apparatus being a telephone station apparatus and another of said apparatus being a feature host apparatus, said telephone station apparatus having a plurality of functions stored therein and said feature host apparatus having a plurality of feature modules stored therein, each such feature module comprising instructions for controlling an exchange of signalling and supervision messages between said feature host apparatus and said telephone station apparatus so as to invoke a predetermined group of said functions in said telephone station apparatus and provide thereby a selected one of said features in response to a feature request action of a user at said telephone station apparatus.

According to another aspect of the invention, there is provided telephone station apparatus for use in a telephone system having a central processor and a plurality of ports. Each of said ports has connected thereto an apparatus including a processing device for controlling functions of the apparatus and an interface device for exchanging signals in an operating signal format of the port. At least one of said apparatus comprises a feature host apparatus having a plurality of feature modules stored therein, each such feature module comprising instructions for controlling an exchange of signalling and supervision messages between said feature host apparatus and said telephone station apparatus so as to invoke a predetermined group of functions in said telephone station apparatus and provide thereby a selected one of said features in response to a feature request action of a user at said telephone station apparatus. Said telephone station apparatus comprises storage means for storing a plurality of said functions, and fucntion selector means operable to invoke said stored functions selectively in response to said signals from said feature host.

Yet further, an aspect of the invention comprises feature host apparatus for use in a telephone system having a central processor and a plurality of ports, each of said ports having connected thereto an apparatus including a processing device for controlling functions of the apparatus and an interface device for exchanging signals in an operating signal format of the port, at least one of said apparatus being a telephone station apparatus having a plurality of functions and function selector means for selectively invoking a predetermined group of said functions thereby to provide a selected one of said features in response to a feature request action of a user at said telephone station apparatus. Said feature host apparatus comprises a plurality of feature modules stored therein, each such feature module comprising instructions for controlling an exchange of signalling and supervision messages between said feature host apparatus.

Yet further, the invention is a method of relocating an apparatus being connected at one port to another port in a telephone system, the telephone system having a central processor and a plurality of said ports, each of the ports being available for connection of an apparatus thereto, each such apparatus including a processing device for controlling functions of the apparatus and an interface device for exchanging signals in an operating signal format of the port. The method comprises the steps of:

a) providing at least one time multiplexed message channel in association with each of the ports;

b) routinely selecting each of said ports for transmission of a signalling and supervision message from any of said apparatus connected thereto;

c) at each port connected apparatus, in response to a first occurrence of step b) transmitting a signalling and supervision message including an identifier unique to said connected apparatus and an identifier unique to a predetermined type of said connected apparatus;

d) in at least one location in the telephone system, maintaining a record of default features and characteristics of a plurality of predetermined types of apparatus connectable at ports of the telephone system;

e) in at least one location in the telephone system, and via said message channels generating and maintaining a record of port location, features, characteristics said unique identifier and said type identifier in association with each said port connected apparatus;

f) in response to an occurrence of step c) and in the event that said unique identifier differs from that associated with any of said ports, performing one of, i) downloading said characteristics and features to the instant port connected apparatus in the event that said type identifier corresponds to the type identifier which was made of record in step e), and in step e) altering the record of the unique identifier to correspond to the unique identifier of the instant port connected apparatus, and ii) downloading type default features and characteristic, maintained in step d), and corresponding to the type identifier of the instant port connected apparatus, in the event that the type identifier differs from that which was made of record in step e), and in step e) altering the record of the unique identifier and the type identifier to correspond to those of the instant port connected apparatus;

whereby one port connected apparatus may be replaced by another apparatus and be automatically operable in the telephone system.

Yet even further, the invention is a method of communicating signalling and supervision messages in stimulus and functional protocols in a telephone system having a central processor and a plurality of ports, each of the ports being available for connection of an apparatus, each apparatus including a processing device for controlling functions of the apparatus in response to reception of signalling and supervision messages in one of said stimulus and functional protocols, and an interface device for exchanging signals in an operating signal format of the port. The method comprises the steps of:

a) providing at least one time multiplexed message channel in association with each port;

b) routinely selecting one of said ports for transmission of a message from its associated apparatus, and in the central processor receiving a message, from the selected apparatus, said message being in one of said stimulus and functional protocols;

c) in the central processor, generating stimulus messages and functional messages;

d) transmitting each of said stimulus messages via a message channel associated with an apparatus for which the stimulus message is destined; and e) transmitting each of said functional messages from the central processor via each of the message channels.

According to yet another aspect of the present invention, a telecommunications system comprises a plurality of ports connected to a central processing means, each port being adapted to have a terminal apparatus releasably connected thereto, each such terminal apparatus having an identifier that is unique within such system and interface means operative on initial connection of said terminal apparatus to a port for transmitting such identifier to said central processing means, said central processing means having storage means for storing each said identifier together with administrative data specific to said terminal apparatus, and the number of the port to which said terminal apparatus set is connected, means for detecting a said identifier in a signal from a terminal apparatus, and means for updating said storage means to assign said administrative data corresponding to said identifier to the present port.

An advantage of such an arrangement is that relocation of a set can be effected automatically, in which case said updating means will be operative to delete the identifier record at the vacated port and assign it to the new port.

In order to provide for replacement of the terminal apparatus, rather than relocation, the central processing means may have means for verifying that the identifier is not recorded in the storage means, and assigning the administrative data of the old terminal apparatus to the new apparatus. This presumes that the new terminal apparatus is of the same type as the old terminal apparatus. The central processing means may also have means for assigning a default administrative profile to a replacement terminal apparatus of a different kind.

According to a further aspect of the invention, a method of operating a telecommunications system comprising a plurality of ports connected to a common central processing means, each port being adapted to have a terminal apparatus releasably connected thereto, each such terminal apparatus having an identifier that is unique within such system, said central processing means having storage means for storing each said identifier together with administrative data specific to such terminal apparatus and a physical address of said terminal apparatus, such method comprising the steps of detecting initial connection of said terminal apparatus to a port, transmitting such identifier to said central processing means, detecting said identifier in the signal at the central processing means, and updating said storage means to associate said administrative data specific to said terminal apparatus with its said identifier in said storage means.

According to still another aspect of the invention, terminal apparatus for a telecommunications system comprises a plurality of ports connected to a common central processing means. Each port is adapted to have such a terminal apparatus releasably connected thereto. Each said terminal apparatus has an identifier that is unique within such system and interface means operative in dependence upon initial connection of said terminal apparatus to a port to transmit such identifier to said central processing means.

Said processing means may then comprise means for transmitting to said terminal apparatus a message containing a logical address, for example a prime directory number (PDN). The terminal apparatus comprises a register or other suitable means for storing such a logical address for inclusion in subsequent messages.

According to yet another aspect of the invention, terminal apparatus for a telecommunications system as defined above has an identifier that is unique within such system and interface means operative in dependence upon initial connection of said terminal apparatus to a port to transmit such identifier to said central processing means.

Where said central processing means comprises means for transmitting to said terminal apparatus a message containing a logical address, for example a prime directory number, said terminal apparatus may comprise means for storing such logical address for inclusion in subsequent messages.

According to another aspect of the invention, terminal apparatus for connection to a terminal emulator means in a telecommunications system as aforementioned, wherein at least one said port has a terminal emulator connected thereto, has an identifier that is unique within the system and interface means operative in dependence upon initial connection of said terminal apparatus to a port to send a first signal to said terminal emulator means and, in response to a subsequent signal or signals from said terminal emulator means to transmit to said terminal emulator means said identifier for transmission by said terminal emulator means to said central processing means.

In this specification the term "logical address" is used to mean a unique address which is assigned to a particular terminal and does not change when the terminal is relocated. Preferably the logical address is associated with the user, for example a prime directory number. The term physical "address", however, is used for an address which is unique to each port. Hence when a terminal is relocated, it has a new physical address. Its primary use is to facilitate the establishing of a communications channel within the system.

BRIEF DESCRIPTION OF THE DRAWINGS

Embodiments of the invention will now be described, by way of example only, with reference to the accompanying drawings, in which:

FIG. 19A and 19B illustrate the manipulation of the stored data following relocation or replacement;

DESCRIPTION OF THE PREFERRED EMBODIMENT

Figure 1:
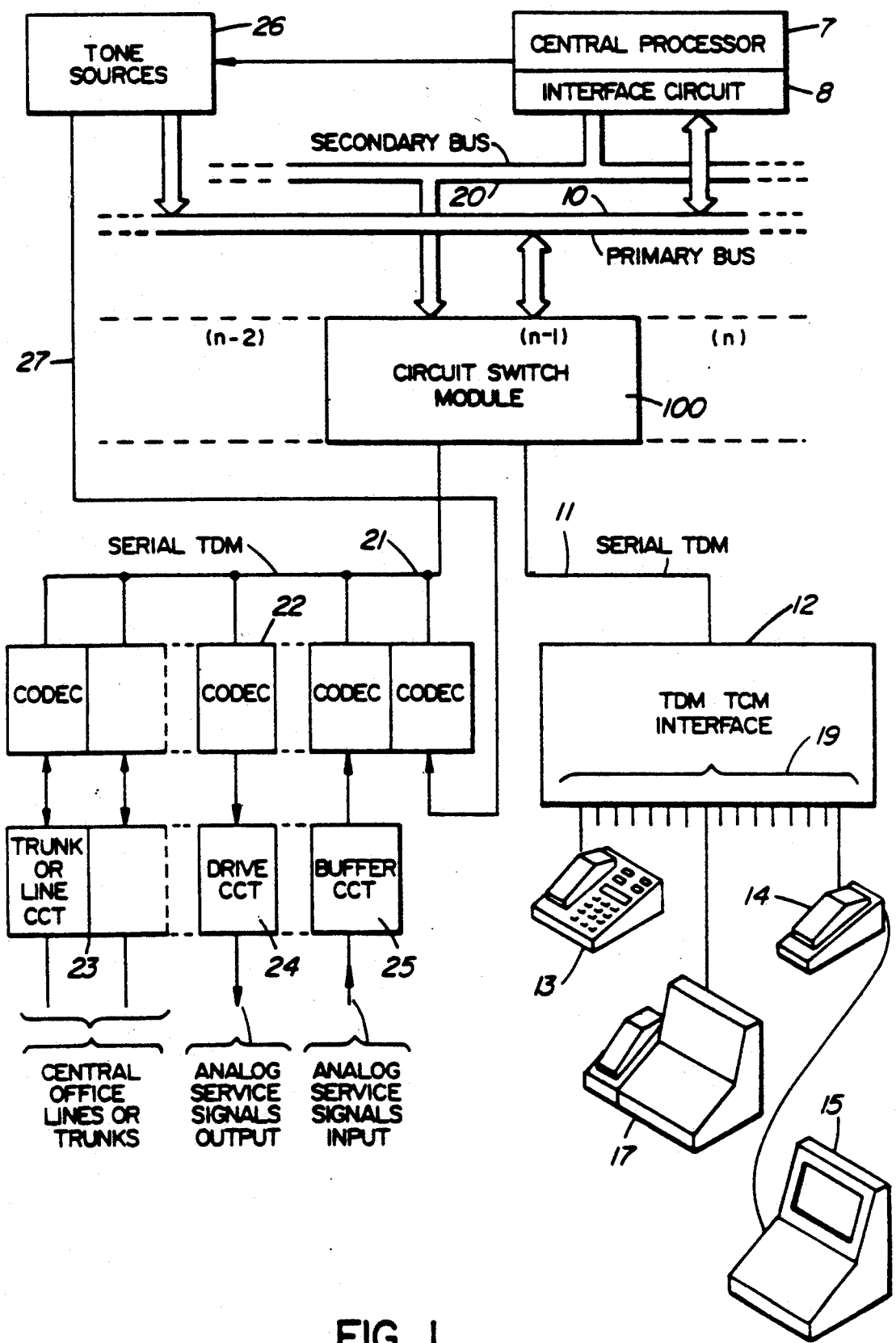
FIG. 1 is a block diagram of a key telephone system in accordance with the invention.

In FIG. 1 a digital key telephone system provides for connection of various digital telephone instruments, as exemplified at 13 and 14, and various digital data terminals, personal computers or the like, as exemplified at 15 and 17, which are able to communicate, via the system, with one another as appropriate, and with other devices via line or trunk circuits 23. The lines and or trunks serve to connect the digital key telephone system with other telephone facilities, for example a central office or private exchange (not shown). A back bone of the digital key telephone system is provided by a short parallel time division multiplex (TDM) bus 10, which provides a wide band communication path between up to nine 64 channel circuit switch modules 100, a central processor interface circuit 8 and tone sources 26. If any of the tone sources 26 provide an analog signal, such is coupled into the system via a lead 27. The bus 10 is referred to as a primary bus, and a secondary bus 20, similar to the primary bus 10, provides for unidirectional communications from the interface circuit 8. Each of the circuit switch modules 100 couples 64 ten bit transmit serial channels to predetermined corresponding time slots in the bus 10, and up to 64 parallel selected TDM time slots on either of the buses 10 or 20 to 64 ten bit receive serial channels. Thirtytwo of the serial transmit and receive channels are coupled to an internal ports circuit 12 via a serial TDM path 11. The remaining thirtytwo serial transmit and receive channels are coupled to external port circuits at 22 via a serial TDM path 21.

Each of the channels is capable of transmitting a binary signal pulse stream at a rate of 80 kilo bits per second, with at least 64 kilo bits per second being available as a channel for pulse code modulated (PCM) voice information, or data information. The remaining sixteen kilobits may be committed to supervisory and signalling communications, in association with the PCM or data information. In this example the internal ports circuit 12 consists of sixteen TDM time compression multiplex (TCM) interfaces. The TCM method of signal transmission is sometimes referred to as "Ping Pong" transmission. Each of these interfaces provides a transmit path between each of TCM links 19 and two predetermined and fixed serial TDM channels in the serial TDM path 11. In a similar manner analog signals are interfaced to and from various circuits shown at 23, 24 and 25, via the serial TDM path 21 and the external ports 22 provided by CODEC circuits. Alternatively, it may be advantageous to provide an external TDM port for interfacing with another telephone facility via a digital signal transmission link, T1 or DS30 for example. However, in this case, each CODEC circuit interfaces with a predetermined and fixed transmit and receive channel pair of the serial TDM path 21. Hence, for each and every port (that is a place where a digital telephone instrument or other digital device or a digitally interfaced or compatible line, trunk and the like may be connected to the digital key telephone system), there is at least one predetermined ten bit parallel time slot in the primary bus 10 which is allocated to receive information from such device, line or trunk. In an alternative example, the time slots on the bus 10 correspond to such device, line or trunk for the purpose of transmitting information thereto. However, such alternative example is not herein further discussed.

A central processor 7 is coupled via the interface circuit 8 to the primary bus 10 for communication via a predetermined thirtytwo of the ten bit parallel time slots. The interface circuit 8 may receive all ten bits of each time slot on the bus 10. Normally, only the two bits corresponding to a sixteen kilobit sub-channel are transferred from the bus 10 to the central processor 7 by the interface circuit 8, for purposes of call control. The interface circuit 8 provides signalling and supervision from the central processor 7 via the secondary bus 20 at time slot occurrences corresponding to intended line appearance destinations via the appropriate circuit switch module 100. Therefore each circuit switch module 100 transmits 10 bits to the primary bus 10 but receives and switches only 8 bits from the primary bus 10. The other two bits are received at the appropriate time via the secondary bus 20.

In this example, each port associated communication path provides for full duplex operation with two words, of ten bits each, being exchanged every 125 micro seconds. In at least one of these words, bit positions 0-7 are dedicated to one of data or voice, the bit position 8 is dedicated to signalling and supervision, and the bit position 9 is dedicated to validation of signalling and supervision. The signalling and supervision information is collected from, and distributed to, the port associated channels via the interface circuit 8 under the direction of the central processor 7. The collected information is gathered into byte groupings by the interface circuit 8 for transfer to the central processor 7 and by a somewhat complementary function, information is distributed from the central processor 7, via the interface circuit 8 into bit position 8 of a selected one of the channels or of all the channels.

The key telephone system is intended to support two generically different types of station apparatus: one being a very basic telephone station set hereafter referred to as a STIMULUS set or an S set, which includes a bit stream interface device, a simple processing device, and a CODEC; and the other being a more complex featured autonomous station apparatus which may take the form of a proprietary key telephone set, interface apparatus, or proprietary display telephone or data terminal. Such instrument is referred to as a FUNCTIONAL set and such reference is intended to indicate that the apparatus contains some call processing instructions in the form of software or firmware. For convenience, any station apparatus which is not an S set is hereafter referred to as a FUNCTIONAL set or an F set.

In the S set, any change in its operating state, for example ON HOOK to OFF HOOK or a key depression, is communicated to the central processor 7 via the S set processing device, the bit position 8 and the interface device. This is accomplished in the S set by a continuous (request to send RTS) assertion of "00" in the bit position 8 and 9 of the outgoing channel, until a validated clear to send (CTS) is received in bit positions 8 and 9 of the incoming channel. When the CTS is recognized in the S set a STIMULUS protocol message indicating OFF HOOK is transmitted via the S and S bit positions 8. Thereafter, a typical call progress proceeds by way of exchange of STIMULUS protocol messages.

By way of exemplary contrast in the F set, a request to send (RTS) may be generated after an OFF HOOK is followed by sufficient telephone call dialling information having been keyed in by a telephone user. In this case the processing device and its operational programming perform basic call processing and, in addition to providing dial tone at the appropriate moment, may also generate ring back or busy tone. The F set communicates in a similar manner to the S set, using the S and S bit positions 8. After a CTS is received from the central processor the F set transmits a FUNCTIONAL protocol message.

Table 1 illustrates structural arrangements of messages of STIMULUS protocol and FUNCTIONAL protocol in the KSU-to-terminal direction.

TABLE 1

| HEADER Binary | (HEX) | TYPE | LENGTH |
|---|---|---|---|
| 0X000000 to 0X011111 | (40H) to (5FH) | STIMULUS | 1 BYTE |
| 0X100000 to 0X100111 | (60H) to (67H) | STIMULUS | 2 BYTES |
| 0X101000 to 0X101111 | (68H) to (6FH) | STIMULUS | MULTI-BYTE |
| 0X110000 to 0X111111 | (70H) to (7FH) | FUNCTIONAL | VARIABLE |

In the header, bit positions left to right are 7 through 0. In particular, bit positions 5 and 4 indicate the protocol of the message. FUNCTIONAL messages in this arrangement are indicated by both of the bit positions 5 and 4 being asserted "1". STIMULUS MESSAGES are indicated by at least one of the bit positions 5 and 4 being asserted "0". The purpose of each of the bit positions in the header is illustrated in Table 2.

TABLE 2

| BIT | 7 | 6 | 5 | 4 | 3 | 2 | 1 | 0 |
|---|---|---|---|---|---|---|---|---|
| PURPOSE | START | CLEAR TO SEND | PROTOCOL | | SECONDARY INFORMATION | | | |

In the case of a header being in a range of 40H-5FH, the header is the actual message, the gist of which is carried in the bit positions 3-0. In messages of more than one byte, the second and subsequent bytes carry information. The quantity or number of the information bytes within a message are specified in lesser significant bit positions of the header.

The CTS bit position indicates a clear to send message and is only of significance when received by an F set or an S set.

Table 3 illustrates the structural arrangements of messages of stimulus and functional protocol in the terminal-to-KSU direction. In this direction, bit 7 is a start bit with value 1, as shown in Table 4.

TABLE 3

| Header Binary | (Hex) | Type | Length |
|---|---|---|---|
| 1000 0000 to 1101 1111 | (80H) to (DFH) | Stimulus | 1 byte |
| 1110 0000 to 1110 0111 | (E0H) to (E7H) | Stimulus | 2 bytes |
| 1110 0000 to 1110 1111 | (E0H) to (EFH) | Stimulus | multibyte |
| 1111 0000 to 1111 1111 | (F0H) to (FFH) | Functional | variable |

TABLE 4

| BIT | 7 | 6 | 5 | 4 | 3 | 2 | 1 | 0 |
|---|---|---|---|---|---|---|---|---|
| PURPOSE | start | | protocol | | secondary information | | | |

There is no CTS bit in this direction, since the KSU 40 does not wait for acknowledgement from the terminal when transmitting a message to it. Message flow control is only for signalling messages sent from the terminal to the KSU 40.

Figure 2:
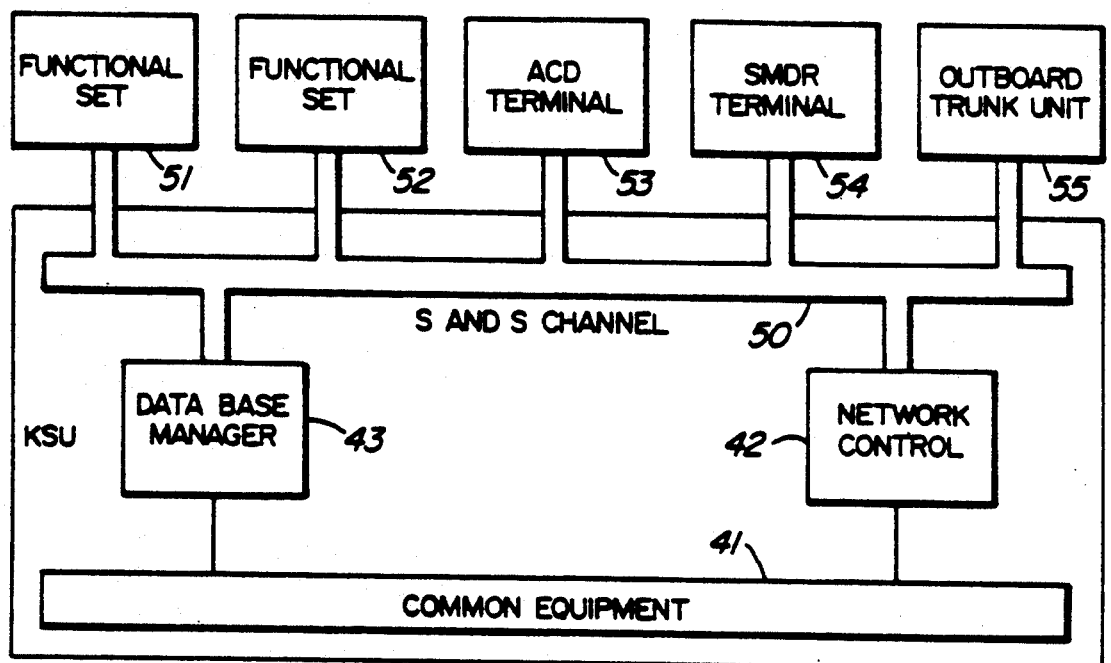
FIG. 2 is a block diagram of a software architecture for supporting FUNCTIONAL station or terminal apparatus in the key telephone system in FIG. 1.
Figure 3:
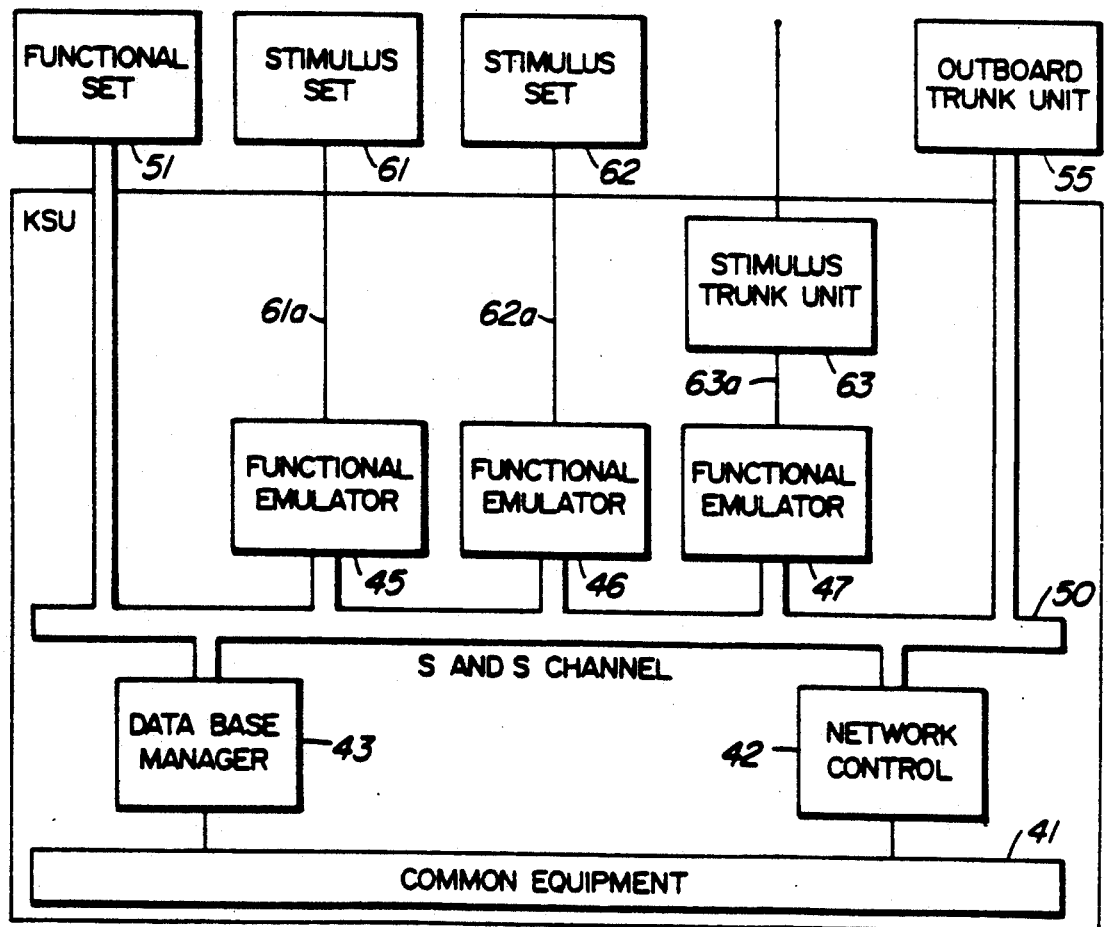
FIG. 3 is a block diagram of a software architecture similar to the software architecture illustrated in FIG. 2, but with an added capability of supporting STIMULUS station apparatus as well as the FUNCTIONAL station apparatus.

Plural protocols and central processor flow control of messages, communicated via the S and S bit positions, permit advantageous software architectures as illustrated in FIG. 2 and 3, to be resident in a key telephone system as shown in FIG. 1. In FIG. 2, a key system unit (KSU) 40 includes common equipment 41 coupled with an S and S channel 50 via software elements, namely a network controller 42 and a data base manager 43. The common equipment 41 is in effect representative of a hardware interface with the buses 10 and 20 in FIG. 1 but also includes firmware and software resident in the central processor 7. In this example, the central processor 7 is provided by a 68008 microprocessor available from Motorola Corp., of 1303 East Algonquin Road, Roselle, Illinois, 60196, U.S.A. The central processor 7 is arranged to support modularized software elements such as the elements 42 and 43.

The S and S channel is a message channel which is in operational effect common to all the FUNCTION station apparatus of the system. Exemplified are F sets 51 and 52, an automatic call distribution (ACD) terminal 53, a system management data retrieval (SMDR) terminal 54 and an outboard trunk unit 55 for connection to a central office (not shown). Each of these is a FUNCTIONAL apparatus which includes its own processing device and call processing software.

FIG. 3 illustrates an example of an architecture configured similarly to FIG. 2, but for supporting STIMULUS sets in addition to FUNCTIONAL sets. In this case, the common equipment 41 also supports additional modular software in the form of FUNCTIONAL emulators 45, 46 and 47. These FUNCTIONAL emulators perform, on behalf of respective STIMULUS sets 61 and 62, and a STIMULUS trunk unit 63, to make these appear to the rest of the key telephone system to also be FUNCTIONAL sets. Hence, in some system configurations, economy on a per port basis is achieved. It should be noted that FUNCTIONAL elements 52-54 may also be present in FIG. 3 but were omitted for convenience of illustration.

In operation of the key telephone systems in accordance with FIG. 2 or 3, any F set receiving a CTS message is able to transmit to all FUNCTIONAL entities, be these apparatus or emulators. Likewise, F emulators are able to transmit to all FUNCTIONAL entities but as the F emulators are software based in the KSU 40, the previously discussed arbitration ritual of RTS and CTS is not required. Any FUNCTIONAL entity which may thus respond or act in accordance with its own programming as warranted by the content of the transmitted FUNCTIONAL message. Any such FUNCTIONAL message involving a STIMULUS set is intercepted and subsequently acted upon by the corresponding FUNCTIONAL emulator software module. This effectively results in a series of STIMULUS messages being exchanged between the FUNCTIONAL emulator and its associated STIMULUS set via its S and S channel. For example, S set 61 and emulator 45 exchange messages via an S and S channel 61a.

In FUNCTIONAL messaging the message bits are distributed or relayed to every channel occurrence in each frame. Although STIMULUS sets or units are thus exposed to the FUNCTIONAL messages, the STIMULUS processor devices therein are arranged to disregard FUNCTIONAL messages as recognized by the distinct header as illustrated in the foregoing tables 1 and 2. On the other hand, STIMULUS messages are unidirectional. Distribution of a STIMULUS message is confined to the channel occurrence which corresponds to a STIMULUS set for which the STIMULUS message is destined.

Flow control of FUNCTIONAL and STIMULUS messages is discussed from a hardware viewpoint after the following discussion of the structure and operation of the modular circuit switch module 100 with reference to FIGS. 4-10.

Figure 4:
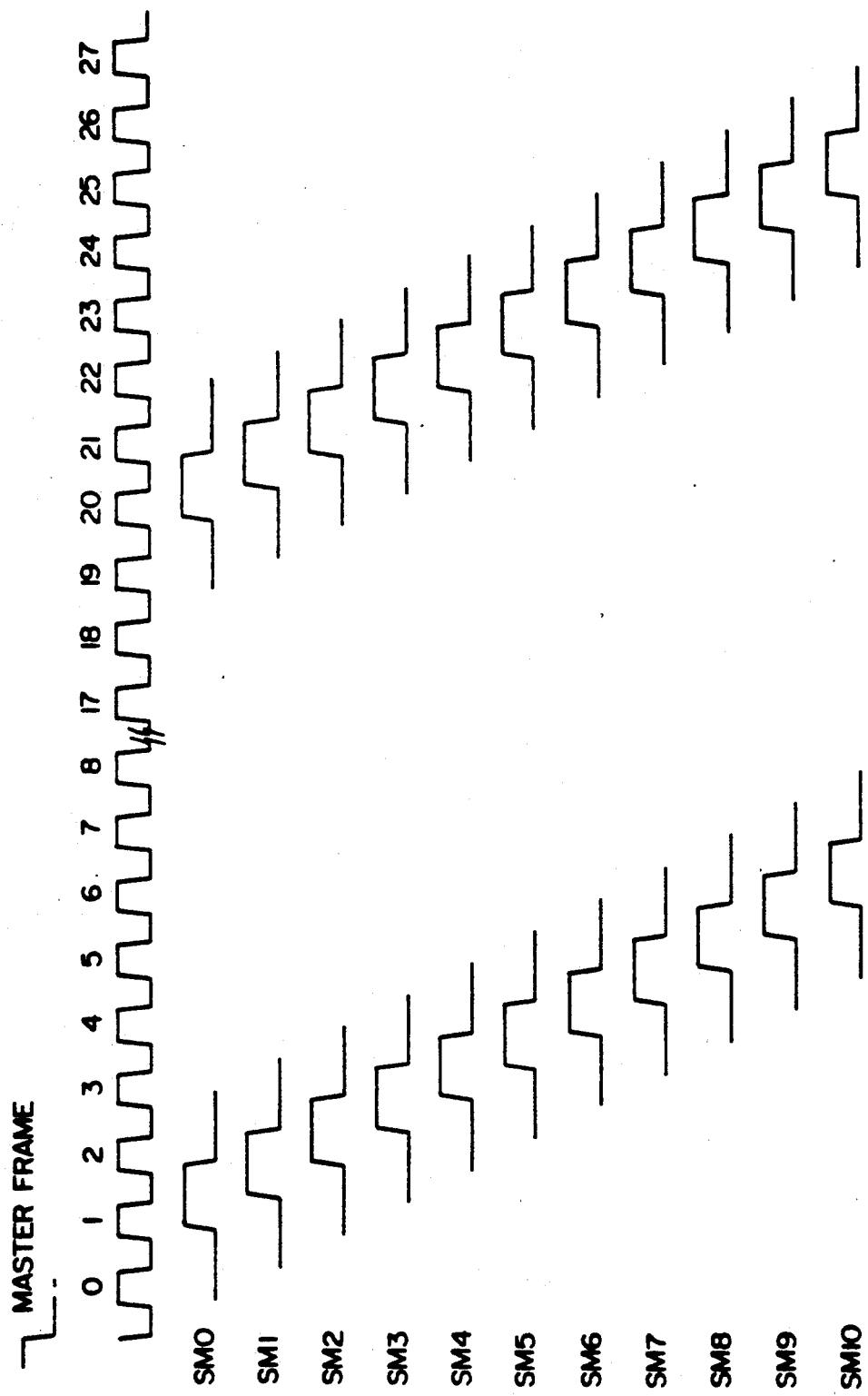
FIG. 4 is a graphical illustration of operating timing pulses and or signals generated within a circuit switch module used in FIG. 1.
Figure 5:
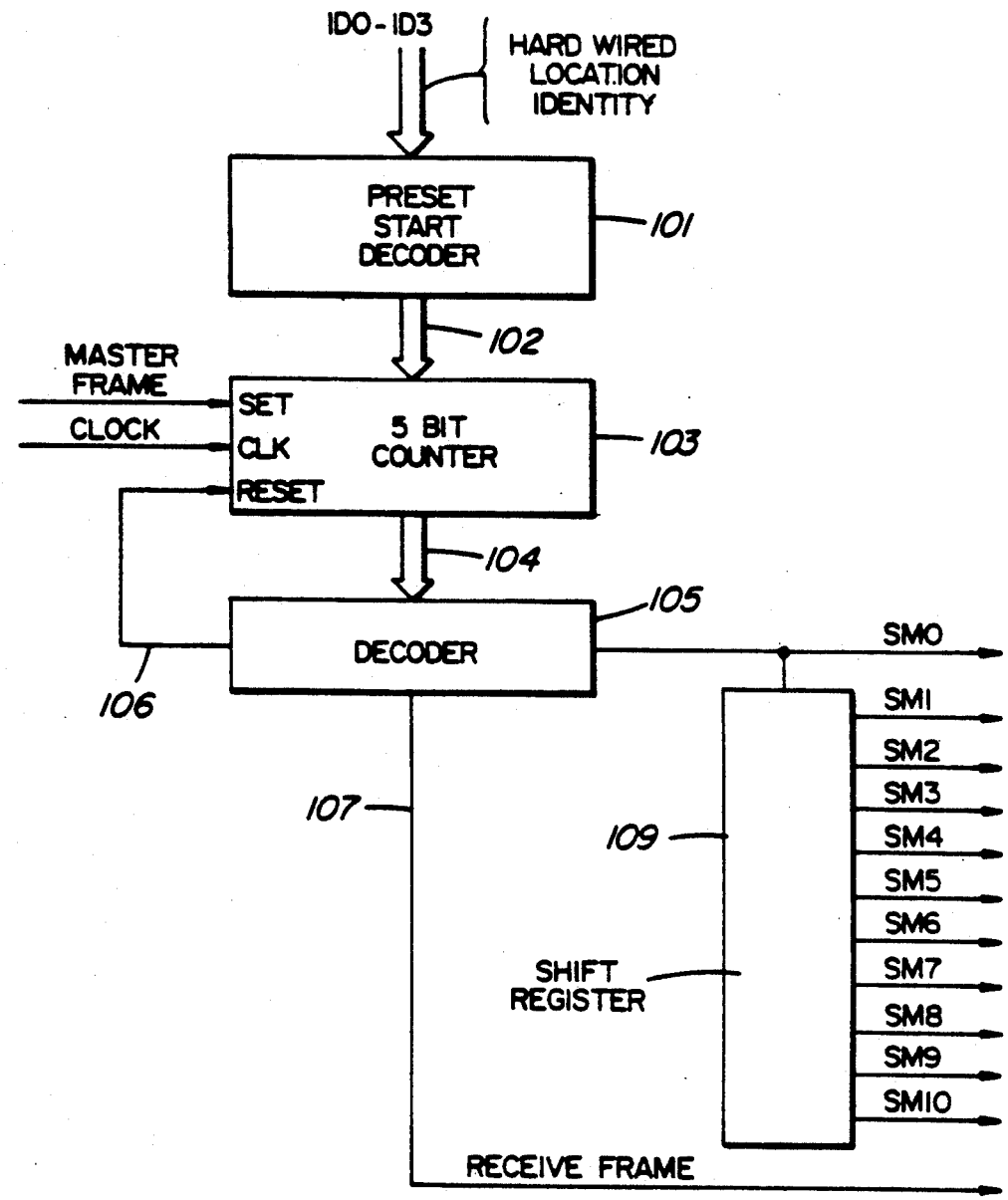
FIG. 5 is a block diagram of a timing sequence generator used in the circuit switch module for providing the timing signals illustrated in FIG. 4.

In order that each of one or more circuit switch modules 100 be able to transfer information from the serial TDM paths 11 and 21 to the parallel TDM bus 10 without contention, a phased timing sequencer, as shown in FIG. 5, resides within each of the modules 100 for regulating the functions of the module. Wave forms exemplified in FIG. 4 illustrate a master frame timing pulse occurring at a rate of 1 Khz, clock pulses numbered 0-27 occurring at a rate of 5.12 MHz and state machine timing pulses SMO-SM10. With the switch module 100 installed in the system, a preset start decoder 101 is connected to a hard wired location, not shown, which provides an identity, that is a fixed four bit binary work, IDO-ID3. The combination of the signal states of the bits IDO-ID3 is unique for each possible switch module location in the digital key telephone system. The preset start decoder 101 generates a 5 bit binary word on a bus 102, in response to the combination of bit states as shown in table 1. A five bit counter 103 is preset by each occurrence of the master frame pulse, to correspond to the word on the bus 102 and thereafter is incremented with each occurrence of a clock pulse. An output 104 of the counter 103 is decoded by a decoder 105 which generates a reset signal on a lead 106 with each occurrence of a count of 19 in the counter 103. Thus with the occurrence of the next clock pulse, the counter 103 is reset to a count of zero. Thus a modulo 20 counting function is provided, which is phased as is illustrated in table 5.

TABLE 5

| CIRCUIT SWITCH MODULE | ID3 | ID2 | ID1 | ID0 | PRESET VALUE OF BUS 102 | TDM-11 FRAME AND TIME SLOT CORRESPONDENCE | TDM-21 FRAME AND TIME SLOT CORRESPONDENCE |
|---|---|---|---|---|---|---|---|
| 0 | 0 | 0 | 0 | 0 | 18 | 0 | 2 |
| 1 | 0 | 0 | 0 | 1 | 17 | 1 | 3 |
| 2 | 0 | 0 | 1 | 0 | 14 | 4 | 6 |
| 3 | 0 | 0 | 1 | 1 | 13 | 5 | 7 |
| 4 | 0 | 1 | 0 | 0 | 10 | 8 | 10 |
| 5 | 0 | 1 | 0 | 1 | 9 | 9 | 11 |
| 6 | 0 | 1 | 1 | 0 | 6 | 12 | 14 |
| 7 | 0 | 1 | 1 | 1 | 5 | 13 | 15 |
| 8 | 1 | 0 | 0 | 0 | 2 | 16 | 18 |

In accordance with the table, for example for the circuit switch module 0, the channel zero on the serial TDM path 11 is inserted onto the parallel TDM bus 10 in time slot zero, channel one in time slot 20 and so on until the last channel, channel 31, of a serial TDM frame is inserted into time slot 620.

Stated in other terms, each TDM path has 32 parallel ten bit receiving channels assigned to it on the primary bus 10, and each of these channels is separated from the other by 19 other channel occurrences.

The decoder 105 also generates an SM0 timing pulse, coincident with the count of 19 occurring in the counter 103. A shift register 109 responds to the SM0 timing pulse and the clock pulses to generate additional timing pulses SM1-SM10 as illustrated in FIG. 4.

Figure 6:
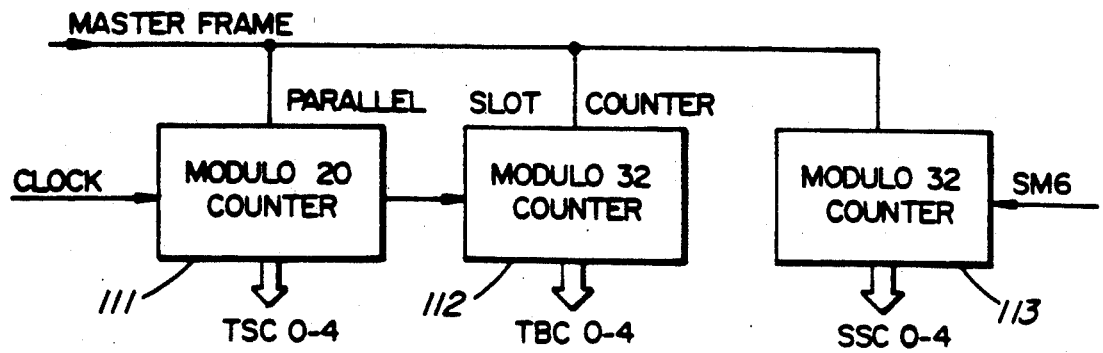
FIG. 6 is a block schematic diagram of counters, used in a circuit switch module in FIG. 1, and arranged to provide time slot and channel addresses for operation of the circuit switch module.

Referring to FIG. 6, the time slot occurrences on the parallel TDM bus 10 are tracked by a parallel slot counter which includes a modulo 20 counter 111 and a modulo 32 counter 112. The counter 111 responds to the 5.12 MHz clock pulses to provide repetitive counts of 0 through 19 on five time slot count leads TSC 0–4. The counter 112 is incremented with each reset occurrence in the counter 111 to provide repetitive counts of 0 through 31 on five time block count leads TBC 0–4, whereby in combination binary signals on the TSC and TBC leads define 640 parallel time slot addresses per frame. A serial channel counter function is provided by a counter 113 which provides 32 channel counter addresses on serial channel count leads SCC 0–4 to define channel occurrences in the serial TDM paths 11 and 21. The counter 113 is incremented with each time block occurrence as indicated by the timing pulse SM6. All of the counters 111, 112 and 113 are reset with each occurrence of the master frame pulse.

Figure 7:
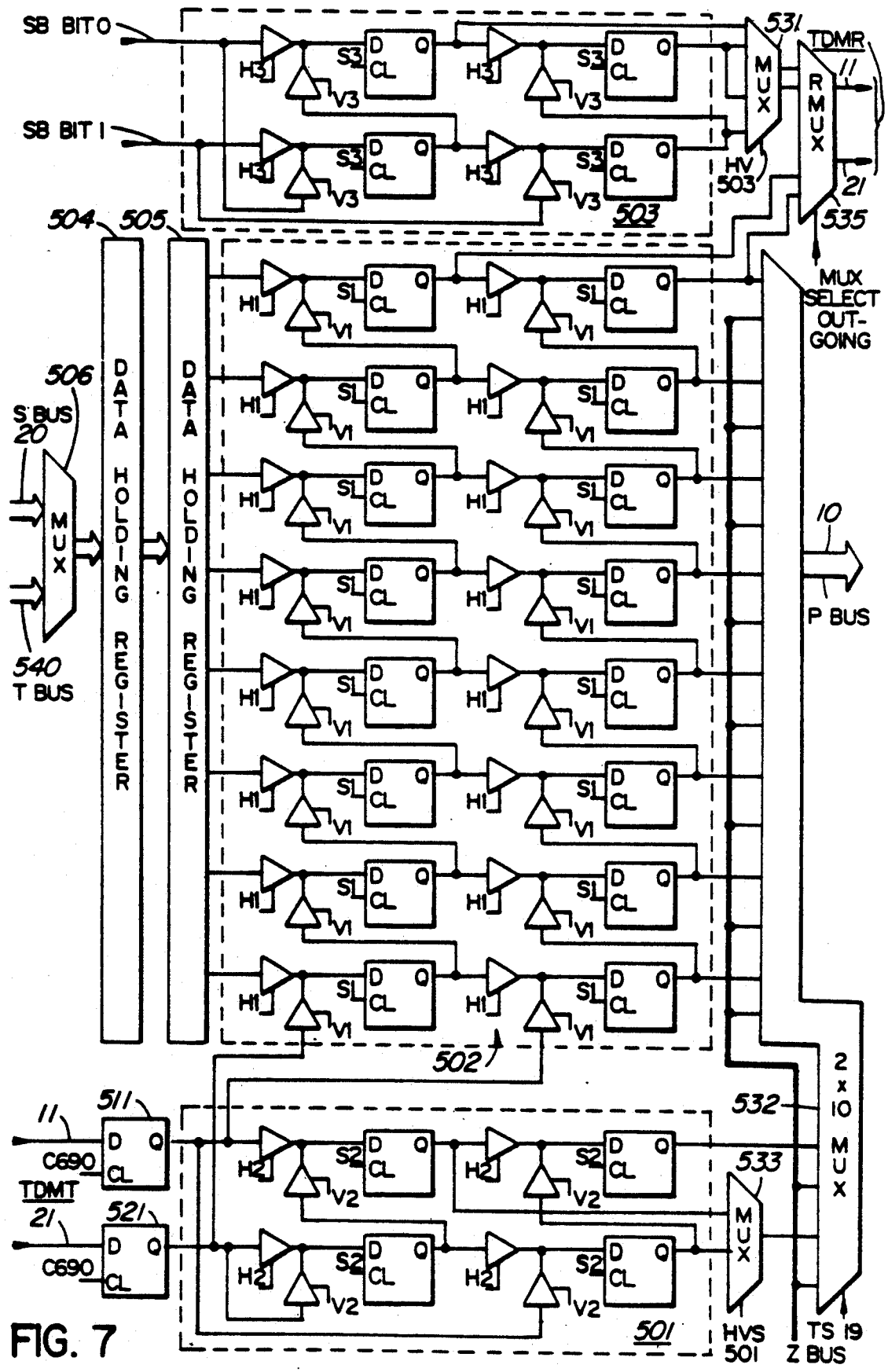
FIG. 7 is a block schematic diagram of a converter circuit used in the circuit switch module in FIG. 1.

The converter circuit illustrated in FIG. 7 resides within the circuit switch module 100 and performs both serial to parallel conversions and parallel to serial conversions for each of the 64 TDMT and the 64 TDMR channels on the TDM paths 11 and 21. As before mentioned, the TDMT channels are incoming and carry data or voice, plus signalling bits orginating at the terminal instruments, while the corresponding TDMR channels are outgoing, each to the originating terminal instrument. Each incoming time slot includes 10 binary bits which are converted directly to parallel form and asserted during the predetermined time slot interval on the primary bus 10. Each outgoing time slot includes 10 binary bits which are obtained from one of two sources: one source being a corresponding time slot interval on the secondary bus 20; the other source being 8 bits from any time slot interval on the primary bus 10, the 8 bits having traversed the time switch, plus 2 bits from the time slot interval on the secondary bus 20 corresponding to the TDMR channel occurrence.

Figure 8:
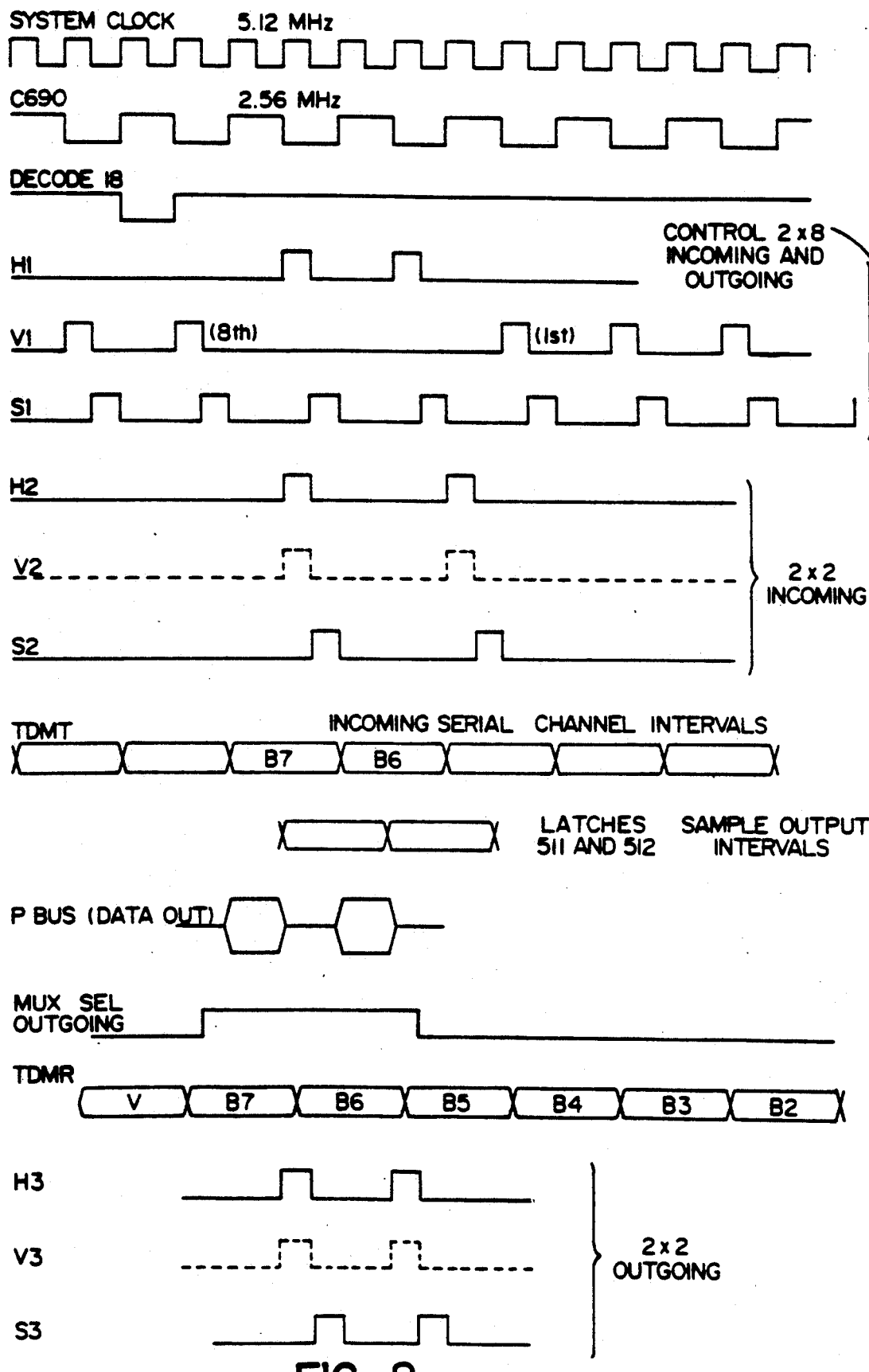
FIG. 8 is a graphical illustration of timing signals used in the operation of the converter circuit in FIG. 7.

The converter circuit is discussed in more detail with reference to the timing signals illustrated in FIG. 8. A SYSTEM CLOCK waveform shown at the top of FIG. 8, and some of the other waveforms in FIG. 8, are idealistically depicted for convenience as having vertical rise and fall portions. Actually, in practice these waveforms have sloped rise and fall portions similar to those waveforms illustrated in FIG. 4, which are more realistically depicted. The converter circuit, in FIG. 7, includes three orthogonal shift registers shown at 501, 502 and 503 respectively. These three registers perform the required serial to parallel, and parallel to serial conversions. Each of the orthogonal shift registers 501, 502 and 503 is associated with a clock generator, not shown, which produces non-overlapping timing signals, illustrated in FIG. 8, for shifting and directional control. Vertical directional control signals V1, V2 and V3 are used to vertically direct shift functions of the register 502, 501 and 503 respectively. Horizontal directional control signals H1, H2 and H3 are used to horizontally direct shift functions of the registers 502, 501 and 503. The actual loading of D type flip flop elements in the registers 502, 501 and 503 is clocked by signal pulses S1, S2 and S3. The control signals V2 and V3 are shown in broken line to indicate that these signal pulses are 20 system clock periods removed from the adjacent H2 and H3 signal pulses, such that each commences at 40 system clock intervals. Bits of the TDMR serial bit streams are timed to be coincident with the rising edges of a serial digital loop clock signal C690. Bits of the TDMT serial bit streams on the paths 11 and 21 are sampled and re-timed to likewise be coincident, by latches 511 and 521. A half cycle of the system clock prior to the rising edge of the serial digital loop clock signal C690, contents of the (2 by 8) outgoing register 502 are selected by a receive multiplexer 535 to provide the first bits of each of the TDMR channels at 11 and 21. The receive multiplexer selection is in response to a MUX SEL OUTGOING control signal shown in FIG. 6. The outgoing bits are timed by the rising edge of the clock signal C690 to start transmission of a 10 bit time slot. Shortly thereafter, the starting bits of the corresponding TDMT channels are sampled by the latches 511 and 521 using the falling edge of the same clock signal C690. The sampled bits are then applied (2 by 2) to the incoming register 501. During the said same clock signal C690, contents of the register 502 and the incoming register 501 are asserted in parallel by a multiplexer 532 on the leads of the primary bus 10. Only in an instance of a time slot (TS) 19 occurrence, which is indicated by a rising edge of a decode 18, in FIG. 6, will the multiplexer 532 gate Z bus signal states to the P bus 10. A half cycle of the same system clock signal after the falling edge of the said same C690 clock signal, the three orthogonal registers 501, 502 and 503 are clocked, resulting in the incoming register 501 accepting said starting bits, the outgoing register 503 moving the second outgoing bit to the multiplexer 535, and the register 502 moving 8 bits of the TDMT path 21 toward the multiplexer 532. At the same time the incoming register 501 moves the remaining two bits toward the multiplexer 532 via a multiplexer 533. The next two outgoing parallel information bytes are moved through data holding registers 504 and 505, under control of timing signals SM2 and SM6 and hence, into the register 502. At the same moment, as before described, the register 501 stores the first two bits of each incoming TDMT channel. Once the first two bits have occurred, the registers 501 and 503 receive no further clock signals until the start of the next outgoing time slot sequence when all 10 registered bits are shifted in parallel toward the P bus 10.

At the start of the next time slot sequence, registers 501 and 503 are caused to move their respective contents (2 bits) vertically, that is upwardly in FIG. 5. Thereafter the next eight TDMT bits are shifted vertically into the register 502 and the previous contents are likewise shifted out to be transmitted via the multiplexer 535 and the TDMR paths 11 and 21. The horizontal directional control signals and the vertical directional control signals continue to be alternately asserted thereby repeating the parallel to the serial and serial to parallel cycle for each TDM channel on TDM paths 11 and 21.

Figure 9:
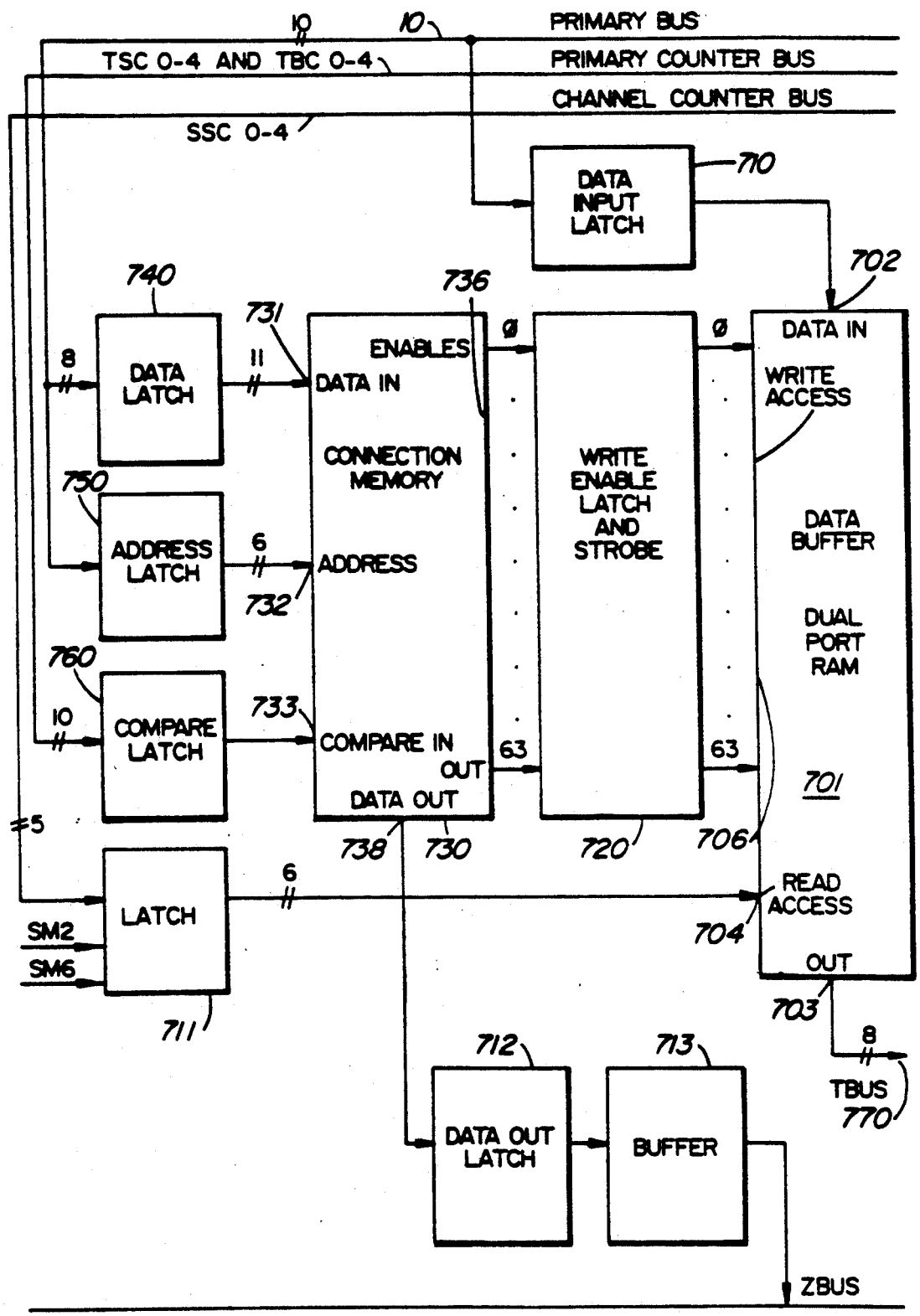
FIG. 9 is a block schematic diagram of a time switch circuit used in the circuit switch module in FIG. 1 to provide circuit switched communication paths in the key telephone system.

The time switch circuit in FIG. 9 provides for a timely transfer of 8 information bits from one of the 640 time slots on the primary bus 10 to a parallel T bus input of the parallel input multiplexer 506 of the converter circuit in FIG. 7, and thereby ultimately to a TDM path (11 or 21) time slot, as directed by the central processor 7. The information bits of each time slot on the P bus 10 are momentarily captured by a data input latch circuit 710 and thereafter applied at an input 702 of a dual port random access memory (RAM) 701. The dual port RAM 701 includes an output 703 which drives a T bus 770 in response to a six bit address applied at a read access address port 704. The RAM 701 differs from a typical dual port memory device in that for the purpose of storing information received at its input 702, it does not include the typical address decode circuitry. Instead, each write address is decoded and applied to an individual one of 64 write enable leads at 706. The decoded write address is timed via a write enable latch and strobe circuit 720. Any number of the write enable leads may be asserted by the circuit 720 simultaneously. The dual port RAM 701 responds, to a signal assertion or signal assertions on any or all of its 64 write enable leads at 706, by storing the signal states of said 8 information bits at the corresponding memory location or locations as the case may be. For example, if none of the leads at 706 is asserted, no storage locations are written. If one or more of the leads at 706 is asserted, the one or more corresponding storage locations are written. Reading of the 64 dual port RAM storage location occurs sequentially on a regular and periodic basis, under the control of a flip flop, not shown, in the latch 711 which is toggled by signals SM2 and SM6, and the 32 sequentially generated TDM channel addresses which are generated by the counter 113 in FIG. 6.

A connection memory 730 contains information as to the actual time slots of the 640 P bus 10 time slots from whence information bit states are stored in the dual port RAM 701. The connection memory 730 is provided by a content addressable memory which includes an eleven bit data input port 731, a six bit address port 732 and a 10 bit compare address port 733. The general structure and operation of content addressable memories is known. In this example P bus addresses, from whence information is to be stored, are lodged in memory locations in the connection memory 730. Each of 64 memory locations, not shown, correspond with a separate one of 64 output leads at 736. A digital comparator, not shown, is associated with each of the 64 memory locations such that addresses appearing at the compare port 733 are each compared with the information stored at each of the 64 memory locations. In every instant where the address at the compare port 733 and the information at a memory location is the same and the memory location also includes an asserted validity bit, the corresponding one of the 64 output leads at 736 is asserted. The asserted state is eventually transferred via the circuit 720 to the dual port RAM 701, which responds as previously described.

Operation of the circuit switch modules 100 is directed by the central processor 7, which uses the interface circuit 8 and 32 dedicated time slots on the P bus 10 for lodging information into the memory locations of the connection memory 730 via a data latch circuit 740 and an address latch circuit 750. The information is delivered from the interface circuit 8 in the form of four bytes each of which occupies time slot 19 of 4 sequentially occurring time blocks on the P bus 10. The four bytes include a command byte, followed by an address byte, a low order data byte, and a higher order data byte. Each of these bytes is asserted along with a validity signal on one of the two remaining leads of the P bus 10 which indicates that the bytes are in fact an instruction from the central processor 7. A portion of the command byte specifies either a write or a read function intended for one of a connection memory, a source connection memory or a destination connection memory. A comparator responds to the validity signal and a match between a remaining portion of the command byte and the IDO-3 by causing the address latch to store the next byte, that is the address byte. Thereafter the data latch 740, in FIG. 9, captures 11 bit states of the low and higher order bytes, which are subsequently stored in the memory location of the connection memory 730 as indicated by six address bits asserted by the address latch 750. Provision is also made for the central processor 7 to confirm the information content of any address in the connection memory. In this case the command byte indicates the read function, and the address byte indicates the memory location to be read. The subsequent low and higher order bytes are driven by the stored information from a data output 738 of the connection memory 730 and via an output latch 712 and buffer 713 to the Z bus and thence via the multiplexer 532 in FIG. 7 onto the P bus 10 where it is picked up by the interface circuit 8.

Figure 10:
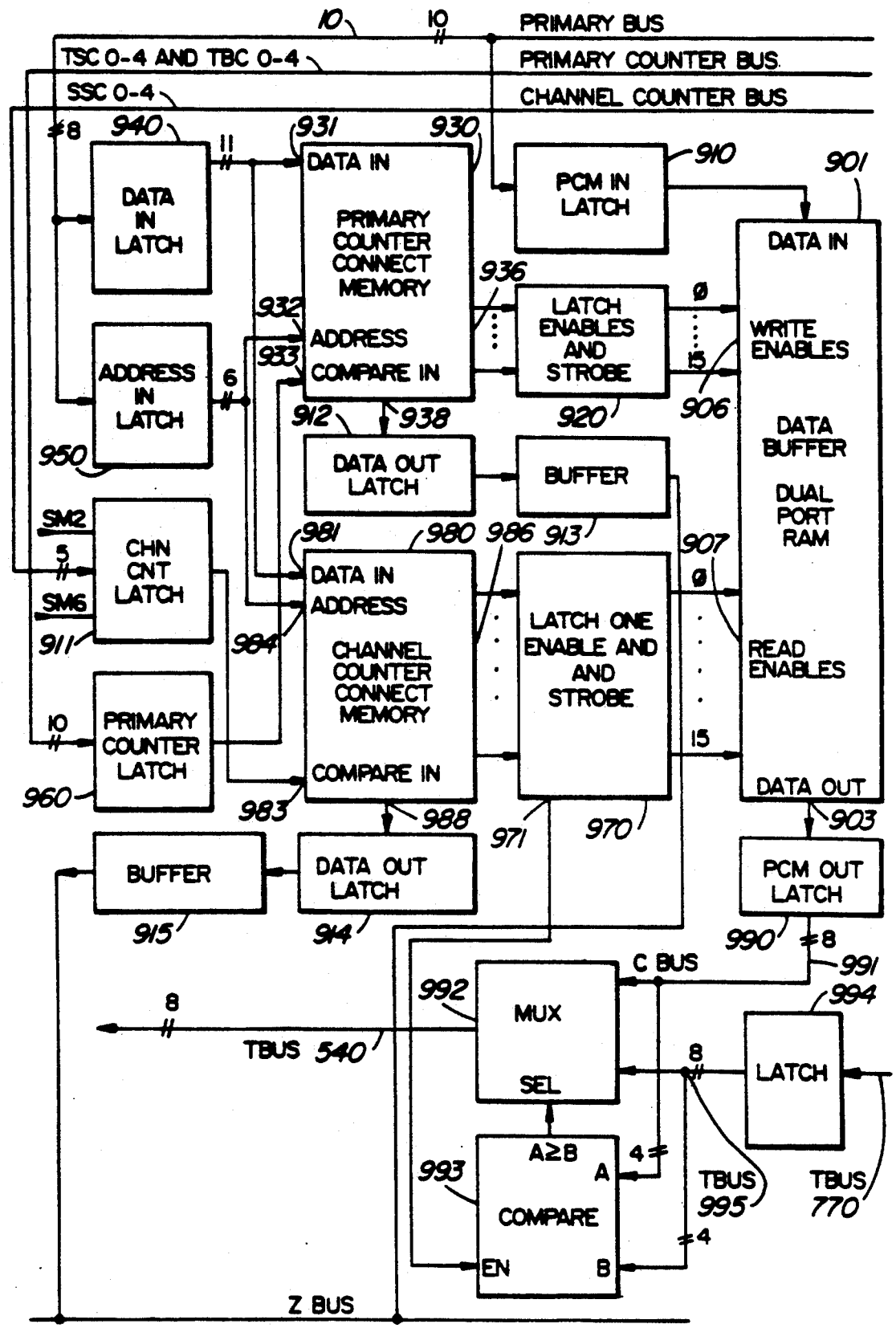
FIG. 10 is a block schematic diagram of a time switch conference circuit in the circuit switch module and used in combination with the time switch circuit of FIG. 9 to provide a conference feature in the key telephone system.

The time switch conference circuit in FIG. 10 provides a three party conference feature in the digital key telephone system. The time switch conference circuit adds an ability for a timely transfer of 8 information bits from another of the 640 time slots on the P bus 10, ultimately to, for example, said TDM path time slot previously referred to at the beginning of the discussion of FIG. 9. Very briefly by way of introduction, bytes are presented to a multiplexer 992, in FIG. 10, via the T buses 770 output from FIG. 9 and via a conference C bus 991. The four most significant bit (not including the sign bits) of each byte are compared in a comparator 993 which directs the multiplexer 992 to assert the 8 bits from the C bus 991 on the T bus 540 in the event that the value of the 4 bits from the C bus 991 is equal or greater than a value of the 4 bits from the T bus 995. In the event the T bus 995 value is greater, then the 8 bits from the T bus 995 are asserted on the T bus 540 by the multiplexer 992. Thus a three party conference call may be implemented wherein each party hears only the instant loudest speaking party of the other two parties.

Considering the time switch conference circuit of FIG. 10 in more detail, the information bits of each time slot on the P bus 10 are momentarily captured by a PCM input latch 910 and thereafter applied at an input 902 of a dual port RAM 901. The dual port RAM 901 includes an output 903 which is buffered to the C bus 991 via a PCM output latch circuit 990. Likewise the T bus 770 is buffered to the T bus 995 via a latch circuit 994. The dual port RAM 901 differs from the dual port RAM 701 in that it has only 16 memory locations and lacks typical address decode circuitry for the purpose of reading out information stored at these memory locations. Each write address is decoded and applied to an individual one of 16 write enable leads at 906 and likewise each read address is decoded and applied at an individual one of 16 read enable leads at 907. The decoded write address is timed via a write enable latch and strobe circuit 920. Likewise the decoded read address is timed via a read enable latch and strobe circuit 970. The read enable latch and strobe circuit 970 also includes an EXCLUSIVE OR logic circuit not shown, which responds to a single decoded read address occurrence by asserting a compare enable signal on a lead 971. The compare enable signal is used to activate the selection function of the comparator circuit 993, which in the absence of the compare enable signal causes the multiplexer 992 to assert the T bus 995 bit states onto the T bus 540, exclusively. Hence if no decoded read address or more than one decoded read address is asserted at inputs of the read enable latch and strobe circuit 970, the conference function does not occur. The dual port RAM 901 responds, to a signal assertion on a write enable lead at 906, by storing the signal states of said 8 information bits at the corresponding memory location. Likewise, reading of a memory location in the dual port RAM 901 occurs in response to a corresponding read enable lead at 907 being asserted.

A source connection memory 930 contains information as to the actual P bus time slots from whence information bit states are stored in the dual port RAM 901. The source connection memory 930 is provided by a content addressable memory having 16 memory locations, not shown, each corresponding to a separate one of 16 output leads at 936. The source connection memory 930 includes an eleven bit data port 931, a six bit address port 932 and a ten bit compare address port 933. A digital comparator, not shown, is associated with each of the 16 memory locations such that addresses appearing at the compare port 933 are each compared with the information stored at each of the 16 memory locations. In an instant where the address at the compare port 933 and the information at a memory location are the same and the memory location also includes an asserted validity bit, the corresponding one of the 16 output leads at 936 is asserted. The asserted state represents a decoded write address, which is subsequently transferred via the circuit 920 to the dual port RAM 901 which responds as previously described.

A destination connection memory 980 contains information as to the actual TDMR time slots on the TDM paths 11 and 21 to which information bit states stored in the dual port RAM 901 may be directed via the multiplexer 992 and the T bus 540. The destination connection memory 980 is of a structure similar to that of the previously described source connection memory 930. Addresses appearing at a compare port 983 are each compared with information stored at each of 16 memory locations. In an instant where the information at the compare port 983 and the information at a memory location are the same and the memory location also includes an asserted validity bit, a corresponding one of 16 output leads at 986 is asserted. The EXCLUSIVE OR logic circuit in the read enable latch and strobe circuit 970 permits the corresponding read enable lead at 907 to be asserted, which causes the dual port RAM 901 to read out the 8 information bit states from the corresponding memory location as previously described.

The information appearing at the compare port 983 is asserted from the channel counter bus leads SSC 0–4 by a channel counter latch circuit 911. The latch circuit 911 also includes a flip flop, not shown, which is toggled by the timing signals SM2 and SM6 and thereby provides 64 addresses per frame, similar to that previously discussed in relation to the latch circuit 711.

Operation of the conference function in the digital key telephone system is directed by the central processor 7, which uses the interface circuit 8 to communicate with the 32 dedicated time slots on the P bus 10 for lodging information into the memory locations of the source connection memory 930 and the destination connection memory 980 via a data latch circuit 940 and an address latch 950 in a manner similar to that previously discussed in relation to the connection memory 730. Likewise the central processor 7 may confirm the information content of the source connection memory 930 by way of a data output 938, a data output latch circuit 912, a buffer circuit 913 and the Z bus, connected as shown in FIG. 8. Information content of the destination connection memory is also available to the central processor 7 by way of a data output 988, a data output latch circuit 914, a buffer circuit 915, and the Z bus, connected as shown in FIG. 10.

Figure 11:
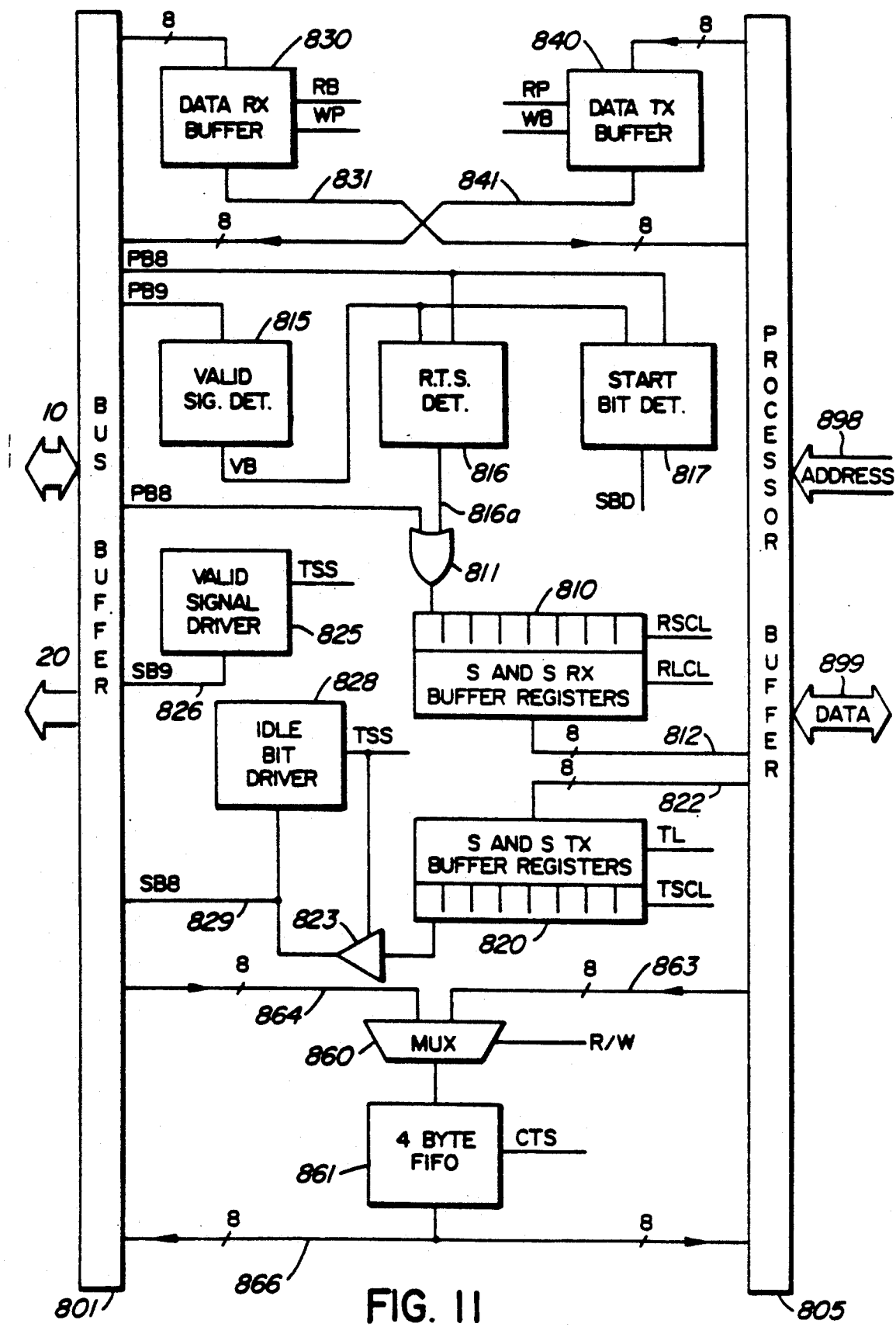
FIG. 11 is a block schematic diagram of an interface circuit used in the key telephone system of in FIG. 1.
Figure 12:
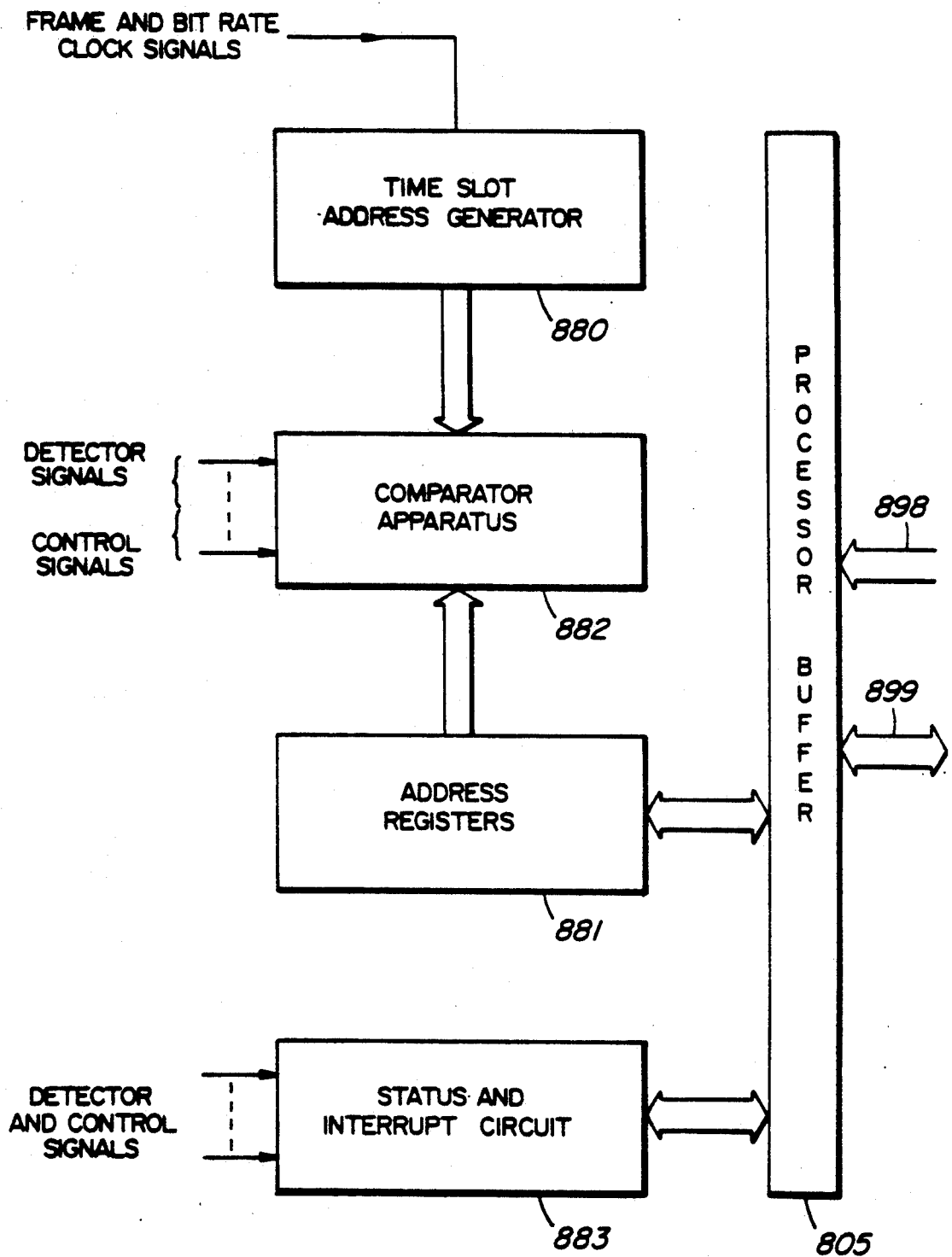
FIG. 12 is a block schematic diagram of a processor interface circuit used in the key telephone system illustrated in FIG. 1.

A primary function of the interface circuit 8, as illustrated in FIGS. 11 and 12, is that of receiving S and S messages and distributing S and S messages. The S and S messages are received from the primary bus 10 in one port related time slot at any one time by S and S receive buffer registers 810. The S and S messages are transmitted to all of the secondary bus 20 time slots or to a selected one of the secondary bus 20 time slots by S and S transmit buffer registers 820. The S and S messages are physically coupled with the primary and secondary buses 10 and 20 by a bus buffer circuit 801. The interface circuit is similarly coupled to central processor address and data buses, at 898 and 899, by a processor buffer 805. A primary function of the buffers 801 and 805 is that of relaying signals between all of various potential signal sources and destinations while minimizing the actual number of receiving gates and driving gates physically attached to the buses and various unillustrated timing and control leads. Provision of such buffers is usual in digital electronic systems and does not warrant detailed discussion.

Another primary function of the interface circuit 8 is that of capturing requests to send (RTS) an S and S message. As before described, an RTS occurrence is marked by 'zero' occurrences in bit positions 8 and 9 in a time slot. A valid signal detector receives each bit 9 time slot state and detects and latches the 'one' state for a short time. A request to send detector 816 likewise receives each bit 8 time slot state. If the valid signal detector 815 is unlatched and the bit 8 state is 'zero', the RTS detector 816 asserts a request to send signal indication on an RTS lead 816a. If the request to send is from within a selected group of time slots, a receive shift clock (RSCL) causes a shift register portion of the buffer registers 810 to shift the RTS indication into the buffer register 818. After sixteen RSCL pulses, a receive load clock (RLCL) causes the contents of an intermediate two byte shift register to be transferred to a two byte output register. The contents of the output byte register are available at the processor buffer 805 via an S and S message bus 812. Thus the registers 818 are clocked to monitor a group of 16 specified ports in the key telephone system for RTS occurrences. An occurrence of an RTS during any input from any of the 16 specified ports is arranged to generate a low level interrupt to alert the central processor to the presence of information. However, as it is intended that each port connected apparatus will continuously RTS until a clear to send (CTS) is received by it, there is no particular urgency attached to any one RTS occurrence. Eventually, the central processor will specify transmittal of an appropriate CTS and simultaneously select the port related time slot as a source of an expected S and S message.

When a CTS message is detected in the intended station apparatus a response, in the form of at least a one byte message, is transmitted. The first bit of the message is a 'one' in the bit 8 position and a valid 'one' in the bit 9 position. This combination causes a start bit detector 817 to raise a start bit (SB) signal for the duration of subsequent uninterrupted valid signal detection occurrences, coincident with the selected time slot. In the presence of the SB signal, RSCL pulses (one per frame) cause bit 8 states of the selected time slots to be shifted into the S and S receive buffer registers 810. Interrupt signals are generated with every byte so collected, such that the central processor is able to receive and if necessary, internally queue the incoming S and S message.

Figure 24:
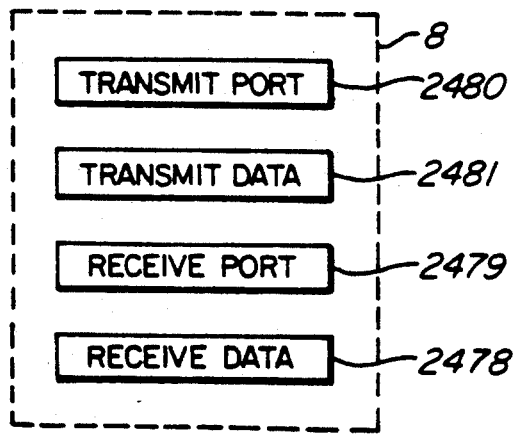
FIG. 24 is a detail diagram illustrating registers in the central processor interface.

Outgoing S and S messages are received from the processor buffer 805 via a bus 822 as timed by transmit load (TL) pulses. A shift register in the register 820 shifts received bytes, bit by bit toward the bus buffer 801 at a rate of one bit per frame in response to transmit shift clock (TSCL) pulses. The state of the output stage of the shift register is continuously applied to a transmission gate 823. For this operation, the transmission gate 823, and an idle bit driver 828, are both responsive to a time slot select (TSS) signal. In the case of a stimulus message, this TSS signal is derived from a "transmit port" register 2480 (FIG. 24) which is written into by the central processor 7 in dependence upon the destination port number. In the case of an F message, the TSS is asserted throughout the length of the message continuously, frame after frame. In the case of an S message, the TSS is asserted for the duration of the time slot associated with the destination port of the S message. The idle bit driver asserts a 'one' on the lead 829 when the TSS is not asserted. A valid signal driver 825 responds to the TSS assertion by asserting a 'one' on a lead 826, whereby S and S bit assertion on the lead 829 are accompanied by valid signal bit assertion on the lead 826.

Another capability of the interface circuit 8 is that of providing wide band data paths between any of the port associated 64 Kb/s channels and the central processor 7. Input is received from any specified channel via a data receive buffer 830 under the control of a read bus (RB) strobe, which is generated coincident with occurrence of a primary bus time slot from which receiving is required. This occurrence preferably raises a high level interrupt which is intended to result in a write to processor (WP) strobe being generated to provide the buffered byte on a bus 831 for use by the central processor 7. In like manner, bytes of information are transferred from the central processor 7, via a data transmit buffer 840 to a bus 841, for assertion during a predetermined time slot on the primary bus 10.

Although the buffers 830 and 840 provide a convenient data transport interface, this type of interface can be unduly time consuming if such transfers are to occur frequently. For example, frequent data transfers are required between the switch modules 100 and the central processor 7, in order to exercise prompt control of communication paths in the key telephone system. Hence, a more specialized interface is provided which operates throughout the 32 time slots on the primary bus 10, which are dedicated to exclusive use by the central processor 7, as previously described. Connection instruction bytes are loaded from a bus 863 to a four byte FIFO 861 via a multiplexer 860 in the presence of a write (W) signal. After the FIFO 861 has received four bytes, the central processor 7 must direct the interface circuit to initiate transfer of data to the circuit switch 100 via a bus 866 and the primary bus 10. The interface circuit asserts the bits states appearing at the FIFO output onto the primary bus 10 with each occurrence of a dedicated control time slot. If no information transfer is required, an idle code is asserted on the bus 863 and therefore is subsequently asserted on the bus 866. By this means, up to 32 bytes of connection instruction can be transferred via the primary bus during each frame. Up to 16 bytes of query and 16 bytes of response information may be exchanged via the primary bus 10 by loading the FIFO with a 2 byte query message.

Functional circuit blocks in FIG. 12 interface with the central processor 7 via the same processor buffer 805, shown in FIG. 11. In FIG. 12, a time slot address generator 880 similar to that discussed in relation to FIG. 5 provides definition of time slot interval occurrences on the primary and secondary buses for the interface circuit 8. Particularly, address registers 881 are selectively loaded via the buffer 805 from the central processor 7 to define; those time slots which are watched for RTS, that time slot which is granted S and S message transmission to S and S receive buffer registers 810; and the time slot selected for single channel transmission of an S and S STIMULUS message or a CTS message.

In operation, a comparator apparatus 882 monitors the contents of the address registers 881 and the time slot address occurrences from the generator 880. Occurrences of matches, in combination with instruction of central processor origin and signals from the detectors 815-817, are used to generate the controlling signals in sequence and with timing as previously discussed in relation to FIG. 11. A status and interrupt circuit 883, monitors the progress of S and S message transfer, data byte transfers, and control byte transfers, with reference to signals of detector and control origin, to generate timely interrupt signals whereby the central processor is informed of information exchange opportunities and requirements.

Figure 13:
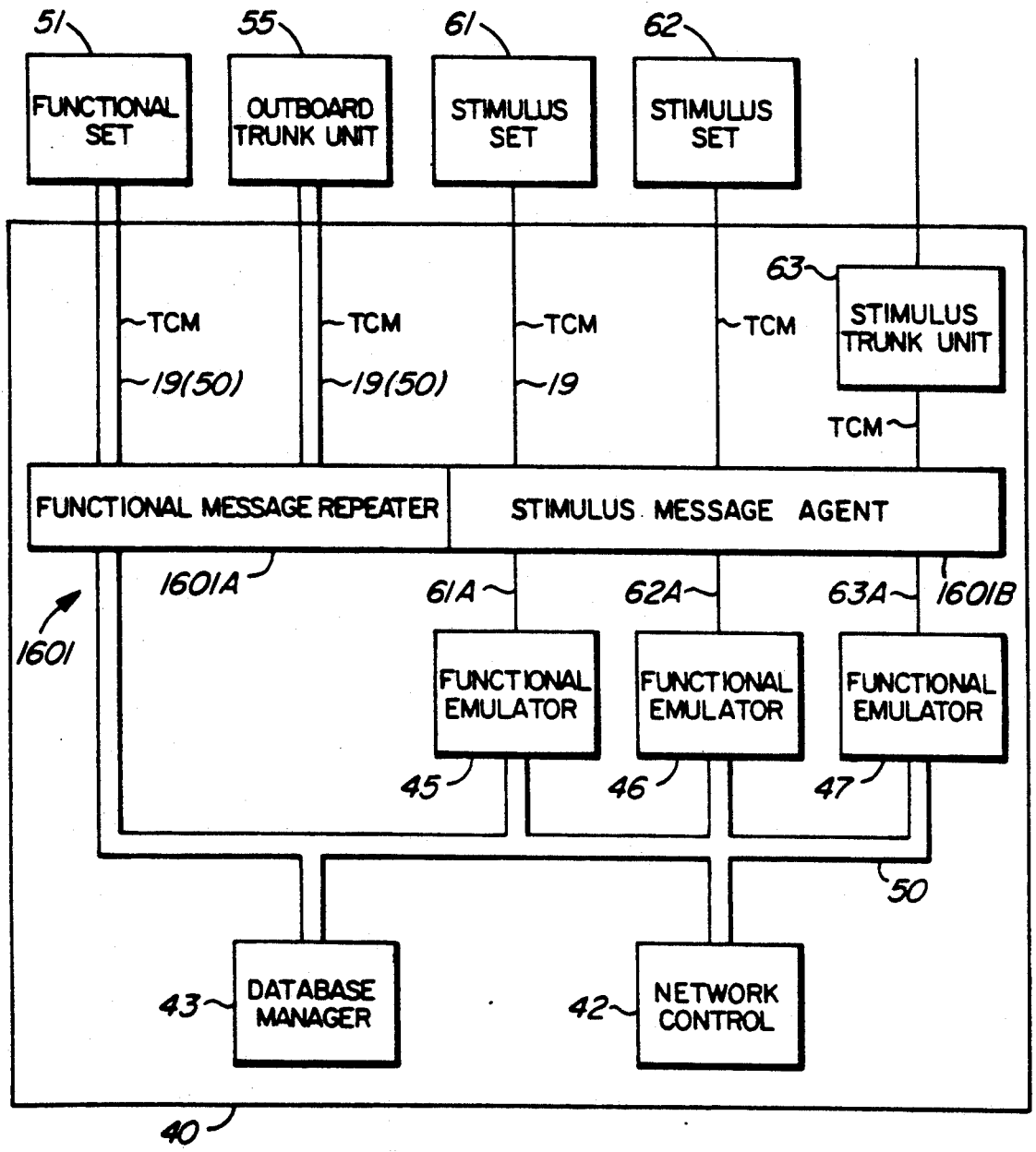
FIG. 13 corresponds to FIG. 3 but is an alternative way of representing the software architecture.

The common equipment 41 shown in FIGS. 2 and 3 will include, among other things, a message repeater software module to relay messages between terminals. As illustrated in FIG. 13, in which components corresponding to FIGS. 1, 2 and 3 have the same reference numerals, a message repeater 1601 comprises a functional message repeater 1601A and a stimulus message agent 1601B. Functional terminals 51 and the outboard trunk unit 55 are shown connected to functional message repeater 1601A by TCM channels 19. Likewise functional emulators 45, 46 and 47, respectively, are shown connected to functional message repeater 1601A by way of the S and S channel 50 and to the stimulus message agent 1601B by stimulus S and S channels 61a, 62a and 63a, respectively. Two stimulus sets and stimulus trunk unit 61, 62 and 63, respectively, are shown connected to the stimulus message agent 1601B by respective TCM links 19. The functional message repeater 1601A receives functional messages from functional terminals or the database manager 43 or the network control 42 and broadcasts them to all functional entities in the system.

The previously discussed difference between functional message headers in the two directions implies that a functional message received by the KSU 40 central processor 7 must be modified before being broadcast in the opposite direction to other terminals. This function is performed in the KSU 40 central processor 7 by a message repeater 1601 (see FIG. 13), to be discussed later. The stimulus message agent, however, is capable of only point-to-point communications with the stimulus terminals 61, 62 or stimulus trunk unit 63, or with the corresponding functional emulators 45, 46, 47.

Each of the terminals 13, 14, 15, 17 provides an interface between a user and a TCM communication channel. In telephony, this communication channel typically terminates in analog transducers for voice communication, although this is not necessarily the case. User actions requiring interaction with the KSU 40 are detected and result in transmission and reception of messaging on the signalling and supervision channel provided by the system.

Figure 14:
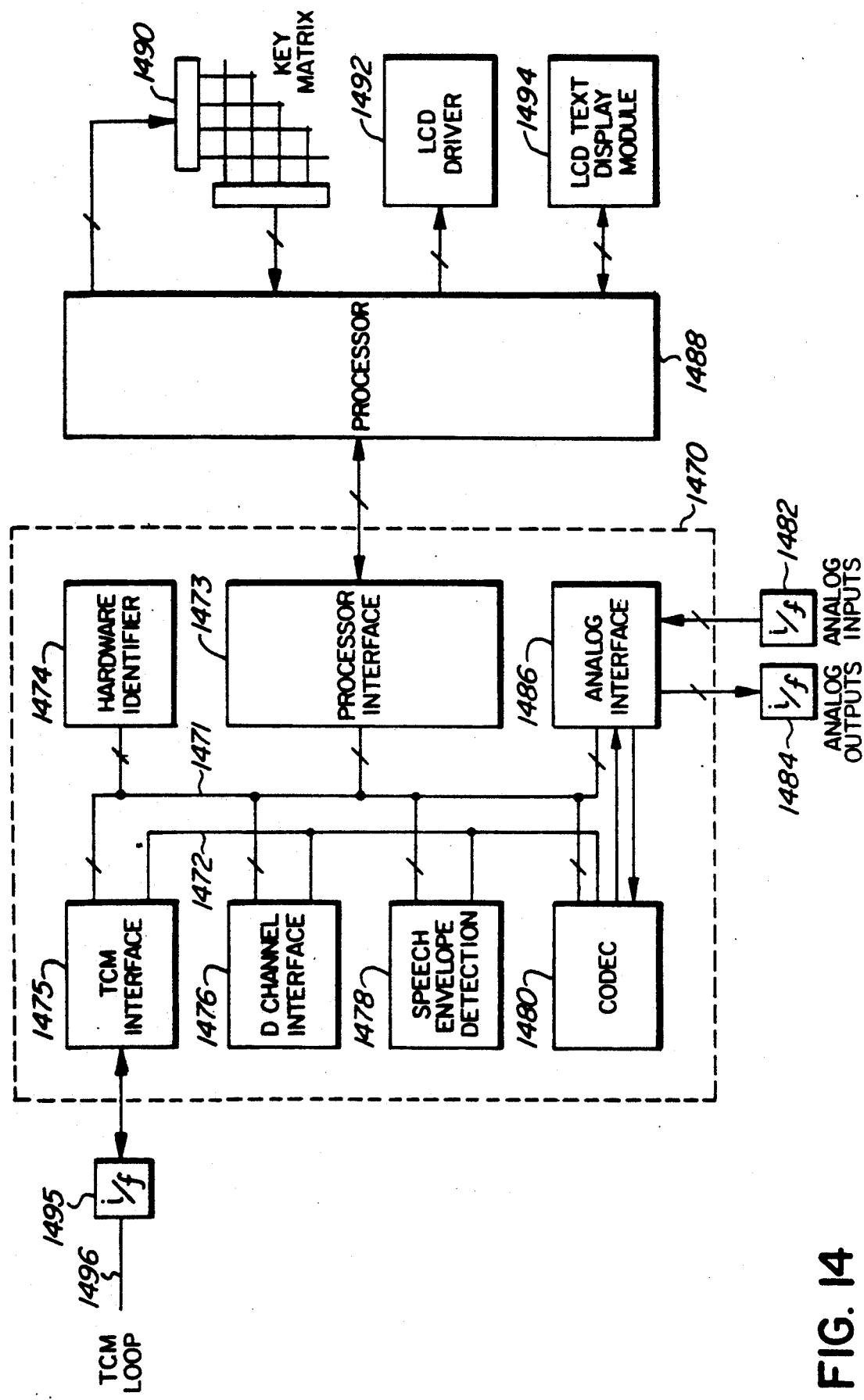
FIG. 14 illustrates the terminal apparatus in more detail.

Referring to FIG. 14, at the hardware level there may be minimal difference between stimulus and functional terminals, at least so far as signalling to the central processor 7 is concerned. The distinction is confined to the terminal processor 1488. For a functional terminal, the processor 1488 is programmed to respond to and generate functional messages on the signalling and supervision channel 50. In a stimulus terminal, the processor sends and receives only stimulus messages, ignoring any incoming functional messages which may be present on the channel. It should be noted that these two message types are distinguished by their unique header formats. (See Table 1)

The block diagram of FIG. 14 represents either a functional terminal or a stimulus terminal. A large portion of the functionality of the terminal is provided in a single hardware component, the Digital Terminal Interface Chip (DTIC) 1470. The functional blocks within the DTIC 1470 include a TCM interface 1475, D channel interface 1476, speech envelope detector 1478 and codec 1480, linked by two separate buses 1471 and 1472, respectively. Bus 1471 is a parallel bus that accesses data registers via a processor interface 1473. These registers are resident in each of the functional blocks, and allow a processor off the chip to control and obtain status specific to that functional block. The second bus, 1472, is a synchronous serial bus carrying signalling and supervision channels and communication channel data in a format similar to TCM.

A terminal hardware identifier 1474 comprises an Erasable Programmable Read Only Memory (EPROM) to store a digital identifier that is unique in the system. In this example, the identifier 1474 is a 40 bit code that may be written to the device once only after completion of manufacture.

This identifier 1474 may be read by the terminal processor 1488 via a terminal processor interface 1473.

Figure 23:
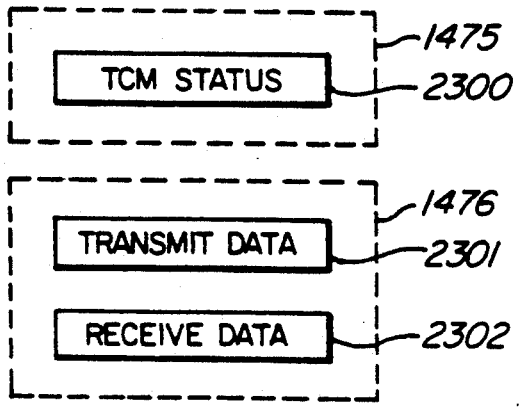
FIG. 23 is a detail diagram illustrating registers in the TCM interface of a terminal apparatus.

The signalling and supervision channel and the communication channel are combined and put into a Time Compression Multiplexed digital format. The TCM interface 1475 performs the multiplexing and demultiplexing of these channels for transmission to and reception from the TDM TCM interface 12 in the KSU 40, by way of an analog interface circuit 1495 which provides amplification and buffering. TCM interface 1475 detects absence of the TCM signal transmitted from the KSU 40 and records this status in a status register 2300 (FIG. 23) readable via the processor interface 1473. This allows the terminal processor 1488 to detect connection of the terminal to the KSU 40.

The signalling and supervision channel is known as the D channel portion of the TCM frame. The D channel interface 1476 receives both stimulus and functional messages originating from the KSU 40 and formats them for the processor interface 1473. Messages originating from the processor 1488, to be transmitted to the KSU 40, are formatted for the TCM frame. In addition, D channel flow control protocol (clear to send CTS/request to send RTS—see later) is handled by D channel interface 1476 as discussed previously.

A speech envelope detector 1478 is provided as part of local voice signal processing used in performing a handsfree function in the terminal. Also, a combined analog to digital encoder and digital to analog decoder (codec) 1480 is included to provide voice communication.

Various analog inputs 1482 are provided for voice communication, such as a handsfree microphone, handset microphone or headset microphone. Various analog outputs 1484 such as for a loudspeaker, handset transmitter or headset transmitter, are also provided. Amplification and level control of these analog signals is provided, as well as switching of the analog inputs and output between these various transducers by an analog interface 1486. In addition, audible user indications such as tones and a ringing signal are generated by the analog interface 1486.

User input to the terminal is detected as key depressions that close switches in the key matrix 1490 and result in input signals to the processor 1488. The technique for detecting these key depressions is widely used in many types of electronic keyboards. The processor 1488 reads the key matrix rows at regular time intervals for these inputs, while simultaneously generating an output signal sequentially on each of the matrix columns.

Visual indication to the user is provided by liquid crystal display (LCD) indicators driven by LCD drivers 1492. The state of these indicators is controlled by the processor 1488 in response to user actions and incoming messages.

A liquid crystal display module 1494 provides visual representation of text to the user of the terminal. Characters are written to this module by the processor 1488 using a common 8 bit code such as ASCII. Text may be contained in incoming messages, or may be generated locally by the terminal processor 1488. In this example, the display module 1494 can display two lines of 16 characters.

The terminal processor 1488 is a general purpose microprocessor. For both stimulus and functional terminal apparatus, the software executed by the processor 1488 is responsible for decoding and encoding incoming and outgoing messages, respectively, on the signalling and supervision channel 50, responding to hardware inputs 1473, 1492, 1494. generated in the terminal, and driving hardware outputs 1473, 1492, 1494.

For a stimulus terminal 61 the processor 1488 is a Mitsubishi 50743 single chip microcomputer, with software contained in Read Only Memory (ROM). This software encodes user events and terminal status into outgoing stimulus messages, and decodes incoming stimulus messages to drive the user indicators. It also provides local control of terminal hardware.

For a functional terminal, the processor 1488 typically has more processing power, and a larger address space. Since the software must provide functionality equivalent to that of the functional emulator 45 in the KSU 40, a processor such as the Motorola 68008 used in the KSU 40 is suitable, with separate hardware devices for memory and input and output. Thus a functional terminal 51 has a higher hardware cost than a stimulus terminal 61 of equivalent user interface functionality.

Figure 21:
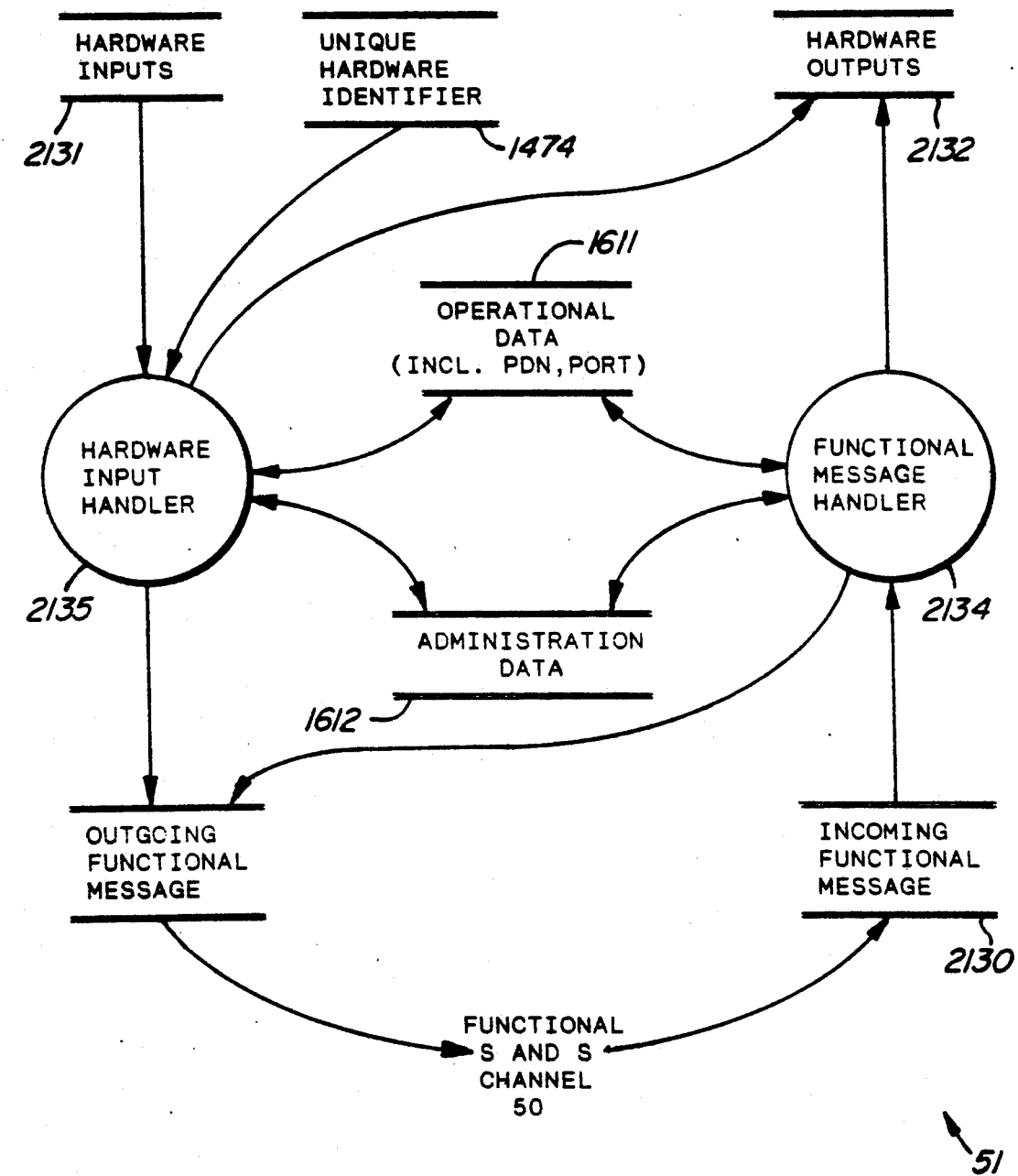
FIG. 21 is a data flow diagram illustrating data flow in a functional terminal.

FIG. 21 illustrates data flow within the functional terminal 51's software, which comprises both data and processing components.

External inputs are functional messages received by way of the signalling and supervision channel 50, and local inputs from terminal hardware 1473, 1490 and 1494, respectively. Hardware inputs include transducers to detect user actions, and registers to provide access to the status of hardware subsystems in the terminal.

Outputs are directed to hardware outputs 2132 and S and S channel 58. Hardware outputs 2132 give audible and visual indications to the user via terminal hardware 1473, 1492 and 1494, and provide control of hardware subsystems in the terminal via terminal components 1473 and 1494. Operational data in table 1611 maintains a record of interactions between the terminal and other functional entities in the system. This data is updated in response to functional messages sent to and received by the terminal.

Administration data in table 1612 records the settings of terminal specific parameters that control the behaviour of the terminal. The terminal also includes local copies in table 1612 of system and terminal specific administration data maintained by the database manager.

Incoming functional messages are received by the terminal over the signalling and supervision channel 50. These messages provide information regarding the activity of other functional entities in the system. Outgoing functional messages are generated by the terminal in response to local hardware inputs and received functional messages. These messages provide interaction with other functional entities in the system. The processing components of the functional terminal are partitioned to deal with the two specific types of inputs: hardware and functional messages.

The hardware input handler 2135 updates internal data and generates both messaging and hardware outputs. It responds to local user inputs, and status changes detected in hardware subsystems.

Figure 22:
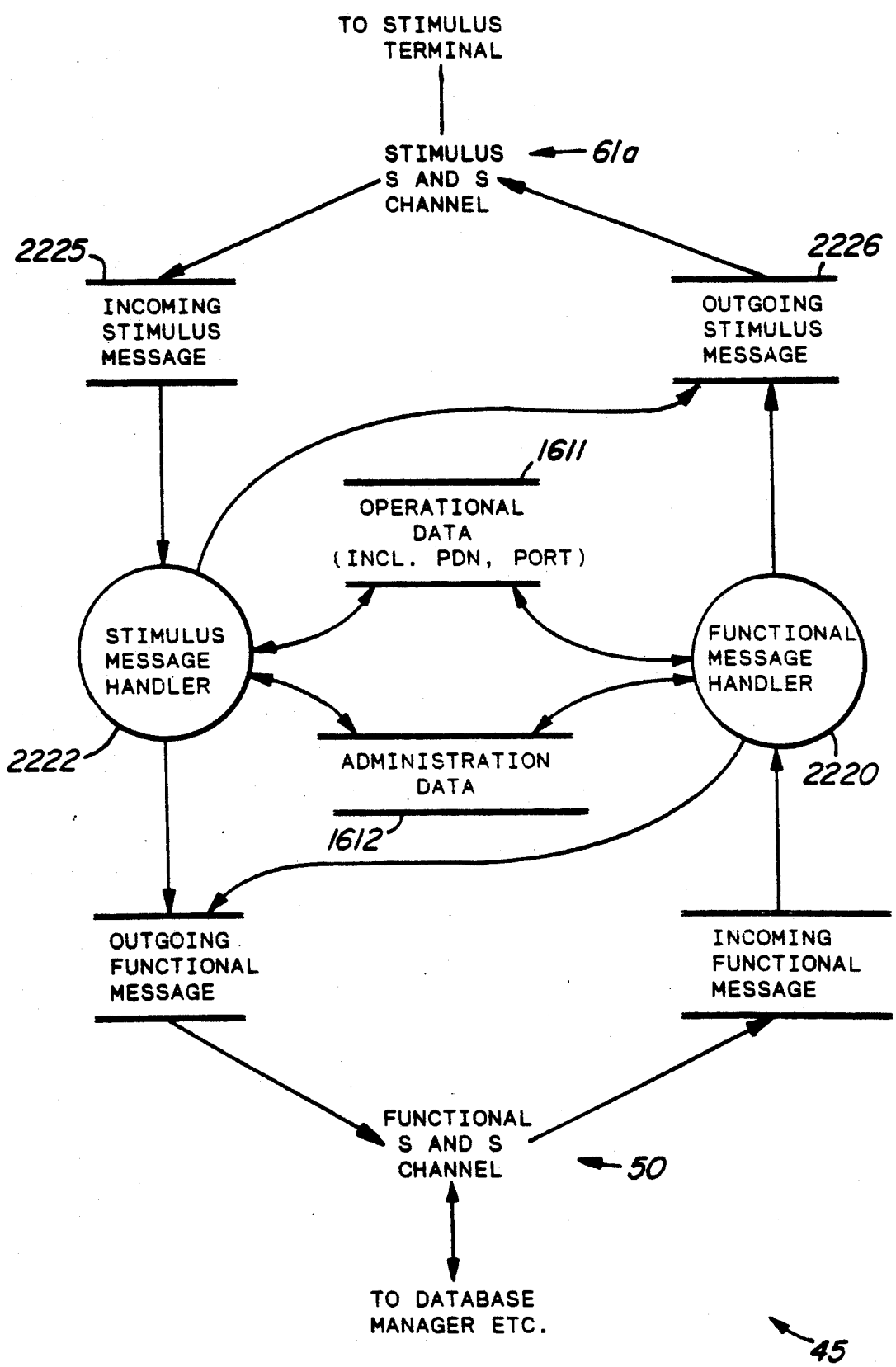
FIG. 22 is a data flow diagram illustrating data flow in a functional terminal emulator.

FIG. 22 illustrates data flow within the functional terminal emulator software. Each functional terminal emulator 45 has a functional message handler 2220 and a stimulus message handler 2222. The functional message handler 2220 updates internal data and generates both functional and stimulus messaging. It responds to functional messages received from the signalling and supervision channel 50.

To a large extent, the data flow within the functional emulator 45 is identical to that of the functional terminal 51. The key distinction is that direct hardware inputs 2131 and outputs 2132 are replaced by incoming and outgoing stimulus messages, 2225 and 2226 respectively, on the signalling and supervision channel 61a.

With the exception of stimulus messages replacing hardware data, the functional emulator data components are substantially identical to those of the functional terminal 51. Since multiple functional emulators are implemented on a single shared processor in the KSU 40, the organization of operational and administration data components of the functional emulator 45 differs from their organization in the functional terminal 51. This organization within the KSU 40 was illustrated in FIG. 19B.

Incoming stimulus messages are originated by the physical stimulus terminal 61, and indicate user action or terminal status. There is a one to one correspondence between a functional emulator 45 and a physical terminal 61, and the stimulus messages 2225 from a stimulus terminal 51 are handled exclusively by one functional emulator 45.

Outgoing stimulus messages 2226 are generated by the functional emulator 45 to update audible and visible user indicators at the physical stimulus terminal 61. The functional emulator 45 generates stimulus outputs 2226 for one stimulus terminal 61 exclusively.

The hardware input handler of the functional terminal is replaced by a processing component, stimulus message handler 2222, to handle incoming stimulus messages 2225 in the functional emulator 45. The functional message handler 2220 is substantially identical in both the functional terminal 51 and functional emulator 45.

The stimulus message handler 2222 updates internal data and generates both functional and stimulus messaging. It responds to user inputs and stimulus terminal status, reported in incoming stimulus messages 2225.

At the software level, signalling and supervision message flow differs for functional and stimulus messages even though both message types share a common physical channel at the hardware level. This distinction is possible at the software level due to the distinct headers of the two message types. At the hardware level message flow is identical for both stimulus and functional messages.

At the hardware level, messages are transmitted from, say terminal 13 to the central processor 7 (FIG. 1). Within the terminal 13 are the hardware components shown in FIG. 14 including the processor 1488 which writes a message into its memory, for example in response to a user action such as a key depression detected in the key matrix 1490. The processor 1488 copies this message one byte at a time into a "transmit data" register 2301 in the D channel interface 1476 via the processor interface 1473 (see FIG. 23).

Following RTS and CTS flow control handshaking with the KSU 40, the TCM interface 1475 inserts the message bits into the TCM frame on the TCM loop 1496. Once the D channel interface 1476 is ready to accept the next byte of the message, the DTIC 1470 signals the terminal processor 1488 with an interrupt. The processor 1488 then writes the next byte of the message into the "transmit data" register 2301 in the D channel interface 1476.

Terminal 13's TCM loop is time division multiplexed with other TCM loops by the TDM TCM interface 12 in the KSU 40. The message then passes via the serial TDM link 11 and the circuit switch module 100 onto the primary bus 10, where the S and S channel bits are collected by the interface circuit 8. Once a byte of the message is assembled, processor 7 reads the message byte from a "receive data" register 2478 (FIG. 24) in the interface circuit 8. In addition, the port number of the terminal originating the message is read by the processor 7 from the "receive port" register 2479 in the interface circuit 8. In response to subsequent interrupts from the interface circuit 8, the processor 7 buffers subsequent received bytes from the "receive data" register 2478 in memory until the entire message is received. Software in the processor 7 then examines the message and takes appropriate action. The data registers 2478 and 2481 will correspond to registers 810 and 820, respectively, in FIG. 11. The port registers 2479 and 2480, respectively, will be connected in a similar manner.

For message transmission from the KSU 40 to, say the terminal 13, the reverse process is followed. Software in the central processor 7 writes an outgoing message into a block of memory. Before transmission of the message begins, a "transmit port" register 2480 (FIG. 24) in the interface circuit 8 is written by the message repeater 1601 specifying the port on which the message is to be sent. The message may be sent on one port only, or on all ports simultaneously (broadcast). The message is written one byte at a time by the message repeater 1601 (FIG. 16) to a "transmit data" register 2481 in the interface circuit 8. The interface circuit 8 writes message bits to the secondary bus 20 with the appropriate timing. When it is ready for the next byte of the message, the interface circuit 8 interrupts the central processor 7. The central processor 7 responds to this interrupt by writing the next byte of the message to the "transmit data" register 2481 in the interface circuit 8. The message bits appear at the TCM loop 19 connected to the destination terminal 13 after passing from the secondary bus 20 to the circuit switch module 100, and via the serial TDM link 11 and the TDM TCM interface 12.

Within the terminal 13 shown in FIG. 14, the message bits are passed through the TCM interface 1475 and collected via the D channel interface 1476 after a "start" bit is recognised in interface 1476. Once a complete byte of a message is assembled, the DTIC 1470 interrupts the terminal processor interface 1473. The processor 1488 reads the message byte from the "receive data" register 2302 (FIG. 23) in the DTIC 1470. The processor 1488 reads subsequent message bytes from the "receive data" register 2302 in response to subsequent interrupts from the DTIC 1470. Software in the terminal processor 1488 then examines the message and takes appropriate action.

Stimulus messages are buffered separately from functional messages in memory in the KSU 40 central processor 7. For messages received from terminals, the message repeater 1601 examines the header byte of the incoming message and selects the buffer. For outgoing messages, the software generating the message chooses the appropriate buffer based on the message type. For both incoming and outgoing messages, the source and destination port numbers are included in the buffer.

Figure 18:
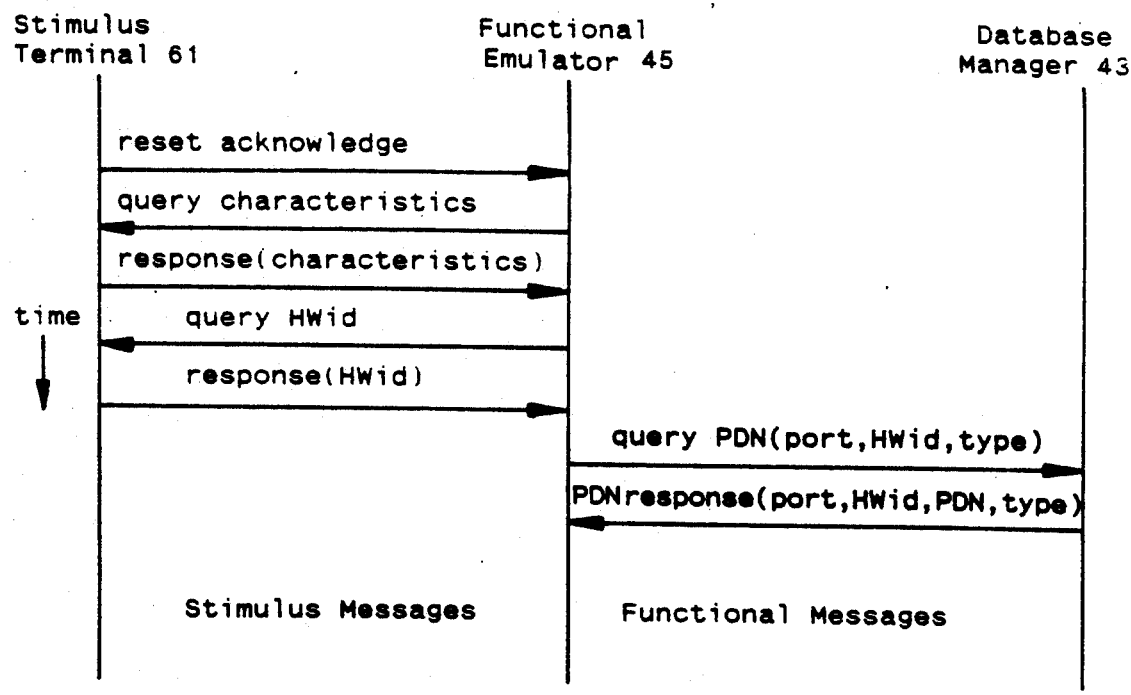
FIG. 18 illustrates message flow between a stimulus terminal apparatus, functional terminal emulator and the database manager.

Stimulus message flow at the software level is exemplified in the sequence of initialization messages in FIG. 18.

When a stimulus terminal is transmitting to the KSU 40, a pointer to a received stimulus message is passed to a single functional emulator 45 via a procedure call, providing access to the S and S channel 61a by the functional emulator 45, in the terminal-to-KSU direction. This message is processed by the stimulus message handler 2222 (FIG. 22).

For signals transmitted from KSU 40 to a stimulus terminal, outgoing stimulus messages are generated by the functional emulator 45 by internal processing components stimulus message handler 2222 and functional message handler 2220 (FIG. 22). These messages are placed in the appropriate buffer memory in the KSU 40 central processor 7, after which they are transmitted to a single TCM port.

Figure 17:
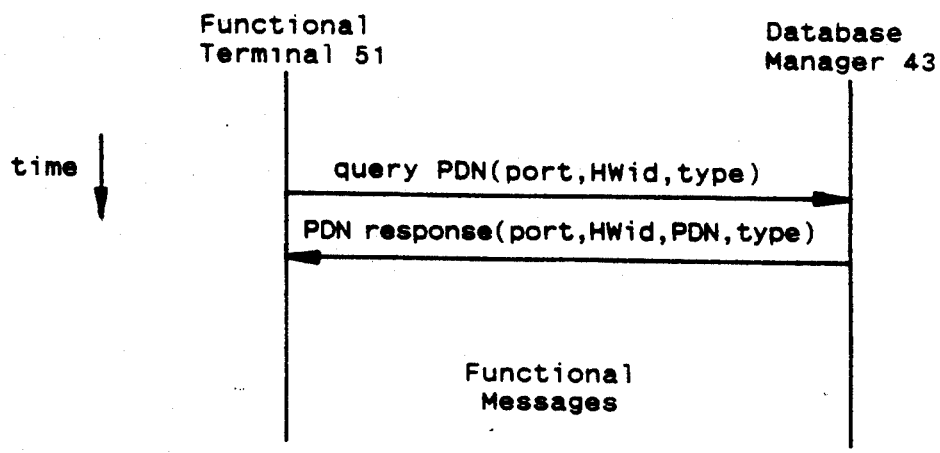
FIG. 17 illustrates message flow between a functional terminal and the database manager.

Examples of functional message flow at the software level are illustrated in FIGS. 17 and 18.

Within the KSU 40 processor 7, software passes a pointer to a received functional message via a procedure call to functional entities such as 42, 43, 45, 46 and 47 within the KSU 40 software, to provide a virtual S and S channel 50 within the KSU 40. Each functional message is passed to each functional entity in the KSU 40, in order to provide the equivalent of broadcasting on the physical S and S channel external to the KSU 40. Within the functional emulator 45, the functional message handler 2220 processes the incoming message.

Outgoing functional messages, generated by functional entities such as 42, 43, 45, 46 and 47 within the KSU 40, are placed in the appropriate buffer memory in the KSU 40 processor 7, after which they are passed both to functional entities internal to the KSU 40, and also broadcast to all TCM ports.

External to the KSU 40, the functional message handler 2134 in the functional terminal software in FIG. 21 processes an incoming functional message that has been written into a memory buffer by the functional terminal processor 1488 in FIG. 14. The functional terminal software also writes outgoing functional messages to a memory buffer in the terminal processor 1488 (FIG. 14) that are sent to the KSU 40 via the DTIC 1470.

Figure 16:
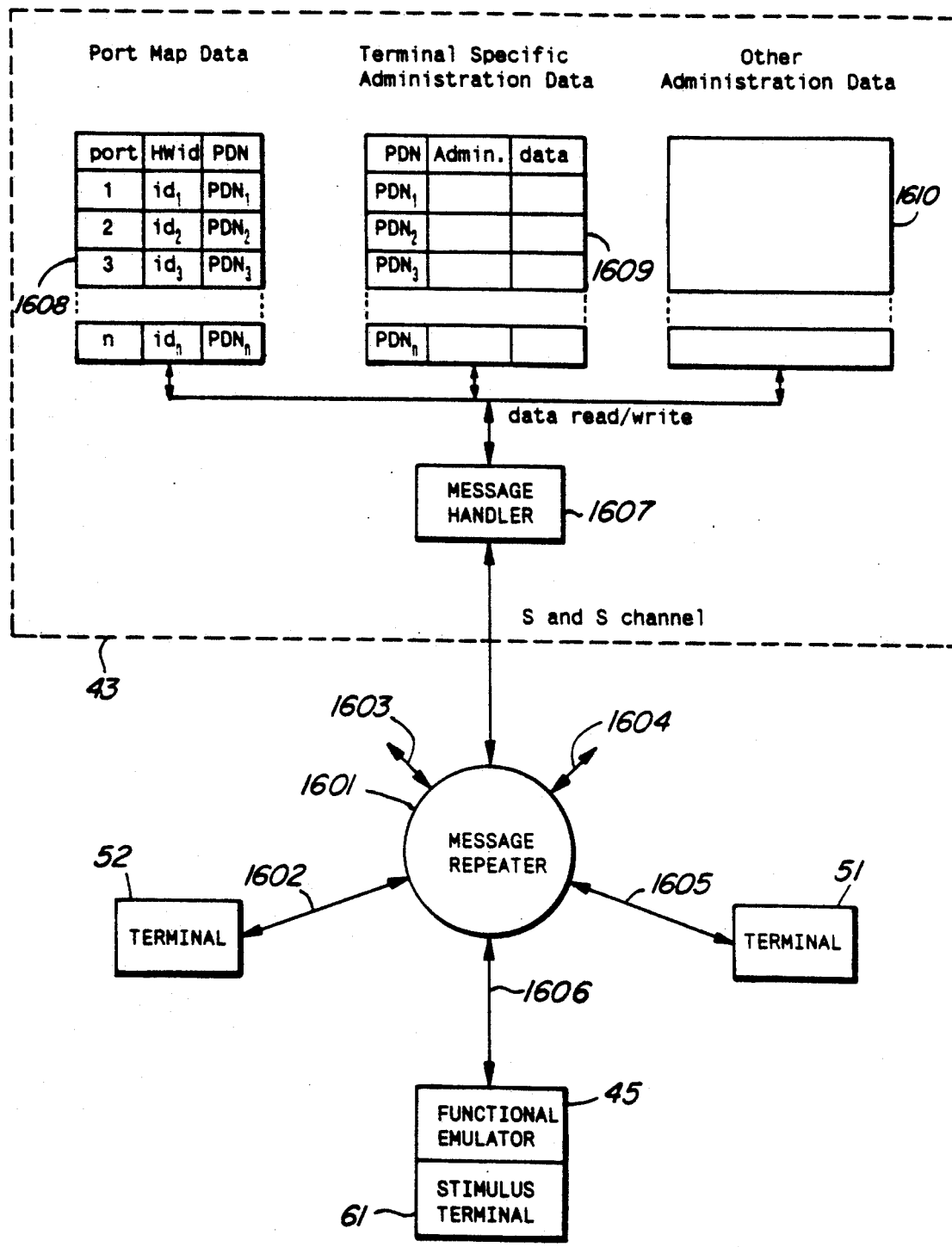
FIG. 16 illustrates, in more detail, a database manager of the central processing unit and related components of the system.

FIG. 16 illustrates the system components involved in implementing terminal relocation or replacement and shows multiple terminal devices 51, 52 and a functional emulator 45 which communicate with each other and with database manager 43 via the message repeater 1601. The message repeater has multiple physical connection points or ports 1602-1606 and the S and S channel is accessible at each of these ports. Only functional messaging is relevant to FIG. 16.

Each of the message ports 1602-1606 is an interface point between the associated terminal and the rest of the system and is bidirectional, i.e. messages may be both sent and received by a connected terminal. Messages may be addressed specifically to other terminal apparatus in the system, or may contain no explicit destination address. The address of the originating terminal is included in the message. The relationship between address and port number is not fixed, i.e. a terminal address is unchanged when a terminal is moved to a different port.

As mentioned previously, the message repeater 1601 is part of the KSU 40, and is mainly resident in the interface 8 with some processing capability in processor 7. It includes a functional message repeater 1601 (FIG. 16) which receives messages sent by individual terminal apparatus and broadcasts the messages to every signalling channel, providing the common S and S channel 50 between functional terminals. The message repeater 1601 can identify the port of the originating terminal uniquely, and adds this originating port number to the address information in the message. The message, with the originating port number included, is then broadcast by the message repeater 1601 to all terminal apparatus in the system.

The database manager 43 is a KSU resident functional entity that communicates with other functional entities in the system via the signalling and supervision channel 50. In effect, the database manager 43 is a special terminal that is permanently attached to the system, and is not relocatable. Thus this database manager terminal 43 need not contain a unique identifier. It will be appreciated, however, that only one database manager 43 may be present in the system. Like other terminal apparatus, the database manager 43 has message transmission and reception capabilities, in this case by means of message handler 1607 which is a processing component of the functional entity.

The database manager 43 maintains a Port Map Data table 1608 which stores, for each terminal, port number, identifier (HWid) and address or prime directory number (PDN) in a predetermined relationship. The PDN is used as a key to other terminal-specific data resident in the database manager 43, and is the number by which a terminal is identified to the user. The PDN is analogous to the telephone number of a telephone set in the public telephone network. Alternatively the other terminal specific data may be referenced directly by HWid, or some other unique address, rather than PDN. In addition to the "Port Map Data" table 1608, the database manager 43 comprises "Terminal-specific Administrative Data" table 1609, and "Other Data" table 1610.

The "Port Map Data" table 1608 contains an entry for each terminal port in the system, and the port number is used to index the table. Each entry contains two fields: the hardware identifier $id_1$—$id_n$ of the terminal most recently attached to the port, and the corresponding Prime Directory Number $PDN_1$ to $PDN_n$ of this terminal. This "Port Map Data" table 1608 is updated in response to "Query PDN" messages received by the message handler 1607 of the database manager 43.

In "Administration Data" table 1609, the database manager 43 maintains administrative data specific to individual terminal apparatus indexed according to the PDNs of the terminal apparatus. This data includes such information as system controlled feature assignments that are not writable by the individual terminal apparatus.

In addition to terminal specific administration data, in table 1609, the database manager 43 maintains other administration data, that applies system wide, in table 1610.

On each attachment of the terminal to a port in the system, or each system initialization, the terminal goes through a process of internal initialization, which involves writing data to initial states, and initializing states of terminal hardware. Thus, its internal processor 1488 sets variables, carries out checks, tests, etc. turns off indicators, sets hardware ports to known states. When internal initialization has been completed, it is ready for external initialization, following which it can begin communicating with other functional entities.

Figure 15:
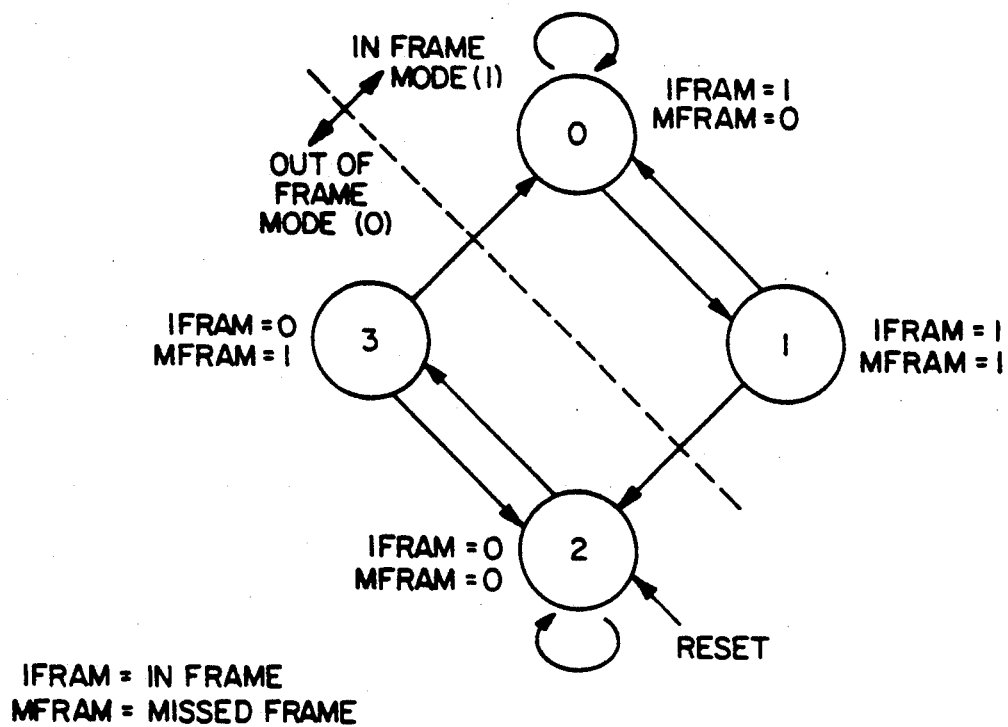
FIG. 15 is a state machine diagram illustrating frame recovery which is used to initiate the initialization sequence.

FIG. 15 is a state diagram illustrating the way in which initial connection of the terminal is deemed to have taken place by virtue of the fact that frame synchronization has been established following initial physical connection or reconnection following a disruption which effectively constitutes disconnection. Framing information is transferred to DTIC chip 1470 (FIG. 14) as bipolar violations embedded at a rate of 1 kHz. in the BPRZ-AM1 (Bipolar Return to Zero-Alternate Mark Inversion) signal received over the TCM loop 1496. Such a bipolar violation is inserted in the start position of every eighth frame or burst of the TCM signal. The bipolar violation is timed relative to the stop bit of the preceding burst. The frame state machine (FIG. 15) enters the out-of-frame mode (state 2) whenever it misses two consecutive violations, and upon power-up or reset. It has recovered frame when, after a bipolar violation (state 3), a second violation is detected exactly eight bursts later. When a violation occurs at the wrong time during inframe mode (mode 1), it is ignored. No TCM bursts are transmitted in out-of-frame mode. It should be noted that the transistion from state 2 to state 3 requires only a bipolar violation, whereas the transitions from, respectively, state 3 to state 0 and from state 1 to state 0 require both a bipolar violation and the occurrence of a stop bit in the proper location. In order to avoid bipolar violations between successive transmit and receive bursts, the start bit of the transmitted burst of the DTIC chip 1470 is given the opposite polarity to that of the previously received stop bit. This has the affect of changing the polarities of start and stop bits at the 1 kHz rate. Frame information is transferred to and from the rest of the system through the serial bus 1472. (FIG. 5)

As indicated in FIG. 15, when the frame state machine is in the inframe mode, a '1' is present in the status register 2300 in TCM interface 1475. Whenever an out-of-frame condition exists, a '0' is present in the status register 2300.

The processor 1488 polls the status register 2300 at regular intervals. When it detects a transition from '0' to '1', it presumes that a terminal has been newly-connected and transmits the identifier signal to the central processor 7.

If the status register indicates that the terminal has been connected, the terminal signals its presence to the central processor 7, by sending a message to the database manager 43. As previously mentioned, the message handler 1607 is the processing component of the database manager 43. It receives incoming messages and generates outgoing functional messages via the signalling and supervision channel 50 (FIG. 2). It accesses the data components of tables 1608, 1609 and 1610 in response to incoming read and write request functional messages.

Although, at this stage, the functional terminal 51 is unaware of its own PDN, it knows the fixed address of the database manager 43, and so can address its message properly.

For a functional terminal 51, the external initialization message sequence consists of two messages as illustrated in FIG. 17. The first message "Query PDN (port,HWid,type)" is originated by the functional terminal 51 and sent to the database manager 43.

This first message queries the PDN of the functional terminal 51. The hardware identifier (HWid) of the functional terminal 51, which is unique in the system, and the port number on which the message originated, are included as parameters in this message. The "type" parameter is included by the originating terminal to allow the database manager 43 to make terminal type distinction in the terminal specific data table 1609 (FIG. 16).

As mentioned previously, the originating port number is written into the message by the message repeater 1601 (FIG. 16) in the KSU 40 rather than by the originating functional terminal 51, and is included when the message is broadcast on the signalling and supervision channel 50 (FIG. 2). Thereafter the functional terminal 51 will ignore all incoming functional messages except the response from the database manager 43.

This response comprises the second message, "PDN response (port, HWid, PDN,type)" whereby the database manager 43 informs the requesting functional terminal 51 of its PDN. The PDN (prime directory number) assigned to the terminal by the database manager 43 is included in the message. Since the terminal 51 receiving the message does not yet know its PDN, it needs some other means of recognizing that this message is addressed to it. For this reason, the hardware identifier (HWid) is included in the response message. The functional terminal 51 matches the hardware identifier (HWid) in the message with its own in order to recognize itself as the destination. The functional terminal 51 then saves the PDN and port number parameters received in the message in its operational data (1611) in the terminal processor 1488. (For the purpose of this description, the operational data tables in both functional terminals and emulators are deemed to be the same and so have the same reference numeral, 1611.) The terminal 51 may then ask the database manager 43 for other terminal specific data. In these subsequent queries, the terminal 51 uses its own address (PDN), rather than its identifier HWid, since the PDN is only 16 bits long compared to 40 bits for the identifier. Thus the HWid is only used during initialization. Thereafter messaging uses the PDN for terminal identification purposes.

Since the port number also is unique within the system, it is included in the PDN response message.

FIG. 18 illustrates the corresponding message sequence for initialization of a stimulus terminal 61, which communicates with the database manager 43 by way of a functional terminal emulator 45. (see also FIGS. 3 and 13). The combination of functional terminal emulator 45 and stimulus terminal 61 is equivalent to the functional terminal 51 in FIG. 14.

One difference between the functional terminal emulator 45 and a functional terminal 51 is that the functional emulator 45 is aware of its port number before any messaging occurs. This allows initialization of terminal types that do not have unique hardware identifiers, since the functional emulator 45 can recognize itself as the destination of the "PDN Response" message from the database manager 43 by matching the port number. Relocation of these terminal apparatus without unique hardware identifiers is not supported. The PDN of these terminal types is fixed in relation to the port.

Functional messaging between the functional terminal emulator 45 and the database manager 43 as shown in FIG. 18 is identical to that shown in FIG. 17 between a functional terminal 51 and the database manager 43 for functional terminal initialization. However, a stimulus message sequence occurs between the physical stimulus terminal 61 and the functional terminal emulator 45 before the emulator 45 generates the "Query PDN(port,HWid,type)" functional message.

Once it has completed its internal initialization, (see above) the stimulus terminal 61 indicates its presence to the functional terminal emulator 45 by generating a "Reset Acknowledge" message. This is the first indication to the emulator 45 that a stimulus terminal has been connected physically to the port.

The functional terminal emulator 45 requires information regarding the characteristics of the attached stimulus terminal 61 which may affect its operation, both during and after initialization. For example, the stimulus message meaning may vary between terminal types, in which case the emulator 45 needs to know. Consequently, the functional terminal emulator 45 responds with a "Query characteristics" message.

The stimulus terminal 61 responds to the query from the emulator 45 with a "response(characteristics)" message containing the requested characteristics. If the characteristics in this response identify the stimulus terminal 61 as a type of device having a unique hardware identifier, the emulator 45 transmits a "Query HWid" stimulus message to the stimulus terminal 61. If the stimulus terminal 61 is of a type which has no unique identifier, no query is made and the emulator 45 proceeds directly to exchange functional messages with the database manager 43, using a nil value for the hardware identifier. Otherwise the functional terminal emulator 45 will not commence the functional message interaction with the database manager 43 until the stimulus terminal 61 has responded to the "Query HWid" message from the functional emulator 45 with a message "response (HWid)" containing the requested identifier. Thereafter the functional message interaction between the emulator 45 and the database manager 43 takes place as previously described.

Referring now to FIG. 19, initialization will usually result in updates to the port map data (FIG. 16 and 19A) in the database manager 43. If the terminal is a stimulus device 61 with a functional terminal emulator 45, emulator data may also be updated (FIG. 19B).

In addition to data tables 1608, in the database manager 43, the KSU 40 has "Operational Data" and "Administration Data" tables 1611 and 1612, respectively, each row of the tables accessible by one of the functional emulators 45. The port map data table 1608 is updated by the database manager 43 in response to the "Query PDN" message (FIG. 17) received from the initializing terminal 51 or emulator 45.

Initially, the port map data table 1608 contains a "nil" entry for the hardware identifier on each port, and a PDN that is unique for each port. This represents the condition that there is no terminal attached to any port. Terminal specific data in table 1609 is initialized assuming a "default" terminal type. If the type of the terminal actually attached differs from the default, this is indicated by the "type" parameter in the "query PDN" message. The database manager 43 then changes the data in table 1609 to new values suitable for this terminal type.

Referring to FIG. 19B, the Data Tables 1611 and 1612 in the functional terminal emulator 45 contain emulator data that is replicated for each port in the system i.e. each row in Tables 1611 and 1612 represents a different emulator. Table 1612 contains data related to operation of the emulator 45 on the port itself, and Table 1611 contains administration data related to the PDN of the device attached to the port. The operational data in Table 1612 is organized as an array indexed by port, and the administration data in table 1611 is organized as an array indexed by PDN. Since relocation alters the relationship between PDN and port number, these two types of data are linked by pointers 1613. A pointer is a commonly used type of data that contains the memory address of other target data. When relocation occurs, only the pointer 1613 need be modified, and not the data itself.

Initially, the contents of the operational data table 1612 indicate that the emulator 45 is disabled, since no stimulus terminal is known to be attached to the port. The administration data in table 1611 is uninitialized, since its contents may depend upon the type of terminal that gets attached to the port. The pointers 1613 linking the administration data to the "operational" or port data are initialized to correspond to the PDN assigned to the port in the port map data 1608.

The operational data in table 1611 will include "type" data which will correspond to the terminal type transmitted in the "response(characteristics)" message from the stimulus terminal 61. The administration data table 1612 may then carry type-dependent administration data. When the PDN response is received from the database manager 43, the corresponding administration data will be updated to conform with the operational data.

There are two distinct types of initialization which require updates to database manager 43 and emulator data tables 1611 and 1612. One is relocation, and the other is replacement.

When a new terminal, i.e. that has not been initialized before in the system, is attached to a port, the hardware identifier it sends to the database manager 43 in its "Query PDN" message (FIGS. 17 and 18) will not be present in the port map data table 1608, the initial state of which is shown in FIG. 19(i). The table 1608 is updated by the database manager 43 to record the hardware identifier (id1) at the entry for port number (1), [see FIG. 19 (ii)], and the PDN assigned to the terminal is the one in the port map data column alongside that port, i.e. PDN1. This is terminal replacement.

The database manager 43 is not aware of a terminal 61 being removed from the port and the port map data table 1608 remains unchanged [FIG. 19 (iii)]. The emulator 45, however, needs to be aware of a stimulus terminal being removed, since it should enter the disabled state. This allows other functional entities to be aware of its absence, since a disabled emulator will ignore all functional messages. Disabling of the emulator is not essential for relocation.

Absence of the stimulus terminal 61 may be detected by having the emulator 45 or some other KSU 40 entity, for example a loop maintenance server, query the stimulus terminal 61 with a stimulus message at regular intervals. When the stimulus terminal 61 fails to respond to such a query, absence of the stimulus terminal 61 is indicated, and the emulator 45 should disable itself.

When a terminal that has been initialized before in the system, at a port which has now been vacated, is attached to a new port, [FIG. 19 (iv), (v) and (vi)], the hardware identifier it sends to the database manager 43 in its "Query PDN" message (FIG. 17) will be present in the port map data table 1608 but entered against the vacated port. In this case, the database manager 43 and emulator data tables 1611 and 1612 may be updated, depending on which of the following three scenarios applies.

(i) The case of the same terminal sending a PDN query from a port different from the port at which the hardware identifier is stored in the port data map 1608 occurs when the terminal has relocated [FIG. 19(iv)]. The port map data table 1608 is updated so that the entry at the vacated port with the matching hardware identifier is swapped with the entry at the present port where the terminal has now originated its PDN query. Thus, in the example of FIG. 19(iv), PDN1 is assigned to port 3 and PDN3 is assigned to port 1. The emulator data pointers 1613 are updated to effect a corresponding reassignment of the administration data for the emulators at the corresponding two ports [FIG. 19(iv)].

(ii) A terminal that is removed and then reattached at the same port [FIG. 19(v)] will not result in any data updates. This is neither replacement nor relocation, but merely attachment of a removed terminal at the same port.

(iii) Attachment of a terminal at a port that was previously occupied, but such that its hardware identifier does not match the hardware identifier assigned to that port or any other port in the port map data table constitutes replacement [FIG. 19(vi)]. Database manager 43 records the hardware identifier of the new terminal in the port map data table 1608, deleting the identifier of the terminal that previously occupied the port. Relocation of the previous terminal can now no longer occur. No update to emulator data tables 1611 and 1612 is required.

Figure 20:
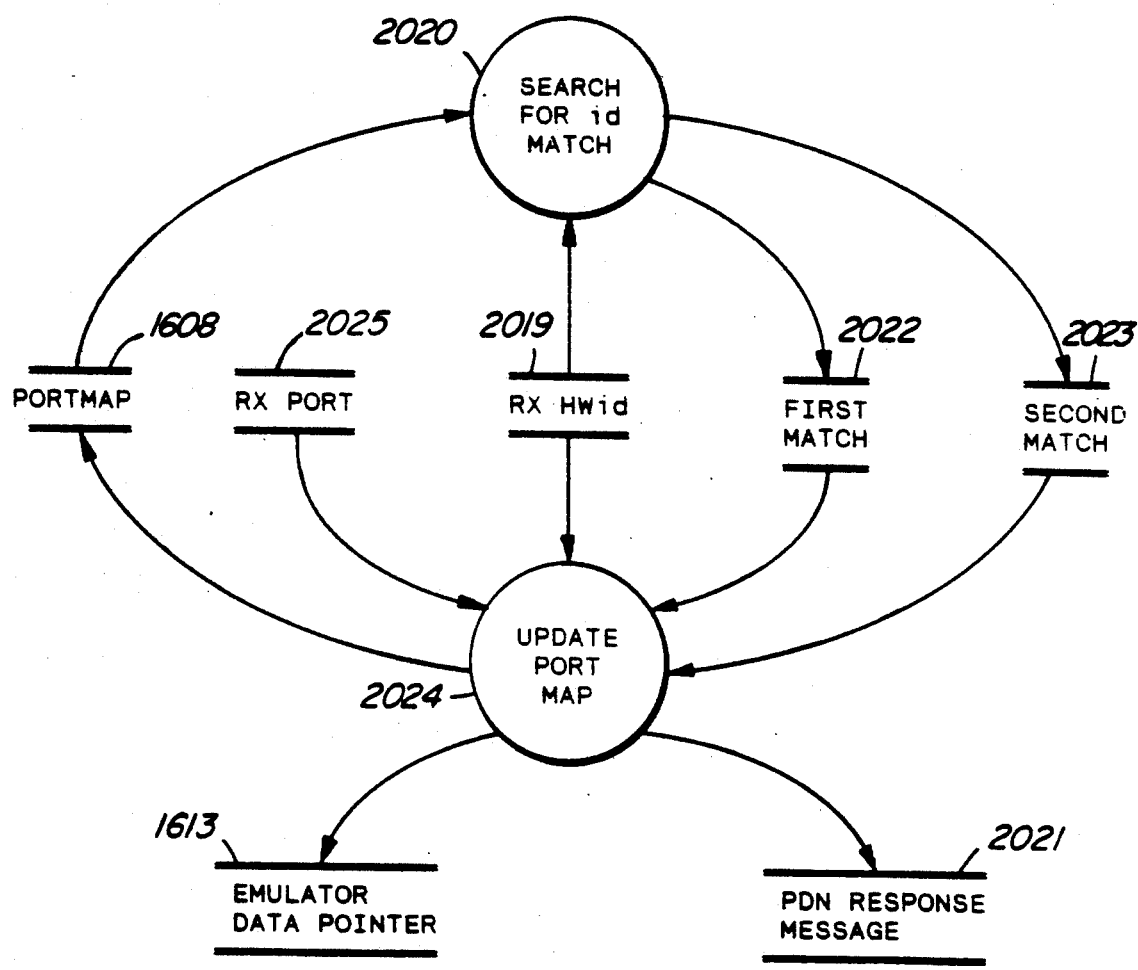
FIG. 20 is a data flow diagram representing the data flow in the data base manager.

Operation of the database manager 43 during the message exchange is illustrated in FIG. 20 which, like FIGS. 21 and 22, is a data flow diagram. For more information about this kind of diagram for representing software the reader is directed to chapter 10 of the book "Structured Design: Fundamentals of a Discipline of Computer Program and Systems Design" by Edward Yourdon and Larry L. Constantine, Yourdon Press 1978.

The database manager 43 performs two kinds of operation following receipt of a "Query PDN" message from a functional terminal 51 or functional emulator 45. The first operation involves a search of the port map data table 1608, and the second involves any necessary data updates 2024 to the table 1608. Following these two internal operations, the "PDN Response" message 2021 is generated. Thus, following receipt of the hardware identifier 2019 in a "Query PDN" message from RX PORT 2025, the database manager 43 searches (2020) the port map data table 1608 for a hardware identifier matching the identifier 2019 received in the "Query PDN" message. If a matching identifier is found, a record is made of the number of the port with which it is associated. This is the port number of the first match, data element 2022, in FIG. 20. If no match is found, the value is nil.

The search 2020 is repeated through the remainder of table 1608 for a second identifier match 2023 in the port map data. If a second match is found, the corresponding port number(s) is recorded in data element 2023. If no further match is found, the value is nil.

Following completion of the search, port map data table 1608 is updated as at 2024 to reflect any changes due to relocation or replacement as described in the terminal initialization events. Decision Table 6, below, shows how the events are reflected in the values of the variables. [x=T or F (don't care)]. The events are numbered to correspond to FIG. 19A.

TABLE 6

| event | first match = nil | second match = nil | first match = rx port | result |
|---|---|---|---|---|
| (ii) | T | T | X | replacement new set |
| (iv) | F | T | F | relocation |
| (v) | F | T | T | replacement-old set |
| (vi) | T | T | X | replacement-new set |
| error | F | F | X | replacement-duplicate id |

Various modifications and alternatives may be implemented without departing from the scope of the present invention. Thus, terminal relocation and replacement need not include source and destination port numbers in functional message headers. The number of the port at which the message originated may instead be written separately into the KSU 40 message buffer by the message repeater 1601, and be made available to the database manager 43 via a procedural interface. This implies that the database manager 43 must be implemented in software internal to the KSU 40. Also, it must be possible for the database manager 43 to specify the destination port number of the outgoing functional message, and allow functional emulators 45 to access this port number to initialize stimulus terminals 61 without unique HWids. In the example described, in which port numbers are included in functional message headers, the database manager 43 may be implemented either internal or external to the KSU 40.

It should be appreciated that the port map data table 1608 could be indexed other than by port number. It may equally well be indexed by PDN, hardware id or some other number unique to a port, so long as the port number is then included as an entry in the table, and there is exactly one table entry for each port.

It should also be appreciated that, unlike the operational data, the administration data in tables 1608, 1609 and 1610 of the database manager 43, and table 1612 in the emulator 45 and the functional terminal 51, are non-volatile, i.e. not lost when power is turned off. Hence a system can be turned off, a terminal relocated, and the automatic relocation procedure will function satisfactorily when power is restored.

Relocation of a terminal involves messages initially indistinguishable from a "Query PDN" message arriving at the database manager from a second terminal with the same HWid, i.e. two terminals having the same HWid and trying to operate simultaneously. This could result in the second terminal being assigned the first terminal's PDN and data. The first terminal, on consequent initialization, would seek to repossess it. The cycle could repeat indefinitely. To avoid this situation, the database manager 43 prevents a second relocation of a terminal with this HWid for a duration of at least one polling interval of the loop maintenance server. On the first relocation, the database manager 43 requests the loop maintenance server to re-initialize any terminal at the vacated port via a TCM frame violation or "reset" command to the terminal. This forces the terminal to send the "Query PDN" in this interval. Hence any "Query PDN" message containing this HWid arriving during this interval will be treated as initiated by a replacement.

Figure 25:
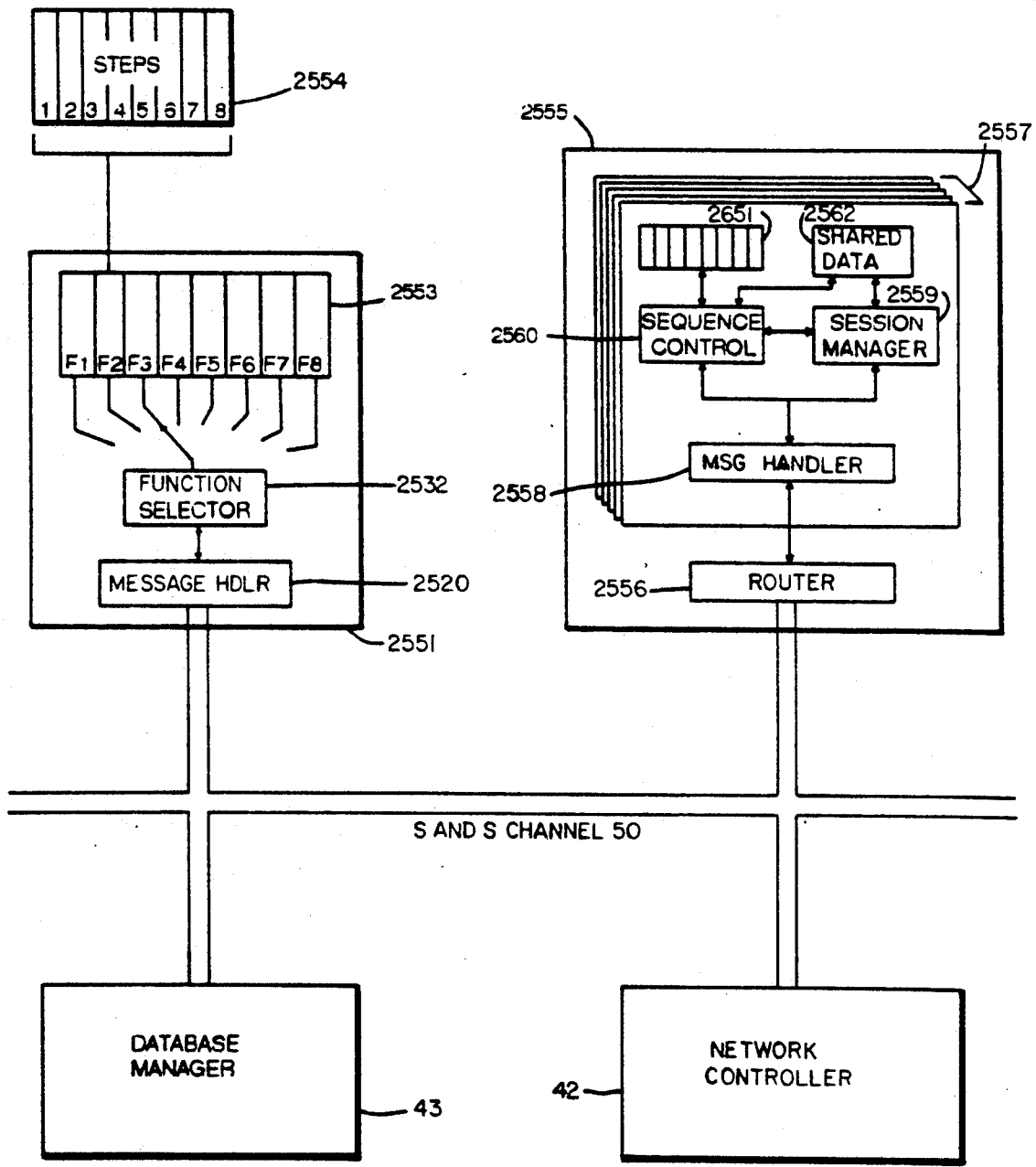
FIG. 25 is a diagram, corresponding to FIG. 2, showing a feature host apparatus and a functional terminal controllable thereby, both connected to the system S and S channel.

The provision of features from an external source will now be described with reference to FIG. 25, in which the bus network controller 42, database manager 43, a functional terminal 2551 and feature host apparatus in the form of a personal computer (PC) 2555, are shown connected to the S and S channel 50. This S & S channel 50 is the same as that previously described with reference to FIG. 2. The functional terminal 2551 has various components corresponding to those of functional terminal 51 in FIG. 5, but which are not shown in FIG. 25 to simplify the description. A message handler 2550 in the functional terminal 2551 shown in FIG. 25 includes a functional message handler 1607, which corresponds to that shown in FIG. 16, and a feature message handler 2611 (see FIG. 26). The additional components of the functional terminal 2551, which are shown in FIG. 25, are a function selector 2552 and a store 2553 holding a set of functions numbered F1 to F8. Typical such functions are "Select line", "Display ASC11", and "Give tone (Ring back)". Selection of each function invokes a macro-like series of operations or "steps" 2554. (For the sake of simplicity only one series is shown). Operation of the function selector 2552 is controlled by instructions from the personal computer (PC) 2555, which constitutes the feature host. A software module, which resides in the feature host PC 2555 will, when required, invoke a predetermined selection of the functions F1 to F8. The particular functions involved, and the sequence in which they are invoked, will be determined by the feature which is to be provided.

The feature host 2555 must be able to (i) interface at the physical and logical levels with the KSU 40; (ii) store the feature modules, and; (iii) interpret functional signals, select the corresponding feature software module, and communicate it to the terminal 2551.

The feature host 2555, shown connected to the S & S bus or channel 50 like any other comprises a router 2556 which is able to direct messages, selectively, to a group of feature modules referenced 2557. Each of the feature modules 2557 has a unique logical address (LAD) and a unique set of codes, each for one of the functions F1, F2, F3, etc. which constitute that particular feature. These codes are stored in a store 2561 and will be invoked by a sequence controller 2560. The sequence controller 2560 is connected to a message handler 2558 which communicates with the router 2556. The message handler 2558 serves to detect whether an incoming message is a "session control" message, in which case it directs it to a session manager 2559, or a "feature control" message,, in which case it directs the message to the sequence controller 2560. Both the sequence controller 2560 and the session manager 2559 can write to, and read from, a data store 2562 which holds information including the state of the feature module and the LAD of the terminal 2551. When the session manager receives the original message with the LAD imbedded, it will write it into the data store 2562 for future reference. When prompted by a user at the terminal 2551, the feature host 2555 will communicate instructions from the feature module 2557 to the terminal 2551 to invoke the corresponding set of functions in the terminal 2551 and provide the feature to the user. The core processor 7 in the KSU 40 (FIG. 1) need not be involved, except for its regular message handling functions.

Figure 26:
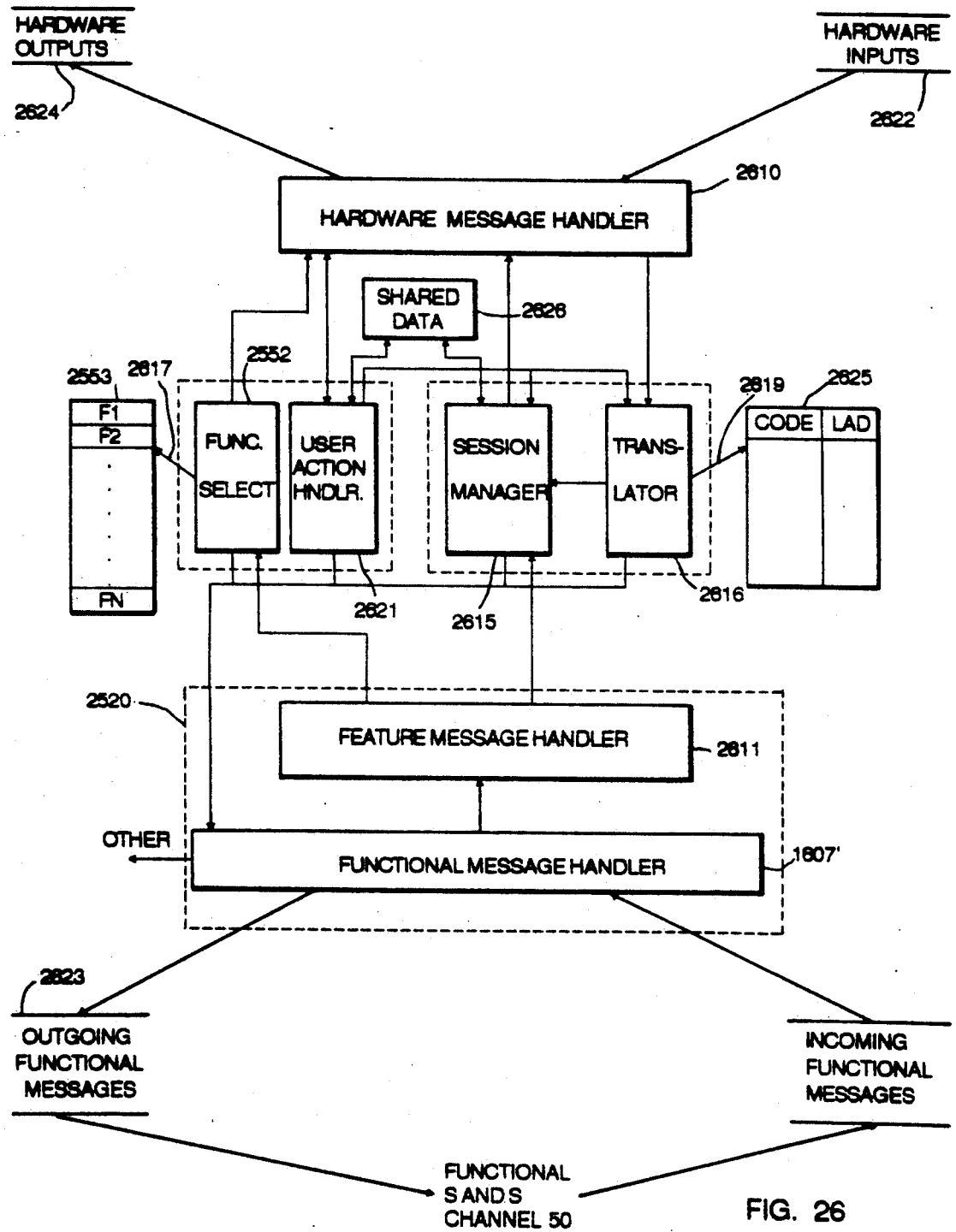
FIG. 26 is a data flow diagram illustrating data flow in those parts of the functional terminal of FIG. 25 which are involved in feature implementation.

FIG. 26 illustrates data flow in those parts of the functional terminal 2551 which are involved in feature selection and usage. The terminal 2551 has a hardware message handler 2610 which exchanges hardware input and output messages 2622 and 2624, respectively, with components such as the keyboard and display device, and a feature message handler 2611, as mentioned previously, which interfaces by way of the regular message handler 1607' with the functional S & S channel 50.

In addition to the function selector 2552, the terminal 2551 comprises a user action handler 2621, a session manager 2615 and a translator 2616. All four of these entities can transmit outgoing functional messages 2623 to the functional message handler 1607' and thence onto the functional S & S channel 50. The function selector 2552 has a pointer 2617 enabling it to selectively invoke functions F1 to FN in the store 2553. The translator 2616 has a pointer 2619 for accessing a table 2625 which has logical addresses (LAD) of available features indexed according to user-dialled codes.

Messages exchanged between the feature host 2555 and the functional terminal 2551 may be either "session control" messages, which set up, terminate, SUSPEND or otherwise administer a session; or "function control" messages which invoke the various functions required to provide the feature which has been requested. The feature message handler 2611 directs incoming "function control" messages received from the functional message handler 1607' to the function selector 2552 and incoming "session control" messages to the session manager 2615.

At the hardware side, the user action handler 2621, session manager 2615 and translator 2616 all may send hardware output messages 2624 to the various hardware output devices in the terminal 2551, for example the displays, by way of the hardware message handler 2610. Incoming hardware messages are directed by the hardware message handler 2610 to the same three entities 2621, 2615 and 2616, respectively. It should be noted that there is no access from the hardware message handler 2610 to the function selector 2613 because the functions are controlled by the feature host 2555 by way of the functional message channel. The session manager 2615 and user action handler 2621 can both read from, and write to, a shared data store 2626, which stores information including the LADs of the various features and the state of the terminal 2551—which will be discussed later.

When a user of functional terminal 2551 wishes to select a particular feature, he dials a first code, a "feature code". Typically this entails pressing a special feature key followed by a series of digits, for example 9,1,2. The corresponding "hardware input" message 2622 is passed to the translator 2616 which, using table translates the code into the logical address (LAD) of that feature in the feature host 2555 and passes it to the session manager 2615, which transmits it by way of the functional message handler 1607, onto the functional S & S channel 50, by-passing the feature message handler 2611, onto the functional S & S channel 50. Although, for convenience, the translation is shown as being by way of a look-up table 2625, in reality the translation would likely be done by repackaging the feature code i.e. 9,1,2.

When the feature host (PC) 2555 receives this message, its router 2556 (FIG. 25) selects the feature module 2557 identified by the LAD in the message and passes the message to it. Within the feature module 2557, the message handler 2558 determines (from its header) that the message is a "session control" message and relays it to the session manager 2559. Assuming the feature is available, the session manager 2559 will return a message to the terminal 2551 confirming that the session is established and give sequence controller 2560 control of the session. The sequence controller 2560 accesses store 2561 for the address codes for the set of functions needed to provide the feature concerned.

The function codes are transmitted directly to the terminal 2551 in a sequence determined by software in the sequence controller 2559.

It should be noted that the feature module 2557 comprises not only software to control implementation of a set of functions F1, F2, F3, etc. but also includes, where appropriate, software to control interaction with the user.

Generally speaking, the feature software in the feature host 2555 may be similar to that provided in the core processor of a more traditional system. It should be appreciated, however, that such a core processor would have no provision for interacting with the user's terminal.

A typical sequence of messages exchanged between the feature host 2555 and the functional terminal 2551 will now be described with reference to FIG. 27, which shows the messages exchanged, and FIG. 28, which illustrates associated state changes for the terminal 2551 and the feature module 2557. In FIG. 28 those states which are "permanent" or static states are represented using solid lines. The functional terminal 2551 can adopt any of the following states relative to the "feature session":

IDLE—there are no sessions active
ACTIVE—there is an active session
SUSPEND—a feature session is in a suspended state
WAIT1—waiting for a response after sending an ORIGINATE message
WAIT2—waiting for a response after sending a SUSPEND message
WAIT3—waiting for a response after sending a RESUME message
NO RESP—there has been no response to either an ORIGINATE, SUSPEND, or RESUME message
REJECT RCVD—a REJECT message has been received from the feature host.

The functional terminal 2551 can itself initiate a change of state in response to the following inputs:
UA1—an event which results in a feature being invoked
UA2—an event which results in a feature being suspended
UA3—an event which results in a feature being resumed.

Referring to FIG. 28, the functional terminal 2551 is represented as being in the IDLE state 2901 as an initial condition. The functional terminal 2551 will stay in the initial static IDLE state 2901 until the user does something, for example event UA1, causing a state transition into a WAIT state 2903. This is a temporary state so it is represented using broken lines.

Figure 27:
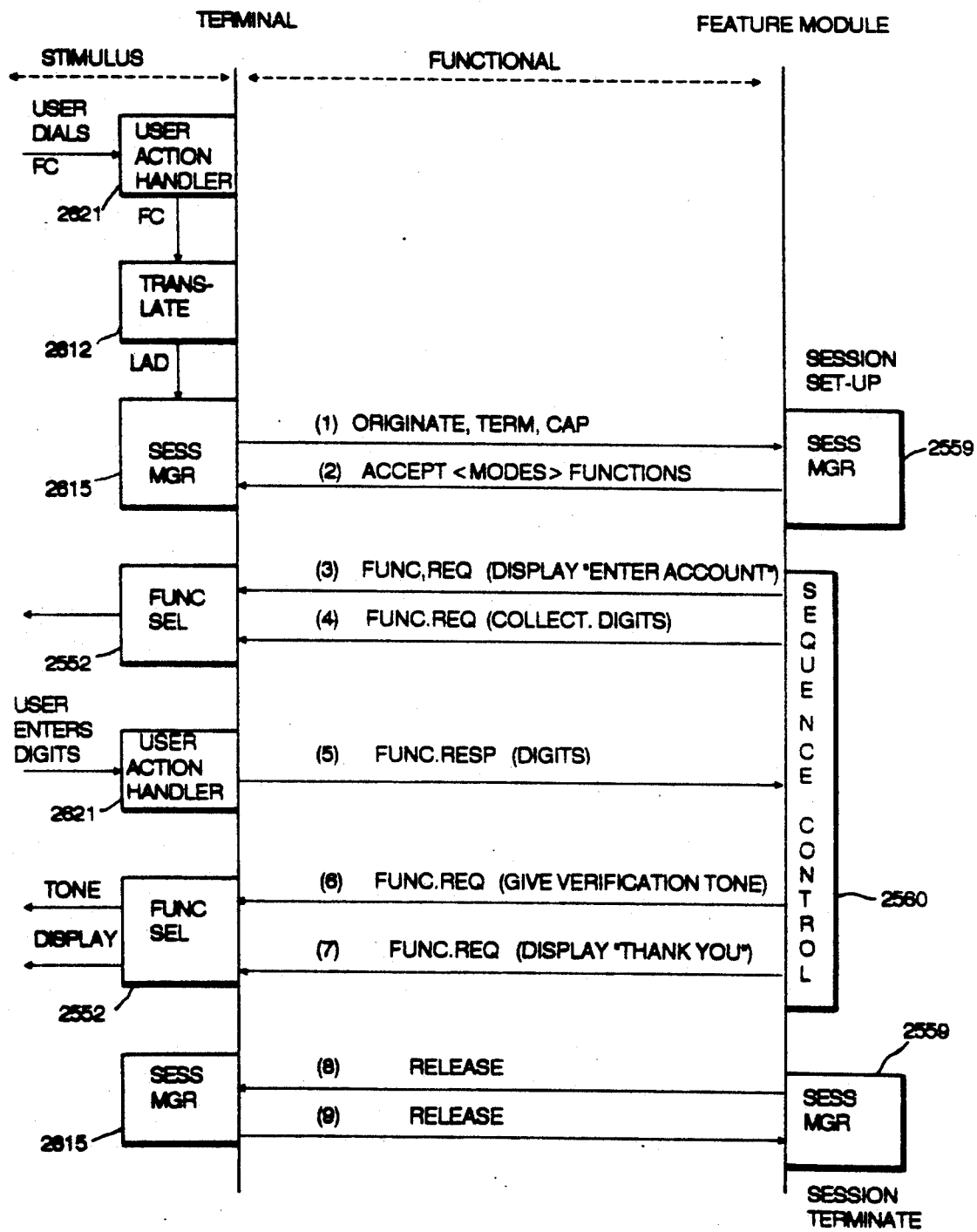
FIG. 27 illustrates the sequence of messages exchanged by the functional terminal and the feature host apparatus in setting up a session providing a particular feature requested by a user.
Figure 28:
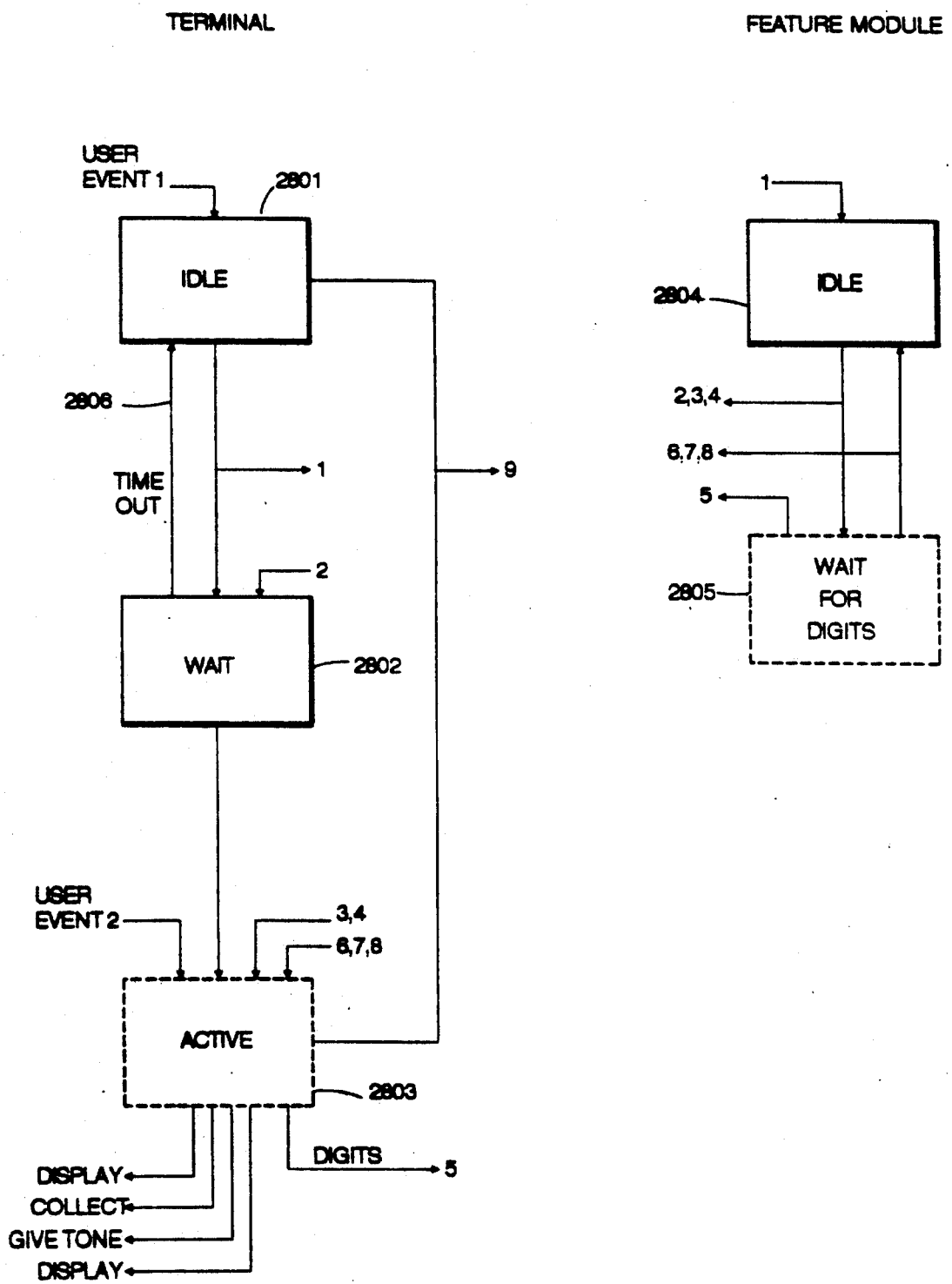
FIG. 28 illustrates state changes in the functional terminal and the feature host during the session illustrated by FIG. 27.

Referring to FIG. 27, the first event occurs when the user requests the feature by pressing the appropriate keys to dial the feature code (FC). This is USER EVENT 1 in FIG. 28. The user action handler 2621 passes this feature code to the translator 2616 which converts it into the corresponding logical address (LAD), as mentioned previously. The session manager 2615 incorporates the LAD into an "ORIGINATE" message, including a terminal type identifier and active call information, which it transmits to the feature host (PC) 2555 by way of the functional S and S channel 50. This is message number (1) in FIG. 27 and constitutes a request to set up a session with the particular feature. At the same time the session manager 2615 writes to shared data store 2626 to change the state of the terminal 2551 from the IDLE state 2801 to the WAIT state 2802, as shown in FIG. 28, and sets a timer T1.

When the terminal 2551 is in the WAIT state 2903, three input events are possible, any of which causes a state transition. Two such events are the receipt of an ACCEPT message and the receipt of a REJECT message. Both are functional messages. The third event is a time-out of the timer T1.

Referring to FIG. 25, the "ORIGINATE" message (1) is received by the feature module 2557 and router 2556 translates the logical address LAD to identify a specific feature and directs the message to the appropriate one of the feature modules 2557. As described previously, within the feature module 2557, message handler 2558 determines that the message is a "session control" message and sends it to the session manager 2559. The feature host 2555 may respond with an ACCEPT message or a REJECT message. The latter indicates that the feature host 2555 is not willing or able to set up a feature session, typically because the feature module 2557 is already in an ACTIVE state, meaning that it is already in use for another terminal, or in an IDLE state, but unable to ACCEPT the request because it is incompatible.

In FIG. 28, the state of the feature module 2557 when it receives the message is IDLE, so the session manager 2559 responds with an ACCEPT message (2). As shown in FIG. 27, the ACCEPT message (2) may concatenate user input processing modes, e.g. to modify terminal operation, and functions to be invoked.

This exchange of "ORIGINATE" and "ACCEPT" messages constitutes "Session set-up" and is required regardless of the particular feature sought by the user.

Having responded, the session manager 2559 transfers control of the session to sequence controller 2560. Subsequent messages will be determined by the sequence controller 2560 in the feature module 2557 and the function selector 2552 and user action handler 2621 in the functional terminal 2551.

When message (2) arrives back at the functional terminal 2551 it is directed to the session manager 2615 since it is still part of the session set-up sequence. When the session manager 2615 receives message (2), it recognises the session is now set up and writes to shared data store 2626 to change the state of the terminal 2551 from WAIT state 2802 (FIG. 28) to the ACTIVE state 2803. Consequently, messages 3 and 4 will be directed to the function selector 2552 to implement the two functions concerned, namely "Display" and "Collect".

Thus, in message (3), the feature module 2557 requests that the terminal 2551 display the words "Enter account". It does this by invoking the "Display" function in the terminal 2551 and by sending, in the same message, the OSI characters to be displayed, i.e. "Enter Account". Once the function selector 2552 has checked that the terminal 25551 is in the ACTIVE state, it will respond to message (3) by selecting the "Display" function and implementing the corresponding set of steps (2554) to display the message to the user.

By means of message (4) the feature module 2557 asks the terminal 2551 to collect five digits. The function selector 2552 responds to message (4) by invoking the "Collect digits" function and specifying five as the number to be collected. The message may include an "echo" instruction which will cause the terminal 2551 to display the digits on its own screen.

When the user responds to this prompt by entering the relevant digits, the user action handler 2621 incorporates these digits into message number (5), together with an indication that they are in response to the "Collect digits" request. The user action handler 2621 transmits message (5) to the feature module 2557. At the feature module 2557, the router 2556 passes the message to the message handler 2558 of the feature module. The message handler 2558, passes it to the sequence controller 2560. The sequence controller 2560 accesses stored data 2562 to determine that the feature module 2557 is in the WAIT FOR DIGITS condition (FIG. 28) and, when the digits have been verified as correct, returns a pair of messages (6) and (7) to the terminal 2551. These are function requests "Give verification tone" and "Display 'Thank you'", respectively. These two messages let the user know that his request has been accepted. Since this is the end of the session so far as the sequence controller 2560 is concerned, it passes control back to the session manager 2559 to release the session. Accordingly session manager 2559 transmits message (8) "RELEASE" to the terminal 2551. In the terminal 2551, messages (6) and (7) are received by the function selector 2552, which invokes the requisite functions to provide the verification tone at the terminal's audio output and also to display the "Thank you" message. When message number (8) is received, feature message handler 2611 detects it as being a "session control" message and routes it to the session manager 2615. Session manager 2615 sends "RELEASE" message number (9) back to the feature module 2557 and switches the state of the terminal 2551 back from the ACTIVE condition 2803 to the IDLE condition 2801 (FIG. 28).

These "RELEASE" messages constitute the "Session terminate" messages and, like the "Session set-up" messages, will be required regardless of the feature involved.

It will be appreciated that it is not always possible to set up a session when the user seeks to do so or, as is possible, the feature host seeks to do so. It will be noted that in FIG. 28 a "time-out" link 2806 is shown between the WAIT state 2802 and the IDLE state 2801. When the terminal 2551 attempts to set up a session, it sets a timer when switching to the WAIT state. If no response is received within the allotted time the timer issues the "time out" signal to return the terminal 2551 to the IDLE condition. This ensures that the terminal 2551 does not wait indefinitely for a response from a feature module that is not available.

Figure 29:
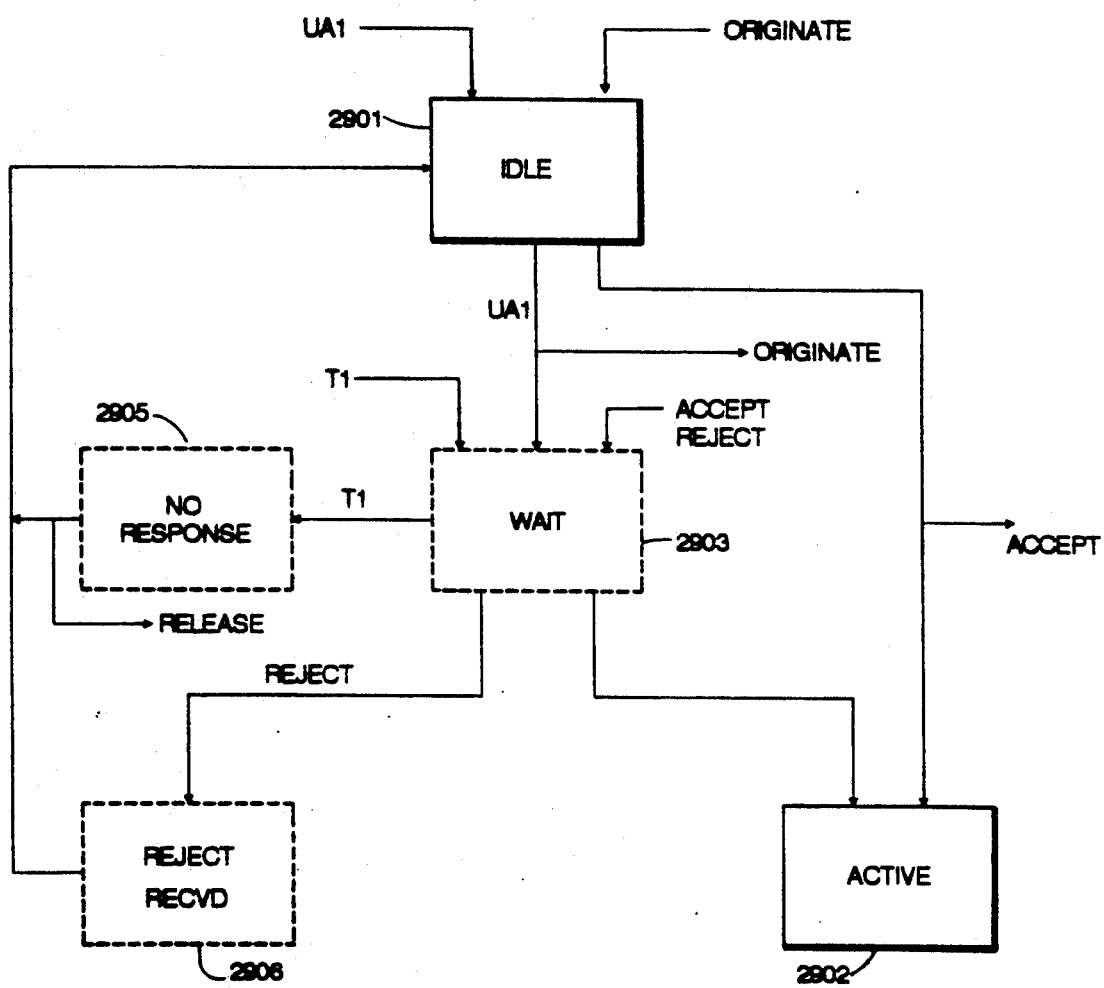
FIGS. 29 and 30 illustrate other optional states for the functional terminal.

FIG. 29 illustrates two other states the terminal 2551 may adopt in such circumstances. NO RESPONSE state 2905 is a temporary state which will be adopted if no response is received from the feature module within the time-out interval set timer T1. From the NO RESPONSE state 2905, the terminal 2551 issues a RELEASE message, then returns to the IDLE state 2901.

If the feature module 2557 is unable to set up a session, and returns a REJECT message while the terminal 2551 is in WAIT state 2903, the terminal 2551 will switch to temporary state REJECT RCVD 2906. In this state the terminal 2551 causes an advisory message to be displayed to the user, then switches back to the IDLE state 2901. If from the WAIT state 2903, for any reason, the terminal 2551 sent out an ACCEPT message, it would then enter ACTIVE state 2902. The particular criteria determining whether or not the ACCEPT message is issued will vary according to the terminal type and configuration and even user preferences.

An alternative input to the USER EVENT 1 is the receipt by the terminal 2551 of an input functional message—shown as "ORIGINATE" in FIG. 29. The terminal 2551 may also enter a SUSPEND state (not shown) which may result in the ORIGINATE request being queued rather than rejected altogether.

Figure 30:
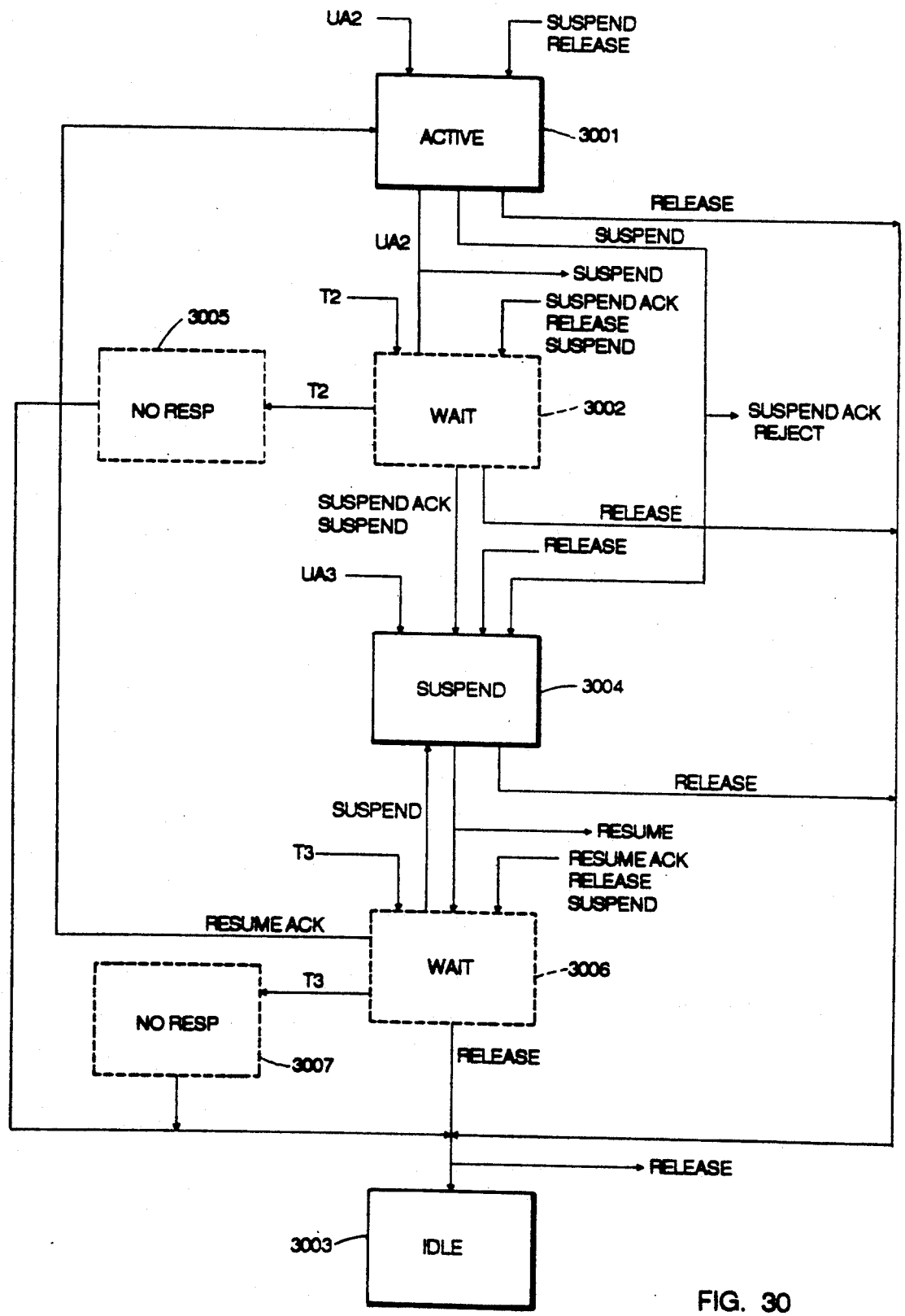

FIG. 30 illustrates various states the terminal 2551 may adopt starting from the ACTIVE condition. If while the terminal 2551 is ACTIVE (state 3001 of FIG. 30) a user attempts to set up a different feature session event, UA2, requiring that the current feature be suspended, the terminal 2551 will check whether the feature can be suspended or not. If it can, the session manager 2615 will issue a SUSPEND message to the active feature module. At the same time it will start a time-out timer T2 and enter the WAIT state 3002.

In the event that the terminal 2551 receives no response to its SUSPEND signal before its timer T2 times out, it enters a transient state NO RESP 3005, then enters the IDLE state 3003.

If, in ACTIVE state 3001, the terminal 2551 receives a RELEASE message, indicating that the feature module is trying to terminate the active session, the terminal 2551 will issue a RELEASE message and enter the IDLE state 3003.

If, in the ACTIVE state 3001, the terminal 2551 receives a SUSPEND message from the feature module indicating that the feature module wishes to suspend the current active session, the terminal 2551 will first check whether or not the feature can indeed be suspended. If the feature can be suspended, the terminal 2551 will return a SUSPEND ACK message to the feature module and enter the SUSPEND state 3004. If the feature cannot be suspended, the terminal 2551 will issue a REJECT message and remain in the ACTIVE state 3001. If an ORIGINATE message is received, which implies that the feature host 2555 is attempting to set up a new feature session (i.e. using a different feature module) with the functional terminal 2551, the functional terminal 2551 will execute the following steps:

1. Since the terminal 2551 was already involved in a feature session, it would compare the priority ranking of the new feature i.e. that was being invoked, with the priority ranking of the feature which was already active.
2. If the new feature ranked higher than the active feature, the terminal 2551 would try to SUSPEND the active feature. Assuming that the active feature could be suspended, the terminal 2551 would send a SUSPEND message to the already-active feature LAD (feature host), and an ACCEPT message to the new feature LAD. The terminal 2551 would then be in session with the new feature.
3. If the new feature ranked lower than the active feature, the terminal 2551 would check for a SUSPEND flag, a "bit" allocated to this purpose, in the ORIGINATE message from the new feature. If the SUSPEND flag were not set, the terminal 2551 would send a REJECT message to the new feature LAD.
4. If the SUSPEND flag were set, the terminal 2551 would check whether the feature could be suspended or not. If it could, the terminal 2551 would send a SUSPEND message to the new feature LAD and enter the SUSPEND state 3004.
5. If the SUSPEND flag were set, but the feature could not be suspended, then the terminal 2551 would send a REJECT message to the new feature LAD.

Referring to FIG. 30, when the terminal 2551 is in the SUSPEND state 3004, a user action UA3 will cause the terminal 2551 to switch to another state. Thus, if the user wishes to resume a particular feature, he dials in the feature code of that feature. This causes the terminal 2551 to send a RESUME message to the feature host and enter WAIT state 3006. Assuming that, while in WAIT state 3006 it receives a RESUME ACK message, it will then return to the ACTIVE condition 3001 and the session has been "resumed". When sending the RESUME message to the feature host, the terminal 2551 sets a timer T3. If no response is received before the timer T3 times out, the terminal 2551 enters the NO RESPONSE state 3007, sends a RELEASE message to the feature host, and re-enter the IDLE state 3003.

Alternatively, in answer to its RESUME message, sent while in SUSPEND state 3004, the terminal 2551 might receive a RELEASE message from the feature host. In this case the terminal 2551 will enter the IDLE condition 3003 and send a RELEASE message back to the feature host as it does so. Finally the terminal could receive another SUSPEND message, in which case it will merely return from the WAIT state 3006 to the SUSPEND state 3004.

Although in the foregoing description a functional terminal 2551 has been described, it will be appreciated that instead a stimulus terminal could be used, connected to a functional emulator as described hereinbefore. So far as functionality is concerned, the functional emulator would correspond closely to the terminal 2551 shown in FIG. 26, the main difference being that the "hardware inputs" would be replaced by "incoming stimulus messages" from the stimulus S and S channel 61a and the "hardware outputs" would be replaced by "outgoing stimulus messages" destined for the stimulus S and S channel 61a.

It should be noted from the foregoing that the feature host 2555 is capable of invoking functions, in the terminal 2551, to prompt the user.

In the preferred embodiment described herein the feature host apparatus is a personal computer. Alternatives are possible, however, so long as the necessary processing capability and memory are provided. Indeed, the feature host could be another functional terminal.

Although only one feature host is shown, more than one could be provided. Some features may occupy so much of the feature host's central processor capacity that other features cannot be accessed at the same time. Providing more than one host assures greater availability. It should be appreciated that in the terminal itself, features which do not create a conflict by trying to use the same resources, can be provided at the same time. For example, "dial-by-name" and "call screening", could be used at the same time since the latter does not need to use the screen.

An advantage of the invention is that it allows third party software developers to write PC-based applications or features and thus increase overall system functionality.

Another advantage is that the number of features which are available can be extended readily, either by adding features to an existing feature host PC or by adding another feature host PC to the system. In either case, the additional features will have unique logical addresses which will be distributed to those terminals which are to make use of them. Typically, such distribution will be by way of a bulletin board accessible to the user.

We claim:

1. A telephone system having a central processor and a plurality of ports, each of said ports having connected thereto an apparatus including a processing device for controlling functions of the apparatus and an interface device for exchanging signals in an operating signal format of the port, at least one of said apparatus being a telephone station apparatus and another of said apparatus being a feature host apparatus, said telephone station apparatus having a plurality of functions stored therein and said feature host apparatus having a plurality of feature modules stored therein, each such feature module comprising instructions for controlling an exchange of signalling and supervision messages between said feature host apparatus and said telephone station apparatus so as to invoke a predetermined group of said functions in said telephone station apparatus and provide thereby a selected one of said features in response to a feature request action of a user at said telephone station apparatus.

2. A system as defined in claim 1, wherein each said feature module is accessible by means of a unique logical address and said telephone station apparatus has storage means for storing such logical addresses and accessing them in response to said feature request action of a user.

3. A system as defined in claim 2, wherein said storage means for storing such logical addresses is arranged to associate each such address with a user-selectable code generated by such feature request action.

4. A system as defined in claim 3, wherein said telephone station apparatus includes translator means for detecting such a user-selectable code and transmitting the corresponding logical address to said feature host apparatus.

5. A system as defined in claim 1, wherein each said function comprises a set of steps to be executed in performing said function, said telephone station apparatus further comprising means for performing said steps in response to selection of the corresponding function by said feature host apparatus.

6. A system as defined in claim 5, comprising storage means for said functions and function selector means operable in response to said feature host to access said storage means and selectively invoke said functions.

7. A system as defined in claim 1, wherein said telephone station apparatus comprises a session manager operative to exchange messages with said feature host apparatus to establish communication therebetween before said feature host apparatus assumes control of said functions of said telephone station apparatus and, thereafter, to exchange messages with said feature host apparatus to terminate such communication.

8. A system as defined in claim 6, wherein said telephone station apparatus comprises a session manager operative to exchange messages with said feature host apparatus to establish communication therebetween before said feature host apparatus assumes control of said functions of said telephone station apparatus and, thereafter, to exchange messages with said feature host apparatus to terminate such communication, and a message handler operative to detect whether a message from said feature host is destined for said session manager or said function selector means and route such message accordingly.

9. A system as defined in claim 7, wherein said session manager is operative in response to said feature action request to establish said communication.

10. A system as defined in claim 7, wherein said session manager is operative in response to a message from said feature host apparatus to establish said communication.

11. A system as defined in claim 1, wherein said telephone station apparatus comprises function selector means operative in response to messages from said feature host apparatus to invoke such of said functions as are identified in such messages.

12. A system as defined in claim 1, wherein said feature host apparatus comprises a personal computer.

13. A system as defined in claim 1, further comprising at least one time multiplexed message channel in association with each of said ports, and means for routinely selecting one of said apparatus for transmission of a signalling and supervision message via a corresponding port-associated message channel.

14. A method of providing user-selectable features in a telephone system having a central processor and a plurality of ports, each of said ports having connected thereto an apparatus including a processing device for controlling functions of the apparatus and an interface device for exchanging signals in an operating signal format of the port, at least one of said apparatus being a telephone station apparatus and another of said apparatus being a feature host apparatus, said telephone station apparatus having a plurality of functions stored therein and said feature host apparatus having a plurality of feature modules stored therein, each feature module corresponding to a different set of said functions, said method including the steps of, in response to a feature request action of a user at said telephone station apparatus, exchanging signalling and supervision messages between said feature host apparatus and said telephone station apparatus so as to invoke a predetermined set of said functions in said telephone station apparatus and provide thereby a selected one of said features to said user.

15. A method as defined in claim 14, wherein each said feature module is accessible by means of a unique logical address and said telephone station apparatus has storage means for storing such logical addresses, said method further comprising the step of accessing such logical addresses at said telephone station apparatus in response to said feature request action of a user.

16. A method as defined in claim 15, wherein said logical addresses stored at said telephone station apparatus are associated with respective user-selectable codes, such codes being generated by such feature request action.

17. A method as defined in claim 16, further comprising the step of detecting such a user-selectable code and transmitting the corresponding logical address to said feature host apparatus.

18. A method as defined in claim 14, wherein each said function comprises a set of steps to be executed in performing said function, said method further comprising the step of performing said steps in response to selection of the corresponding function by said feature host apparatus.

19. A method as defined in claim 18, comprising the step of accessing a store holding said functions to selectively invoke said functions in response to a said message from said feature host apparatus.

20. A method as defined in claim 14, further comprising the step of exchanging messages with said feature host apparatus to establish communication therebetween before said feature host apparatus assumes control of said functions of said telephone station apparatus and, thereafter, exchanging messages with said feature host apparatus to terminate such communication.

21. A method as defined in claim 19, further comprising the step of exchanging messages with said feature host apparatus to establish communication therebetween before said feature host apparatus assumes control of said functions of said telephone station apparatus and, thereafter, exchanging messages with said feature host apparatus to terminate such communication, and determining from a said message from said feature host whether it is for controlling said functions or for setting up communications between said feature host and said telephone station apparatus and routing said message accordingly.

22. A method as defined in claim 19, wherein said step of exchanging messages is initiated in response to said feature action request.

23. A method as defined in claim 19, wherein said step of exchanging messages is initiated in response to a message from said feature host apparatus.

24. A method as defined in claim 14, wherein said feature host apparatus comprises a personal computer.

25. A method as defined in claim 14, further comprising the step of providing at least one time multiplexed message channel in association with each of said ports, and routinely selecting one of said apparatus for transmission of a signalling and supervision message via a corresponding port-associated message channel.

26. Telephone station apparatus for use in a telephone system having a central processor and a plurality of ports, each of said ports having connected thereto an apparatus including a processing device for controlling functions of the apparatus and an interface device for exchanging signals in an operating signal format of the port, at least one of said apparatus being a feature host apparatus having a plurality of feature modules stored therein, each such feature module comprising instructions for controlling an exchange of signalling and supervision messages between said feature host apparatus and said telephone station apparatus so as to invoke a predetermined group of functions in said telephone station apparatus and provide thereby a selected one of said features in response to a feature request action of a user at said telephone station apparatus, said telephone station apparatus comprising storage means for storing a plurality of said functions, and function selector means operable to invoke said stored functions selectively in response to said signals from said feature host.

27. Telephone station apparatus as defined in claim 26, further comprising session manager means operative to set up and terminate, respectively, communications between said feature host and said telephone station apparatus.

28. Telephone station apparatus as defined in claim 27, further comprising message handler means operative to detect whether an incoming message from said feature host is destined for said function selector means or said session manager means and routing said message accordingly.

29. Feature host apparatus for use in a telephone system having a central processor and a plurality of ports, each of said ports having connected thereto an apparatus including a processing device for controlling functions of the apparatus and an interface device for exchanging signals in an operating signal format of the port, at least one of said apparatus being a telephone station apparatus having a plurality of functions and function selector means for selectively invoking a predetermined group of said functions thereby to provide a selected one of said features in response to a feature request action of a user at said telephone station apparatus, said feature host apparatus having a plurality of feature modules stored therein, each such feature module comprising instructions for controlling an exchange of signalling and supervision messages between said feature host apparatus.

30. Feature host apparatus as defined in claim 27, wherein each said feature module has a unique logical address and said feature host apparatus comprises means for detecting such a logical address in an incoming message and routing said message to the corresponding one of said feature modules.

31. Feature host apparatus as defined in claim 30, wherein said feature module comprises address codes for a unique set of said functions and sequence control means for controlling implementation of said set of functions, by said telephone station apparatus, in such a sequence as to provide the corresponding feature.

32. Feature host apparatus as defined in claim 31, wherein said feature module comprises session manager means operative to control setting up and termination, respectively, of communications between said feature module and said telephone station apparatus.

33. Feature host apparatus as defined in claim 32, wherein said feature module comprises message handler means operative to detect whether an incoming message is destined for said sequence controller or said session manager and route said message accordingly.

34. A feature module for use in a telephone system having a central processor and a plurality of ports, each of said ports having connected thereto an apparatus including a processing device for controlling functions of the apparatus and an interface device for exchanging signals in an operating signal format of the port, at least one of said apparatus being a telephone station apparatus having a plurality of functions and function selector means for selectively invoking a predetermined group of said functions thereby to provide a selected one of said features in response to a feature request action of a user at said telephone station apparatus, and another of said apparatus being a feature host apparatus having a plurality of feature modules stored therein, each such feature module comprising instructions for controlling an exchange of signalling and supervision messages between said feature host apparatus, and a unique logical address and said feature host apparatus comprises means for detecting such a logical address in an incoming message and routing said message to the corresponding one of said feature modules, said feature module comprising address codes for a unique set of said functions and sequence control means for controlling implementation of said set of functions, by said telephone station apparatus, in such a sequence as to provide the corresponding feature.

35. A feature module as defined in claim 34, further comprising session manager means operative to control setting up and termination, respectively, of communications between said feature module and said telephone station apparatus.

36. A feature module as defined in claim 35, further comprising message handler means operative to detect whether an incoming message is destined for said sequence controller or said session manager and route said message accordingly.

* * * * *